(12) United States Patent
Reinhard et al.

(10) Patent No.: US 10,999,607 B2
(45) Date of Patent: May 4, 2021

(54) METHODS, SYSTEMS AND APPARATUS FOR ELECTRO-OPTICAL AND OPTO-ELECTRICAL CONVERSION OF IMAGES AND VIDEO

(71) Applicant: INTERDIGITAL MADISON PATENT HOLDINGS, SAS, Paris (FR)

(72) Inventors: Erik Reinhard, Hédé-Bazouges (FR); Pierre Andrivon, Liffre (FR); Philippe Bordes, Laille (FR); Christophe Chevance, Brece (FR); Jurgen Stauder, Montreuil/ille (FR); Patrick Morvan, Laille (FR); Edouard Francois, Bourg des Comptes (FR); Joaquin Zepeda Salvatierra, St. Jacques de la Lande (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 42 days.

(21) Appl. No.: 15/545,782

(22) PCT Filed: Jan. 26, 2016

(86) PCT No.: PCT/EP2016/051552
§ 371 (c)(1),
(2) Date: Jul. 24, 2017

(87) PCT Pub. No.: WO2016/120261
PCT Pub. Date: Aug. 4, 2016

(65) Prior Publication Data
US 2018/0027262 A1    Jan. 25, 2018

(30) Foreign Application Priority Data

Jan. 27, 2015   (EP) .................................. 15305092
Feb. 6, 2015    (EP) .................................. 15305172
May 6, 2015     (EP) .................................. 15305690

(51) Int. Cl.
H04N 19/18    (2014.01)
H04N 19/98    (2014.01)
(Continued)

(52) U.S. Cl.
CPC .......... *H04N 19/98* (2014.11); *H04N 19/186* (2014.11); *H04N 19/70* (2014.11); *H04N 19/85* (2014.11);
(Continued)

(58) Field of Classification Search
CPC ...... H04N 19/98; H04N 19/186; H04N 19/85; H04N 19/70; G09G 2370/12;
(Continued)

(56) References Cited

U.S. PATENT DOCUMENTS 8,593,480 B1 * 11/2013 Ballestad ............. H04N 1/6027
                                                        345/590
2002/0171852 A1    11/2002 Zhang et al.
(Continued)

FOREIGN PATENT DOCUMENTS

CN    102202162 A    9/2011
CN    103430527 A    12/2013
(Continued)

OTHER PUBLICATIONS

Krawczyk et al., "Brightness Adjustment for HDR and Tone Mapped Images", 15th Pacific Conference on Computer Graphics and Applications, Oct. 29, 2007, Maui, Hawaii, USA, pp. 373-381.
(Continued)

*Primary Examiner* — Amandeep Saini
(74) *Attorney, Agent, or Firm* — Invention Mine LLC

(57) ABSTRACT

The present principles are directed to a parameterized OETF/EOTF for processing images and video. The present
(Continued)

principles provide a method for encoding a picture, comprising: applying a parameterized transfer function to a luminance (L) signal of the picture to determine a resulting V(L) transformed signal; encoding the resulting V(L); wherein the parameterized transfer function is adjusted based on a plurality of parameters to model one of a plurality of transfer functions. The present principles also provide for a method for decoding a digital picture, the method comprising: receiving the digital picture; applying a parameterized transfer function to the digital picture to determine a luminance (L) signal of the digital picture, the parameterized transfer function being based on a plurality of parameters; wherein the parameterized transfer function is adjusted based on a plurality of parameters to model one of a plurality of transfer functions.

8 Claims, 21 Drawing Sheets

(51) Int. Cl.
*H04N 19/70* (2014.01)
*H04N 19/85* (2014.01)
*H04N 19/186* (2014.01)

(52) U.S. Cl.
CPC .............. *G09G 2320/0271* (2013.01); *G09G 2320/0276* (2013.01); *G09G 2370/04* (2013.01); *G09G 2370/12* (2013.01)

(58) Field of Classification Search
CPC ... G09G 2320/0276; G09G 2320/0271; G09G 2370/04
USPC ......................................................... 382/166
See application file for complete search history.

(56) References Cited

U.S. PATENT DOCUMENTS

| | | | |
|---|---|---|---|
| 2005/0117799 | A1 | 6/2005 | Fuh |
| 2008/0198932 | A1 | 8/2008 | Sei |
| 2011/0235945 | A1 | 9/2011 | Wakazono et al. |
| 2012/0054664 | A1 | 3/2012 | Dougall et al. |
| 2013/0328907 | A1 | 12/2013 | Ballestad et al. |
| 2013/0329790 | A1* | 12/2013 | Zhou ................... H04N 19/503 375/240.12 |
| 2014/0363093 | A1 | 12/2014 | Miller et al. |
| 2017/0085894 | A1* | 3/2017 | Ramasubramonian ..................... H04N 19/46 |

FOREIGN PATENT DOCUMENTS

| | | | |
|---|---|---|---|
| CN | 103763456 A | | 4/2014 |
| JP | 2014531821 A | | 11/2014 |
| WO | WO2010045007 | | 4/2010 |
| WO | 2013046095 A1 | | 4/2013 |
| WO | WO 2013086169 A1 | | 6/2013 |
| WO | WO2014130343 | | 8/2014 |
| WO | WO2014204865 | | 12/2014 |
| WO | WO2015007505 | | 1/2015 |
| WO | WO-2015007505 A1 * | 1/2015 | ............... H04N 9/68 |
| WO | WO2015007510 | | 1/2015 |

OTHER PUBLICATIONS

Barten, "Contrast Sensitivity of the Human Eye and Its Effects on Image Quality", SPIE Optical Engineering Press, Bellingham, Washington, USA, 1999, pp. 27-40.
Borer, "Non-linear Opto-Electrical Transfer Functions for High Dynamic Range Television", BBC Research and Development White Paper, WHP 283, Jul. 2014, pp. 1-24.
Cowan et al., "Contrast Sensitivity Experiment to Determine the Bit Depth for Digital Cimena", SMPTE Motion Imaging Journal, Sep. 2004, pp. 281-292.
Anonymous, "Image Dynamic Range in Television Systems, Implications of Absolute Brightness", ITU Radiocommunication Study Groups, Document 6C/, Oct. 2014, pp. 1-13.
Anonymous, "Non-Linear Opto-Electrical Transfer Functions for High Dynamic Range Television", ITU Radiocommunication Study Groups, Document 1A, Nov. 2, 2014, pp. 1-17.
Anonymous, "The present state of ultra-high definition television", International Telecommunication Union, ITU-R Radiocommunication Sector of ITU, Report ITU-R BT.2246-3, Mar. 2014, pp, 1-93.
Miller et al., "Perceptual Signal Coding for More Efficient Usage of Bit Codes", SMPTE Motion Imaging Journal, May/Jun. 2013, pp. 52-59.
Miller, "A Perceptual EOTF for Extended Dynamic Range Imagery", SMPTE Monthly Webcast, 2014, pp. 1-17.
Van der Vleuten, "Philips' High Dynamic Range Proposal", Joint DVB-EBU HDR Workshop, Munich, Germany, Jun. 17, 2014, pp. 1-14.
Sugawara, ""HDR" in television applications", DVB-EBU HDR Workshop, Munich, Germany, Jun. 17, 2014, pp. 1-15.
Reinchard: "An Enhanced EOTF/OETF for EIDR Broadcast Systems", May 7, 2015, pp. 1-10.
Mantiuk et al., "Modeling a Generic Tone-mapping Operator," Eurographics 2008, vol. 27, No. 2, Apr. 2008, pp. 699-708.
Segall et al., "Tone Mapping SEI Message", Joint Video Team (JVT) of ISO/IEC MPEG & ITU-T VCEG (ISO/IEC JTC1/SC29/WG11 and ITU-T SG16 Q.6), Document JVT-S087, 19th Meeting, Geneva, Switzerland, Apr. 1, 2006, pp. 1-12.
Hattori et al., "HLS: SEI message for Knee Function Information", Joint Collaborative Team on Video Coding (JCT-VC) of ITU-T SG 16 WP 3 and ISO/IEC JTC 1/SC 29/WG 11, Document JCTVC-P0050, 16th Meeting, San Jose, California, USA, Jan. 9, 2014, pp. 1-21.
Fogg et al., "Indication of SMPTE 2084 and 2085 and carriage of 2086 metadata in HEVC", Joint Collaborative Team on Video Coding (JCT-VC) of ITU-T SG 16 WP 3 and ISO/IEC JTC 1/SC 29/WG 11, Document JCTVC-P0084r1, 16th Meeting, San Jose, California, USA, Jan. 9, 2014, pp. 1-5.
Flynn et al., "High Efficiency Video Coding (HEVC) Range Extensions test specification: Draft 5", Joint Collaborative team on Video Coding (JCT-VC) of ITU-T SG 16 WP 3 and ISO/IEC JTC 1/SC 29/WG 11, Document JCTVC-O1005 v1, 13th Meeting, Incheon, Korea, Apr. 18, 2013, pp. 1-341.
Flynn, D., et. al., "High Efficiency Video Coding (HEVC) Range Extensions text specification: Draft 5". Joint Collaborative Team on Video Coding (JCT-VC) Meeting of ISO/IEC JTC1/SC29/WG11 and ITU-T SG. 16, JCTVC-O1005 v4, Oct. 23-Nov. 1, 2013, pp. 308-315.
International Telecommunication Union, "Parameter Values for the HDTV Standards for Production and International Programme Exchange". BT Series Broadcasting Service, Recommendation ITU-R BT.709-5, Apr. 2002, 32 pages.
International Search Report and Written Opinion of the International Searching Authority for PCT/EP2016/051552 dated Apr. 8, 2016, 14 pages.
International Preliminary Report on Patentability for PCT/EP2016/051552 dated Aug. 1, 2017, 9 pages.

* cited by examiner

METHODS, SYSTEMS AND APPARATUS FOR ELECTRO-OPTICAL AND OPTO-ELECTRICAL CONVERSION OF IMAGES AND VIDEO

This application claims the benefit, under 35 U.S.C. § 365 of International Application PCT/EP2016/051552, filed Jan. 26, 2016, which was published in accordance with PCT Article 21(2) on Aug. 4, 2016, in English, and which claims the benefit of European Application No. 15305092.7 filed Jan. 27, 2015, European Application No, 15305172.7 filed Feb. 6, 2015 and European Application No. 15305690.8 filed May 6, 2015.

TECHNICAL FIELD

The present disclosure relates to image and video processing. In particular, the present disclosure relates to conversion of image or video data to optimize captured light information for human vision.

BACKGROUND

In high dynamic range (HDR) imaging pipelines or video distribution systems, images (also known as pictures or frames) are typically pre-processed prior to encoding and post-processed after decoding. This allows the use of conventional image or video encoding and decoding standards (such as JPEG, AVC or HEVC) to operate on HDR video without requiring important modifications to existing encoding standards, and without requiring higher bit-depths for distribution (typically 10-bit).

The pre-processing of video images may include applying a one dimensional color component transform to linear light RGB components and/or to the luminance components. Such transforms optimize the quantization of captured light information, often by modeling aspects of human vision. One such transform is also known as the Opto-Electrical Transfer Function (OETF). An example of OETF is the gamma function (e.g. described in ITU-R Rec. BT.709).

During the post-processing or rendering stage, the display rendering process compensates for the OETF and the display's illumination environment. The decoded video is processed using an Electro-Optical Transfer Function (EOTF) before rendering the video frames. The EOTF converts a digital code value (also known as codeword) in the decoded signal to a light level of the display. The EOTF is often the mathematical inverse of the OETF, but, depending on the display's requirements, may also be different from the inverse of the OETF. For instance, a standard dynamic range (SDR) video signal OETF is referred in ITU-R Rec. BT.709 as a two-piece function (a linear part and a power function part) however the corresponding EOTF is referred in ITU-R Rec. BT.1886 as a one piece function (power function) different from the inverse OETF.

Presently existing OETF/EOTF are fixed proposals that only provide a single mapping of luminance values to digital code words (OETF), and a single mapping from digital code words back to luminance values (EOTF). Different goals and objectives have given rise to many different, single mapping proposals that advocate the use of mutually-exclusive, fixed mappings. For example, there are several EOTF/OETF pairs that have been proposed for standardization, e.g., ITU-R SG6/W6-C group, Working Party 6C (WP 6C)—Programme production and quality assessment, http://www.itu.int/en/ITU-R/study-groups/rsg6/rwp6c/Pages/defaultaspx. The various EOTF/OETF proposals however have different secondary goals or are addressing different market segment (theatrical release, broadcast or packaged media). Thus, the existing OETF/EOTF functions are not optimized in view of different situations.

SUMMARY OF PRESENT PRINCIPLES

There is thus a need to improve the OETF/EOTF functions.

The present invention proposes to alleviate some of the inconveniences of prior art by providing a solution that allows adaptive modification between different OETF/EOTF curves. Such a solution is needed because each of the prior methods have various disadvantages. For instance, BBC has proposed an OETF curve covering a smaller range of luminance values, but aims to allow near-backward compatibility with legacy ITU-R Recommendation BT.709 (Rec. 709) (Borer, T., *Non-linear Opto-Electrical Transfer Functions for High Dynamic Range Television.* —: BBC, 2013). On the other hand, Dolby has proposed OETF/EOTF (PQ_EOTF) curves covering a very large range from 0.005 to $10^4$ cd/m$^2$ of luminance values (US 2014/0363093; Scott Miller, M. N., Perceptual Signal Coding for More Efficient Usage of Bit Codes. *SMPTE Motion Imaging Journal*, 122, 52-59, 2013). The Dolby proposed curves are matched against a modulation transfer function which is the reciprocal of an elaborate model of human contrast sensitivity (Barten, P. G., Contrast Sensitivity of the Human Eye and its Effects on Image Quality (Vol. 72), Bellingham: SPIE Optical Engineering Press, 1999). In turn, Philips has proposed an OETF curve based on visual inspection of a variety of data (Vleuten, R. v., Philips' High Dynamic Range Proposal. Joint DVB-EBU HDR Workshop, 2014). Some of the proposed OETF/EOTF curves require a fixed bit-depth, while others could be adapted to 10 or 12 bits video signal bit-depth.

Moreover, a need exists for adaptive modification between different OETF/EOTF curves because the amount of possible OETF/EOTF curves is likely to increase in view of the increasing variability of new video format characteristics, services and rendering devices. For example, new definitions of OETF/EOTFs curves will likely be needed for new applications or rendering devices that are directed to specific types of video. It is still unclear what OETF/EOTF will best serve the needs of consumers, display manufacturers, and content producers given that the choices for bit-depth, peak luminance and minimum luminance are still under consideration. As such, a need exists for an adaptive OETF/EOTF that can mimic the behavior of presently proposed or new OETF/EOTF curves.

Moreover, there is a need for adaptive modification between different OETF/EOTF curves in order to avoid interoperability problems. Various OETF/EOTF curve proposals are being considered by various standardization organizations (e.g., ITU-R, BDA, CEA, HDMI, SMPTE). These various organizations are each defining their own HDR video signals based on different OETF/EOTF proposals. These organizations may adopt different EOTF/OETF proposals, resulting in different technical solutions according to the targeted applications and technology maturity. The adoption of different EOTF/OETF curves may result in the problems of market fragmentation, interoperability issues, silicon waste (e.g., due to systems-on-chip (SoC) for different market segments, OTT/VoD/Blu-ray/Broadcast that would have to implement different OETF/EOTF). Thus, there is a need for an adaptive solution that works across different standards and with different OETF/EOTF curves.

There is also a need for a mechanism for signaling OETF/EOTF curves without significant bit-stream overhead. The OETF/EOTF curves may be signaled in coded video streams using various existing syntax, such as the knee function information SEI that is defined in the HEVC standard for instance. The knee function describes the function as piece-wise linear curves whose knee point coordinates are encoded and transmitted in the bit-stream. However, since this information should be regularly inserted in the bit-stream for error resilience considerations, it may induce a significant bit-stream overhead.

The present principles provide a method for encoding a picture, comprising: applying a parameterized transfer function to a luminance (L) signal of the picture to determine a resulting V(L) transformed signal; encoding the resulting V(L); wherein the parameterized transfer function is adjusted based on a plurality of parameters to model one of a plurality of transfer functions.

According to a specific embodiment of the invention, the method comprises signaling an information representative of the parameterized transfer function. According to specific embodiments of the invention, the method comprises encoding the parameters and signaling the encoded parameters in a bit-stream; according to a variant, the method further comprises signaling an indicator of the parameters in a bit-stream based on a set of defined values.

According to specific embodiments, the method comprises signaling an indication based on whether the parameters are signaled explicitly or whether the parameters are signaled implicitly based on a set of defined value. According to various embodiments, the signaling is performed using at least one syntax element included in at least one of a Picture Parameter Set (PPS), a Sequence Parameter Set (SPS), a Supplemental Enhancement Information (SEI) message, a Video Usability Information (VUI) (as defined for example in video compression standards such as AVC or HEVC), Consumer Electronics Association (CEA) message, and a header.

According to various embodiments of the invention, the luminance is at least one selected from a group of: RGB, Y, a linear combination of linear RGB, a luma that is a linear combination of non-linear RGB, and non-linear luminance. According to embodiments of the inventions, the luminance is at least one of a relative luminance and an absolute luminance.

According to specific embodiments of the invention, the parameterized transfer function is determined based on a functional model represented with function:

$$V(L) = \frac{sL^n + c}{L^n + st} + m$$

Where s, t, c, n, and m are the parameters and L is a luminance value of the picture.

According to specific embodiments of the invention, the parameterized transfer function is determined based on a functional model represented with function:

$$V(L) = \frac{sL^n + c}{L^n + st}$$

Where s, t, c, and n are the parameters and L is a luminance value of the picture.

According to specific embodiments of the invention, the parameterized transfer function is determined based on a functional model represented with function:

$$V(L) = \frac{sL + c}{L + st} + m$$

Where s, t, c and m are the parameters and L is a luminance value of the picture.

According to specific embodiments of the invention, encoding the resulting V(L) includes compressing V(L) with a picture or video encoder. According to specific embodiments of the invention, encoding the resulting V(L) includes digitizing or quantizing the resulting V(L). According to specific embodiments of the invention, the parameters are determined based on at least one selected from a group of: a plurality of parameters received from a source, locally stored parameters, a set of defined parameters chosen from among a plurality of sets of defined parameters.

According to various embodiments of the inventions, the picture is in a video stream of pictures. According to a specific embodiment of the invention, the picture is a High Dynamic Range (HDR) picture. According to another embodiment of the invention, the picture is a non High Dynamic Range (non-HDR) picture.

According to various embodiments of the inventions, the parameterized transfer function is based on:

$$V(L) = \frac{s\left(\frac{L-b}{a}\right)^n + c}{\left(\frac{L-b}{a}\right)^n + st} + m$$

wherein c, m, s, n, t, a, b are parameters and V is a codeword.

According to various embodiments of the inventions, the parameterized transfer function is based on:

$$V(L) = k\frac{sL^n + c}{L^n + st} + m$$

wherein c, m, k, s, n, t are parameters and V is a codeword.

According to various embodiments of the inventions, the parameterized transfer function is based on:

$$V(L) = k\frac{s\left(\frac{L-b}{a}\right)^n + c}{\left(\frac{L-b}{a}\right)^n + st} + m$$

wherein s, t, c, n, m, k, a and b are parameters and V is a codeword.

According to various embodiments of the inventions, there is further included a tone mapping of the luminance (L). According to various embodiments of the inventions, the parameterized function has a non-linear end-to-end behavior. According to various embodiments of the inventions, there is further included determining at least a color channel, wherein the luminance is determined for the at least a color channel. The luminance may be determined for one or more of N color channels.

The present principles also provide an apparatus for performing the method of encoding a picture as described above. In particular, the invention concerns an apparatus for encoding a picture, the apparatus comprising: a receiver configured to receive the picture; a processor configured to apply a parameterized transfer function to a luminance (L) signal of the picture to determine a resulting V(L) transformed signal; an encoder configured to the resulting V(L); wherein the parameterized transfer function is adjusted based on a plurality of parameters to model one of a plurality of transfer functions.

The present principles provide for a method for decoding a encoded picture, the method comprising: receiving the encoded picture; applying a parameterized transfer function to the encoded picture to determine a luminance (L) signal of the encoded picture, the parameterized transfer function being based on a plurality of parameters; wherein the parameterized transfer function is adjusted based on a plurality of parameters to model one of a plurality of transfer functions.

According to specific embodiments of the invention, the method comprises decoding an information representative of the parameterized transfer function associated with the encoded picture. This enables the decoding method to identify or determine the parameterized transfer function.

According to an embodiment, the method comprises decoding the parameters and/or an indicator of the parameters from a bit-stream.

According to an embodiment, the method comprises decoding an indication from a bit-stream, the indication based on whether the parameters are signaled explicitly or whether the parameters are signaled implicitly based on a set of defined values.

According to an embodiment, the bit-stream includes signaling of the parameters based on at least one syntax element included in at least one of a Picture Parameter Set (PPS), a Sequence Parameter Set (SPS), a Supplemental Enhancement Information (SEI) message, a Video Usability Information (VUI) (as defined for example in video compression standards such as AVC or HEVC), Consumer Electronics Association (CEA) message, and a header.

According to an embodiment, the parameterized transfer function is determined based on a functional model represented with function:

$$L(V) = \left(\frac{c - (V-m)st}{V-m-s}\right)^{1/n}$$

where s, t, c, n, and m are the parameters and V is a codeword.

According to an embodiment, the parameterized transfer function is determined based on a functional model represented with function:

$$L(V) = \left(\frac{c - (V-m)st}{\min(V-m-s, M)}\right)^{1/n}$$

where s, t, c, n, and m are the parameters, where M is a constant function and V is a codeword.

According to an embodiment, the parameterized transfer function is determined based on a functional model represented with function:

$$L(V) = \left(\frac{c - (V)st}{V-s}\right)^{1/n}$$

where s, t, c, and n are the parameters and V is a codeword.

According to an embodiment, the parameterized transfer function is determined based on a functional model represented with function:

$$L(V) = \left(\frac{c - Vst}{\min(V-s, M)}\right)^{1/n}$$

where s, t, c, and n are the parameters, where M is a constant function and V is a codeword representative of the encoded picture.

According to an embodiment, the parameterized transfer function is based on:

$$L(V) = a\left(\frac{c - (V-m)st}{V-m-s}\right)^{1/n} + b$$

wherein c, m, s, n, t, a, b are parameters and V is a codeword.

According to an embodiment, the parameterized transfer function is based on:

$$L(V) = \left(\frac{c - \left(\frac{V-m}{k}\right)st}{\frac{V-m}{k} - s}\right)^{\frac{1}{n}}$$

wherein c, m, k, s, n, t are parameters and V is a codeword.

According to an embodiment, the parameterized transfer function is based on:

$$L(V) = a\left(\frac{c - \left(\frac{V-m}{k}\right)st}{\frac{V-m}{k} - s}\right)^{\frac{1}{n}} + b$$

wherein s, t, c, n, m, k, a and b are parameters and V is a codeword.

According to an embodiment, the parameterized transfer function is based on:

$$L(V) \approx \left(\frac{-Vu}{V - V_{max}(1+u)}\right)^{1/n}$$

wherein $V_{max}$, u and n are parameters.

According to various embodiments of the present invention, an optimization algorithm is utilized to determine the parameters u and n. The values of the parameters u and n may be determined based on a reference curve that is based on luminance/codeword pairs $(L_i, V_i)$. The values of the parameters u and n may be determined by adding non-uniform weights to the luminance/codeword pairs $(L_i, V_i)$.

According to various embodiments of the inventions, the parameterized function performs inverse tone mapping. According to various embodiments of the inventions, the parameterized function has a non-linear end-to-end behavior. According to various embodiments of the inventions, there is further included determining at least a color channel, wherein the luminance is determined for the at least a color channel. The luminance may be determined for one or more of N color channels.

The present principles also provide an apparatus for performing the method of decoding an encoded picture as described above. According to an embodiment of the invention, an apparatus for decoding an encoded picture, the apparatus comprising: a receiver configured to receive the encoded picture; a processor configured to decode the encoded picture to a decoded picture and to apply a parameterized transfer function to the decoded picture to determine a luminance (L) signal of the encoded picture, the parameterized transfer function being based on a plurality of parameters; wherein the parameterized transfer function is adjusted based on a plurality of parameters to model one of a plurality of transfer functions.

According to embodiment of the methods for encoding or decoding or of apparatus for encoding or decoding the parameters are generated by optimizing a parameterized transfer function with an identified transfer function to be modeled.

According to an embodiment, there is a parameter that allows the parameterized transfer function to determine a desired value of the luminance L based on a smallest value of a codeword V. According to an embodiment, there is a parameter that allows the parameterized transfer function to determine a desired value of the luminance L based on a highest value of a codeword V. According to an embodiment, there is a parameter that allows the parameterized transfer function to determine a desired value of V(L) based on a smallest value of the luminance L.

According to an embodiment, there is a parameter that allows the parameterized transfer function to determine a desired value of V(L) based on a highest value of the luminance L.

The present principles also provide a computer readable storage medium having stored thereon instructions for pre-processing or post-processing images according to the methods described above.

The present principles also provide a computer readable storage medium having stored thereon a bit-stream generated according to the methods described above.

BRIEF SUMMARY OF THE DRAWINGS

The features and advantages of the present invention may be apparent from the detailed description below when taken in conjunction with the Figures described below.

DETAILED DESCRIPTION

Figure 1:
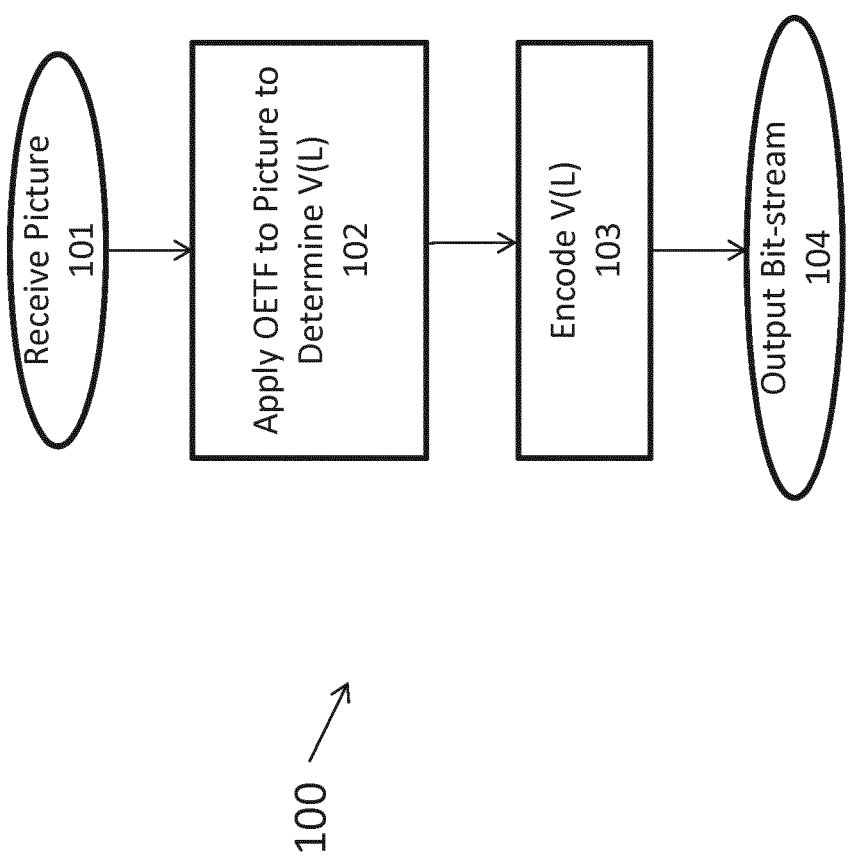
FIG. 1 is a diagram depicting an exemplary method of encoding a picture using OETF in a capture and distribution workflow.

The present principles are directed to parameterized OETF and EOTF for processing images and video. In particular, the present principles are directed to a pair of OETF/EOTF curves based on a plurality of parameters that allow the OETF/EOTF curves to model the behavior of a selected current standard OETF/EOTF proposals, future standard OETF/EOTF or custom OETF/EOTF proposals.

The present principles are directed to providing OETF/EOTF that can adapt to a variety of markets, cases and/or uses. The OETF/EOTF is adaptive based on a plurality of parameters that can be changed or adjusted to allow the OETF/EOTF to dynamically adapt to content. The parameter settings can be derived, for instance per content, per movie, or per frame, and these can be communicated as metadata for decoding on the display side (e.g. using a metadata channel through an HDMI link).

The present principles are directed to an adaptive OETF/EOTF pair that can adapt to successive rounds of standardization, thus providing an upgrade path or enabling forward compatibility. Parameters can be derived for any required bit-depth, peak luminance and black level. Thus, in static scenarios it is possible to standardize one set of parameters now to match current market needs, and in the future different sets of parameters can be standardized to match future market trends in terms of bit-depth, peak luminance and black level.

The present principles are directed to an adaptive OETF/EOTF pair that is compatible with existing proposals through the appropriate choice of parameters.

The present principles are directed to OETF/EOTF optimized against modulation transfer functions and look-up tables modeling human vision.

The present principles also provide parameters to match the performance of a variety of use cases, such as content graded for OTT streaming, broadcast, distribution via Blu-Ray disks or DVDs and others. The parameters of the adaptive OETF/EOTF pair can be set to allow optimal encoding for each distribution mechanism. They can also be set to match existing OETF/EOTF proposals.

The present principles are directed to a novel variant of the Naka-Rushton equation for the purpose of determining quantization levels of HDR image and video data. In one example, the proposed OETF is:

$$V(L) = \frac{sL^n + c}{L^n + st} + m \qquad \text{Eqn. No. 1}$$

The input to Eqn. No. 1 is given by either absolute or relative luminance values L, while the output V can be quantized to the desired bit-depth. In one example, the luminance value L may be $0<L<=1$. In one example, the luminance value L may be $0<=L<=4$. In one example, the luminance value L may be $0.005<=L<=10^4$. In one example, the desired bit-depth may be 10-bits.

Luminance may be RGB, Y where Y is a color channel representing luminance in a color space including at least one of CIE Yxy, CIE Yuv, EBU Y'U'V', NTSC Y'I'Q', ITU-R BT.601 Y'PbPr, ITU-R BT.709 Y'CbCr, SECAM Y'DbDr, and Kodak Y'CC, L where L is a luminance channel in a color space including at least one of CIE Lab and CIE Luv, I where I is the luminance related channel in the IPT color space, V, where V is the value in the HSV color space, B where B is the brightness in the HSB color space, and I where I is the intensity channel in the HSI color space. Luminance may also be a linear combination of linear RGB, or a luma that is a linear combination of nonlinear RGB. Luminance may also be Linear Color Value as defined by SMPTE ST2084 standard, luminance as defined by ITU-R, e.g. BT.709-5, or non-linear luminance, e.g. after application of tone mapping to pixel values.

The parameters s, t, c, n and m in Eqn. No. 1 may be set for each proposed OETF/EOTF proposal or for particularly foreseen use scenarios or workflows. Alternatively, the parameters may be set dynamically (e.g. per frame or per sequence) based on video content. In that case, the parameters would have to be sent along the video stream as meta-data to enable appropriate decoding by the receiver. The parameters s, t, c, n and m in Eqn. No. 1 may be set such that the output V(L) of Eqn. No. 1 is normalized to a desired range. In one example, the range of values taken by V(L) is $0<=V(L)<=1$. In one example, the range of values taken by V(L) is $0<=V(L)<=4096$ and corresponds to a 12-bit full-range encoding. In one example the range of values taken by V(L) is $64<=V(L)<=960$ and corresponds to 10-bit legal range. The parameters may be received from a source (e.g. a network, a link (e.g., HDMI), an application, a man/machine interface). The parameters may be locally stored (e.g., a defined set of parameters that is pre-determined). The parameters may be a set of pre-defined parameters chosen from among a plurality of sets of pre-defined parameters, where each set may relate to a parameterized transfer function that may relate to a video content property or application (e.g., Blu-ray, DVB, HDMI, CEA, ATSC).

The inverse equation of the proposed OETF can then be used after decoding to restore the original luminance levels. This inverse equation may be the EOTF. Thus, the proposed EOTF or inverse OETF is:

$$L(V) = \left(\frac{c - (V-m)st}{V - m - s}\right)^{1/n} \qquad \text{Eqn. No. 2}$$

V may correspond to video codewords. V may be a Non-linear Color Value as defined by SMPTE ST2084 standard or an electrical signal as defined by ITU-R, e.g. BT.709-5. V may also be the output of Eqn. No. 1.

The parameters s, t, c, n and m are the same parameters utilized by Eqn. No. 2 as the parameters utilized by Eqn. No. 1. The parameters may be sent along with the video stream as meta-data or may be signaled in the bitstream.

In one example, to avoid negative values or divisions by zero, Eqn. No. 2 can be modified to read:

$$L(V) = \left(\frac{c - (V-m)st}{\min(V - m - s, M)}\right)^{1/n} \qquad \text{Eqn. No. 3}$$

M is a constant and is, for example equal to $(-10^4)$. In one example, the constant M was chosen to be the negative of a value one order of magnitude below a reasonable minimum luminance value that may need to be reproduced, V-m-s being usually negative. If Eqn. No. 3 is used with relative inputs, then this constant may be chosen to be either larger or smaller, depending on the use case.

The above Equations Nos. 1-3 can be parameterized to achieve various goals. That is, image and video processing may be performed utilizing the Eqns. Nos. 1-3 and provided values for the parameters to achieve certain goals. Different sets of parameters (e.g., different sets of parameters (s, t, c, n and m)) may each achieve different goals. For example, some goals that may be achieved by different parameter sets may include:

matching/modeling Barten's contrast sensitivity measurements for any reasonable luminance range and bit-depth;

matching/modeling SMPTE ST 2084 curves;

matching/modeling the proposed Philips OETF/EOTF; and matching/modeling ARIB STD-B67 curves (referred herein as BBC/NHK or BBC curves).

As the OETF equation is analytically invertible, applying the OETF followed by the dual inverse OETF (EOTF in this case) will return the original input values, with the exception of small changes that may occur due to quantization artifacts. For certain settings of the parameters, it can also be shown that the OETF applied twice will yield a function of the same form as the original. Thus, for those parameters, the equation is idempotent as further described below.

Finally, the same equation can be used for tone mapping or tone reproduction. This means that applying the OETF at the encoder side yields a viewable image, suitable for display on legacy devices. If the target display is a legacy SDR device (e.g. responding to BT.709 OETF and using BT.1886 EOTF), then it would be possible to decode the video stream, without passing the resulting data through the proposed inverse OETF function. The latter would only be necessary if the target display is an HDR device.

Example 1

An aspect of present principles is directed to a pair of OETF/EOTF curves described utilizing a generic model and a set of parameters. Adjusting the parameters adjusts the generic model of the OETF/EOTF curves such that the generic model can perform similarly to one of a plurality of standard or custom OETF/EOTF pairs. The parameters can be signaled in a bit-stream (e.g. defined by MPEG distribution standards or defined by applicative standardization committees such as ATSC, BDA, DVB) or a video signal standard specification (e.g. ITU-R, SMPTE, CEA, HDMI) in order for the decoder/rendering device to be able to reconstruct the inverse OETF or EOTF.

Example 2

In one example in accordance with present principles, the generic model of OETF/EOTF may be based on Eqn. Nos. 1-3 described above.

One example of the generic model OETF may be based on Eqn. No. 1:

$$V(L) = \frac{sL^n + c}{L^n + st} + m \qquad \text{Eqn. No. 1}$$

One example of the generic model inverse OETF or EOTF may be based on Eqn. No. 2:

$$L(V) = \left(\frac{c - (V-m)st}{V - m - s}\right)^{1/n} \qquad \text{Eqn. No. 2}$$

One example of the generic model inverse OETF or EOTF may be based on Eqn. No. 3:

$$L(V) = \left(\frac{c - (V-m)st}{\min(V - m - s, M)}\right)^{1/n} \qquad \text{Eqn. No. 3}$$

M is a constant and is, for example equal to $(-10^4)$.

Example 3

In one example in accordance with present principles, an alternate form of the generic OETF model comprising only four parameters can be constructed as follows:

$$V(L) = \frac{sL^n + c}{L^n + st} \qquad \text{Eqn. No. 4}$$

An alternate form of the generic inverse OETF or EOTF model comprising only four parameters and corresponding to Eqn. No. 4 can be constructed as follows:

$$L(V) = \left(\frac{c - Vst}{\min(V - s, m)}\right)^{1/n} \qquad \text{Eqn. No. 5}$$

M is a constant and is, for example equal to $(-10^4)$. In Equation no 5, according to different implementations of the invention, n is a variable parameter or has a fixed value, e.g. equal to 1.

Example 4

An alternate form of the generic inverse OETF or EOTF model comprising only four parameters and corresponding to Eqn. No. 4 can be constructed as follows:

$$L(V) = \left(\frac{c - Vst}{V - s}\right)^{1/n} \qquad \text{Eqn. No. 6}$$

Example 5

In one example in accordance with present principles, an alternate form of the generic OETF/EOTF pairs may be used for a tone mapping use case that may occur as follows.

In one example, in post-production the director of photography and the colorist can produce a HDR grade of some content. Grading a picture (or a video) is a process of altering/enhancing the colors of the picture (or the video) in order to instill an artistic intent for a given target application (e.g., theatrical release, home entertainment, broadcast). To encode this HDR video signal footage, the OETF can be used directly, where the OETF may be based on those as described in Eqn. Nos. 1 and 4.

A low dynamic range grade can then be derived using a specific tone mapping or tone reproduction operator (TMO). A TMO typically maps a picture or image's original range of luminance values to a lower range of luminance values that can be reproduced by a display. For example, a TMO may map a dynamic range of an HDR grade into a standard dynamic range (SDR) grade. Often, but not always, tone mapping or tone reproduction is carried out on a luminance channel that is derived from the original color picture or image.

In one example, any TMO may be used. In another example, the TMO may be based on the following equation:

$$T(L) = \frac{sL^n + c}{L^n + st} + m \qquad \text{Eqn. No. 7}$$

This is a TMO that is of the same form as the proposed OETF.

The resulting tone mapped content T(L) may then be encoded for distribution (using for instance an MPEG video coding standard like AVC or HEVC or e.g., JPEG for a single picture). A slight variant of the OETF can then be applied to the tone-mapped content T(L), prior to encoding for distribution. This variant of the OETF is:

$$V(L) = \frac{aL + u}{L + ab} + k \qquad \text{Eqn. No. 8}$$

Note that here the OETF and the TMO are of the same form, except that the exponent n has been removed in the OETF. If the TMO is applied first and then the OETF is applied, it is possible to show that the final result has the same form as the tone-mapped content, i.e.:

$$V(T(L)) = \frac{\frac{as + am + u}{s + m + ab}L^n + \frac{ac + stam + stu}{s + m + ab}}{L^n + \frac{c + stm + stab}{s + m + ab}} + k \qquad \text{Eqn. No. 9}$$

As all variables except L are constants, this equation is of the form:

$$V(T(L)) = \frac{a'L^n + u'}{L^n + a'b'} + k \qquad \text{Eqn. No. 10}$$

In this scenario, parameters s, t, c and m could be set by the colorist to instill the creative intent. As the result after applying the OETF, i.e. V(T(L)), has the same functional form as T(L), it can be seen that the director's intent is not affected as a result of applying the OETF.

The colorist would not have access to the exponent n, although it is part of the TMO. The parameters a, b, u, k as well as n would be provided to allow optimal encoding and transmission of the signal T(L).

In this scenario, to match the director's intent, the parameters a', b' and u' in Eqn. 10 would be set to match the corresponding constants in Eqn. 9. This leads to three equations with three unknowns, namely a, b and u. Solving this system of three equations gives:

$$a = \frac{s^2 t(u' - a'st)}{u' - s^3 t^2 - a'b'c - a'st - cst + a'b's^2 t}$$

$$-(mu' + su' - a'^{s^2}t - ms^3t^2 - a'mst + cmst +$$

$$b = \frac{a'b's^3t - a'b'cm - a'b'cs + a'b'ms^2t)}{s^2t(u' - a'st)}$$

$$u = \frac{s^2t(a'c - mu' - su' + a'mst)}{u' - s^3t^2 - a'b'c - a'st + cst + a'b's^2t}$$

These values for a, b and u (as well as k) can be used in Eqn. 8 to apply a suitable OETF to the tone mapped content T(L).

Example 6

In one example in accordance with present principles, a flag can be advantageously signaled to indicate if the OETF/EOTF parameters are signaled explicitly or derived from an index value or an indicator corresponding to a set of pre-defined values of parameters corresponding to matching/existing OETF/EOTF pairs. In one example, the syntax for such signaling may comprise of the following:

TABLE 1

Example of syntax for coding the Generic OETF/EOTF parameters.

| | |
|---|---|
| transfer_function_bit_depth_minus8 | u(4) |
| transfer_function_type_flag | u(1) |
| transfer_function_predefined_flag | u(1) |
| if( transfer_function_predefined_flag ) | |
| transfer_function_predefined_idc | u(8) |
| else { | |
| tf_log2_denom | u(10) |
| tf_param_s | u(10) |
| tf_param_t | u(10) |
| tf_param_c | u(10) |
| tf_param_n | u(10) |
| tf_param_m | u(10) |
| } | |

The associated semantics may be defined as follows:

transfer_function_bit_depth_minus8 plus 8 specifies the bit depth of the luma and chroma component or the luminance component or the RGB component of the associated pictures for purposes of interpretation of transfer function metadata:
bit_depth=transfer_function_bit_depth_minus8+8 transfer_function_type_flag equal to 0 indicates that the curve model/transfer function characterizes an EOTF. transfer_function_type_flag equal to 1 indicates that the curve model/transfer function characterizes an OETF. When transfer_function_type_flag is not present transfer_function_type_flag is inferred to be equal to 0.

transfer_function_predefined_flag equal to 1 indicates that the syntax element transfer_function_predefined_idc is present. transferfunction_predefined_flag equal to 0 indicates that syntax element transfer_function_predefined_idc is not present (the transfer function model parameters are coded explicitly).

The semantic of transfer_function_predefined_idc may be defined in Error! Reference source not found.

TABLE 2

Semantic of transfer_function_predefined_idc.

| transfer_function_predefined_idc | Predefined transfer function model |
|---|---|
| 0 | Barten's curve |
| 1 | SMPTE ST 2084 TF (PQ TF) |
| 2 | BBC TF |
| 3 | Philips TF |
| 4 . . . 255 | For future use by ITU-T|ISO/IEC |

The association of transfer_function_predefined_idc and transfer_function_type_flag may allow the determination of which EOTF or OETF is modeled.

tf_log 2_denom specifies the base 2 logarithm of the denominator for all parameters (tf_param_s, tf_param_t, tf_param_c, tf_param_n, tf_param_m). The value of tf_log 2_denom shall be in the range of 0 to 15, inclusive. When not present, the value of tf_log 2_denom is inferred to be equal to 0.

Alternatively, signaling in a standard (e.g., HEVC/H.265, AVC/H.264, MPEG-2, JPEG or any present or future amendments), may be inserted in a VUI/SPS/PPS/SEI syntax/structure.

Example 7

In one example, an aspect of present principles is directed to generic Transfer Function (TF) model parameters that may change depending on the pictures' bit-depths. In that case, one can signal the pre-defined values of parameters:
  by adding entries into Table 2 resulting into Table 3 below, such as, for example below for "Barten's curve" and SMPTE ST 2084 transfer function:

TABLE 3

Semantic of transfer_function_predefined_idc - variant

| transfer_function_predefined_idc | Predefined transfer function model |
|---|---|
| 0 | Barten's curve (10 bits) |
| 1 | Barten's curve (12 bits) |
| 2 | SMPTE ST_2084 TF (10 bits) |
| 3 | SMPTE ST 2084 TF (12 bits) |
| 4 | BBC EOTF |
| 5 | Philips EOTF |
| 6 . . . 255 | For future use by ITU-T|ISO/IEC | or by selecting the pre-defined parameters as combination of bit_depth and transfer_function_predefined_idc.

Advantageously, the syntax element size used to encode the parameters may be different for some parameters.

Advantageously, the number of parameters may be variable and indicated in the syntax (see tf_num_param_minus1 in example depicted in Table 4).

Advantageously, the parameter tf_log 2_denom may be specified for each parameter:

TABLE 4

Example of syntax for coding the Generic TF parameters.

| | |
|---|---|
| transfer_function_bit_depth_minus8 | u(4) |
| transfer_function_type_flag | u(1) |
| transfer_function_predefined_flag | u(1) |
| if( transfer_function_predefined_flag ) | |
|    transfer_function_predefined_idc | u(8) |
| else { | |
|    tf_num_param_minus1 | u(3) |
|    for ( i=0 ; i<= tf_num_param_minus1; i++) { | |
|       tf_log2_denom[i] | u(10) |
|       tf_param_value[i] | se(v) |
|    } | |
| } | |

The semantics of tf_num_param_minus1 may be defined as follows:
tf_num_param_minus1 plus 1 specifies the number of parameter values defining the transfer function.

Advantageously, the parameter tf_log 2_denom is not signaled for each parameter but is present in the semantics (Table 5).

Advantageously, the syntax element size of each parameter is not fixed and may be indicated with a syntax element or can be coded with Variable Length Codes (ex: u(v), se(v), ue(v), ae(v) . . . as defined in AVC/H.264 or HEVC/H.265).

TABLE 5

Example of syntax for coding the Generic TF parameters.

| | |
|---|---|
| transfer_function_bit_depth_minus8 | u(4) |
| transfer_function_type_flag | u(1) |
| transfer_function_predefined_flag | u(1) |
| if( otransfer_function_predefined_flag ) | |
|    transfer_function_predefined_idc | u(8) |

TABLE 5-continued

Example of syntax for coding the Generic TF parameters.

| | |
|---|---|
| else { | |
|    tf_num_param_minus1 | u(3) |
|    for ( i=0 ; i<= tf_num_param_minus1; i++ ) | |
|       tf_param_value[i] | se(v) |
| } | |

Example 8

In one example, an aspect of present principles is directed to, in a video bit-stream, defining the parameters in an SEI of HEVC or AVC video coding standard (Table 6). As an example, the syntax is based on Table 4 however it could be directly extended to Table 1 or Table 5 or other derived syntax structure.

TABLE 6

Example of syntax for coding the Generic TF parameters in an SEI message.

| | |
|---|---|
| transfer_function_info( payloadSize ) { | |
|    transfer_function_id | ue(v) |
|    transfer_function_cancel_flag | u(1) |
|    if( !transfer_function_cancel_flag ) { | |
|       transfer_function_persistence_flag | u(1) |
|       transfer_function_bit_depth_minus8 | u(4) |
|       transfer_function_type_flag | u(1) |
|       transfer_function_predefined_flag | u(1) |
|       if( transfer_function_predefined_flag ) | |
|          transfer_function_predefined_idc | u(8) |
|       else { | |
|          tf_num_param_minus1 | u(3) |
|          for ( i=0 ; i<= tf_num_param_minus1; i++ ) { | |
|             tf_log2_denom[i] | u(10) |
|             tf_param_value[i] | se(v) |
|          } | |
|       } | |
|    } | |
| } | |

Supplemental semantics associated with new syntax elements with regards to Table 6 is defined as follows:
transfer_function_id contains an identifying number that may be used to identify the purpose of the transfer function information. The value of transfer_function_id shall be in the range of 0 to $2^{32}-2$, inclusive.
transfer_function_cancel_flag equal to 1 indicates that the transfer function information SEI message cancels the persistence of any previous transfer function SEI message in output order that applies to the current layer. transfer_function_cancel_flag equal to 0 indicates that transfer function information follows.
transfer_function_persistence_flag specifies the persistence of the transfer function information SEI message for the current layer. transfer_function_persistence_flag equal to 0 specifies that the transfer function information applies to the current picture only.

In one example, let picA be the current picture. transfer_function_persistence_flag equal to 1 specifies that the transfer function information persists for the current layer in output order until either of the following conditions is true:
  A new CLVS of the current layer begins.
  The bitstream ends.
  A picture picB in the current layer in an access unit containing a transfer function information SEI message with the same value of transfer_function_id and applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

transfer_function_cancel_flag and transfer_function_persistence_flag supplemental syntax elements in Table 6 enable dealing with dynamic adaptation of the transfer function which parameters can change over time (per sequence or per picture . . . ) or which parameters can stay persistent (per sequence or per picture . . . ). In another embodiment those syntax elements may not be present (persistence managed directly in the semantics).

Example 9

In one example, an aspect of present principles is directed to, in a video bit-stream, defining the parameters in a picture parameter set (PPS). As an example, the syntax is based on Table 4 however it could be directly extended to Table 1 or Table 5 or other derived syntax structure. The fields with a *** are new in comparison with existing syntax of HEVC.

TABLE 7

Example of syntax for adding the Generic TF parameters in a PPS.

| | Descriptor |
|---|---|
| pic_parameter_set_rbsp( ) { | |
|   pps_pic_parameter_set_id | ue(v) |
|   pps_seq_parameter_set_id | ue(v) |
|   ... | |
|   pps_extension_present_flag | u(1) |
|   if( pps_extension_present_flag ) { | |
|     pps_range_extension_flag | u(1) |
|     pps_multilayer_extension_flag | u(1) |
| ***   pps_hdr_extension_flag | u(1) |
| ***   pps_extension_5bits | u(5) |
|   } | |
|   if( pps_range_extension_flag ) | |
|     pps_range_extension( ) | |
|   if( pps_multilayer_extension_flag ) | |
|     pps_multilayer_extension( ) /* specified in Annex F */ | |
| *** if( pps_hdr_extension_flag) | |
| ***   pps_hdr_extension( ) /* specified in Annex X*/ | |
|   if( pps_extension_5bits ) | |
|     while( more_rbsp_data( ) ) | |
|       pps_extension_data_flag | u(1) |
|   rbsp_trailing_bits( ) | |
| } | |

Semantics of new syntax elements are:

pps_hdr_extension_flag equal to 1 specifies that the pps_hdr_extension( ) syntax structure is present in the PPS RBSP syntax structure. pps_hdr_extension_flag equal to 0 specifies that this syntax structure is not present. When not present, the value of pps_hdr_extension_flag is inferred to be equal to 0.

pps_extension_5bits: Because 1 bit is added for pps_hdr_extension_flag, change pps_extension_6bit in H.265/HEVC specification to pps_extension_5bits for the purpose of byte alignment.

Note that extension flags such as pps_extension_5bits provides flexibility for the standard to extend while keeping backward compatibility for devices implementing a previous version of the standard. New features added in extension parts will be read by new devices implementing the new standard while legacy devices implementing former standard versions will just discard those flags.

TABLE 8

Example of syntax for coding the Generic TF parameters in a PPS.

| | Descriptor |
|---|---|
| ***pps_hdr_extension( ) { | |
| ***transfer_function_bit_depth_minus8 | u(4) |
| ***transfer_function_type_flag | u(1) |
| ***transfer_function_predefined_flag | u(1) |
| ***if( transfer_function_predefined_flag ) | |
| ***    transfer_function_predefined_idc | u(8) |
| ***else { | |
| ***    tf_num_param_minus1 | u(3) |
| ***    for ( i=0 ; i<= tf_num_param_minus1; i++ ) { | |
| ***        tf_log2_denom[i] | u(10) |
| ***        tf_param_value[i] | se(v) |
| ***    } | |
| ***} | |

Example 10

In one example, an aspect of present principles is directed to, in a video bit-stream, defining the parameters in a sequence parameter set (SPS). As an example, the syntax is based on Table 4 however it could be directly extended to Table 1 or Table 5 or other derived syntax structure.

TABLE 9

Example of syntax for adding the Generic TF parameters in a SPS.

| | Descriptor |
|---|---|
| seq_parameter_set_rbsp( ) { | |
|   sps_video_parameter_set_id | u(4) |
|   sps_max_sub_layers_minus1 | u(3) |
|   sps_temporal_id_nesting_flag | u(1) |
|   profile_tier level( 1, sps_max sub_layers_minus1 ) | |
|   sps_seq_parameter_set_id | ue(v) |
|   chroma_format_idc | ue(v) |
|   ... | |
|   sps_extension_present_flag | u(1) |
|   if( sps_extension_present flag) { | |
|     sps_range_extension_flag | u(1) |
|     sps_multilayer_extension_flag | u(1) |
| ***   sps_hdr_extension_flag | u(1) |
| ***   sps_extension_5bits | u(5) |
|   } | |
|   if( sps_range_extension_flag ) | |
|     sps_range_extension( ) | |
|   if( sps_multilayer_extension_flag ) | |
|     sps_multilayer_extension( ) /* specified in Annex F */ | |
| *** if( sps_hdr_extension_flag ) | |
| ***   sps_hdr_extension( ) /* specified in Annex X */ | |
|   if( sps_extension_5bits ) | |
|     while( more_rbsp_data( ) ) | |
|       sps_extension_data_flag | u(1) |
|   rbsp_trailing_bits( ) | |
| } | |

TABLE 10

Example of syntax for coding the Generic TF parameters in a SPS.

| | Descriptor |
|---|---|
| ***sps_hdr_extension( ) { | |
| ***transfer_function_bit_depth_minus8 | u(4) |
| ***transfer_function_type_flag | u(1) |
| ***transfer_function_predefined_flag | u(1) |
| ***if( transfer_function_predefined_flag ) | |
| ***    transfer_function_predefined_idc | u(8) |
| ***else { | |
| ***    tf_num_param_minus1 | u(3) |
| ***    for ( i=0 ; i<= tf_num_param_minus1; i++ ) { | |

TABLE 10-continued

Example of syntax for coding the Generic TF parameters in a SPS.

| | Descriptor |
|---|---|
| ***       tf_log2_denom[i] | u(10) |
| ***       tf_param_value[i] | se(v) |
| ***     } | |
| ***} | |

Example 11

In one example, an aspect of present principles is directed to, in a video bit-stream, the indicating the parameters and defining them in the Video Usability Information (VUI). As an example, the syntax is based on Table 4, although it could be directly extended to Table 1 or Table 5 or any other derived syntax structure.

TABLE 11

Example of syntax for coding the Generic TF parameters in a VUI.

| | Descriptor |
|---|---|
| vui_parameters( ) { | |
|     aspect_ratio_info_present_flag | u(1) |
|     if( aspect_ratio_info_present_flag ) { | |
|         aspect_ratio_idc | u(8) |
|         if( aspect_ratio_idc = = EXTENDED_SAR ) { | |
|             sar_width | u(16) |
|             sar_height | u(16) |
|         } | |
|     } | |
| ... | |

TABLE 11-continued

Example of syntax for coding the Generic TF parameters in a VUI.

| | Descriptor |
|---|---|
|     bitstream_restriction_flag | u(1) |
|     if( bitstream_restriction_flag ) { | |
|         tiles_fixed_structure_flag | u(1) |
|         motion_vectors_over_pic_boundaries_flag | u(1) |
|         restricted_ref_pic_lists_flag | u(1) |
|         min_spatial_segmentation_idc | ue(v) |
|         max_bytes_per_pic_denom | ue(v) |
|         max_bits_per_min_cu_denom | ue(v) |
|         log2_max_mv_length_horizontal | ue(v) |
|         log2_max_mv_length_vertical | ue(v) |
|     } | |
| ***     transfer_function_present_flag | u(1) |
| ***     if( transfer_function_present_flag) { | |
| ***         transfer_function_ bit_depth_minus8 | u(4) |
| ***         transfer_function_type_flag | u(1) |
| ***         transfer_function_predefined_flag | u(1) |
| ***         if( transfer_function_predefined_flag ) | |
| ***             transfer_function_predefined_idc | u(8) |
| ***         else { | |
| ***             tf_num_param_minus1 | u(3) |
| ***             for( i=0 ; i<= tf_num_param_minus1 ; i++) { | |
| ***                 tf_log2_denom[i] | u(10) |
| ***                 tf_param_value[i] | se(v) |
| ***             } | |
| ***         } | |
| ***     } | |
| ***  } | |

As another example, the transfer characteristics semantics may be updated. Typically, Table E.4 of HEVC/H.265 may be updated to incorporate an embodiment of fixed parameters of the generic EOTF/OETF (that may be referred or fixed in an ITU-R or SMPTE standard) as follows:

TABLE 12

Update of transfer characteristics example

| Value | Transfer Characteristic | | Informative Remark |
|---|---|---|---|
| 0 | Reserved | | For future use by ITU-T | ISO/IEC |
| 1 | $V = \alpha * L_c^{0.45} - (\alpha - 1)$ | for $1 >= L_c >= \beta$ | Rec. ITU-R BT.709-5 |
| | $V = 4.500 * L_c$ | for $\beta > L_c >= 0$ | Rec. ITU-R BT. 1361 conventional colour gamut system (functionally the same as the values 6, 14, and 15) |
| 2 | Unspecified | | Image characteristics are unknown or are determined by the application. |
| 3 | Reserved | | For future use by ITU-T | ISO/IEC |
| 4 | Assumed display gamma 2.2 | | Rec. ITU-R BT.470-6 System M (historical) United States National Television System Committee 1953 Recommendation for transmission standards for colour television United States Federal Communications Commission Title 47 Code of Federal Regulations (2003) 73.682 (a) (20) Rec. ITU-R BT.1700 (2007 revision) 625 PAL and 625 SECAM |
| 5 | Assumed display gamma 2.8 | | Rec. ITU-R BT.470-6 System B, G (historical) |
| 6 | $V = \alpha * L_c^{0.45} - (\alpha - 1)$ | for $1 >= L_c >= \beta$ | Rec. ITU-R BT.601-6 525 or 625 |
| | $V = 4.500 * L_c$ | for $\beta > L_c >= 0$ | Rec. ITU-R BT.1358 525 or 625 Rec. ITU-R BT.1700 NTSC Society of Motion Picture and Television Engineers 170M (2004) (functionally the same as the values 1, 14, and 15) |
| 7 | $V = \alpha * L_c^{0.45} - (\alpha - 1)$ | for $1 >= L_c >= \beta$ | Society of Motion Picture and |
| | $V = 4.0 * L_c$ | for $\beta > L_c >= 0$ | Television Engineers 240M (1999) |
| 8 | $V = L_c$ | for all values of $L_c$ | Linear transfer characteristics |

TABLE 12-continued

Update of transfer characteristics example

| Value | Transfer Characteristic | | Informative Remark |
|---|---|---|---|
| 9 | $V = 1.0 + \text{Log}10(L_c) \div 2$ | for $1 >= L_c >= 0.01$ | Logarithmic transfer characteristic |
|   | $V = 0.0$ | for $0.01 > L_c >= 0$ | (100:1 range) |
| 10 | $V = 1.0 + \text{Log}10(L_c) \div 2.5$ | for $1 >= L_c >= \text{Sqrt}(10) \div 1000$ | Logaritlunic transfer characteristic |
|   | $V = 0.0$ | for $\text{Sqrt}(10) \div 1000 > L_c >= 0$ | (100 * Sqrt(10):1 range) |
| 11 | $V = \alpha * L_c^{0.45} - (\alpha - 1)$ | for $L_c >= \beta$ | IEC 61966-2-4 |
|   | $V = 4.500 * L_c$ | for $\beta > L_c > -\beta$ | |
|   | $V = -\alpha * (-L_c)^{0.45} - (\alpha - 1)$ | for $-\beta >= L_c$ | |
| 12 | $V = \alpha * L_c^{0.45} - (\alpha - 1)$ | for $1.33 > L_c >= \beta$ | Rec. ITU-R BT.1361 extended colour |
|   | $V = 4.500 * L_c$ | for $\beta > L_c >= -\gamma$ | gamut system |
|   | $V = -(\alpha * (-L_c)^{0.45} - (\alpha - 1)) \div 4$ | for $-\gamma > L_c >= 0$ | |
| 13 | $V = \alpha * L_c^{(1 \div 2.4)} - (\alpha - 1)$ | for $1 >= L_c >= \beta$ | IEC 61966-2-1 (sRGB or sYCC) |
|   | $V = 12.92 * L_c$ | for $\beta > L_c >= 0$ | |
| 14 | $V = \alpha * L_c^{0.45} - (\alpha - 1)$ | for $1 >= L_c >= \beta$ | Rec. ITU-R BT.2020 |
|   | $V = 4.500 * L_c$ | for $\beta > L_c >= 0$ | (functionally the same as the values 1, 6, and 15) |
| 15 | $V = \alpha * L_c^{0.45} - (\alpha - 1)$ | for $1 >= L_c >= \beta$ | Rec. ITU-R BT.2020 |
|   | $V = 4.500 * L_c$ | for $\beta > L_c >= 0$ | (functionally the same as the values 1, 6, and 14) |
| 16 | $V = ((c_1 + c_2 * L_c^n) \div (1 + c_3 * L_c^n))^m$ for all values of $L_c$ | | Society of Motion Picture and Television Engineers ST 2084 for 10, 12, 14, and 16-bit systems. |
|   | $c_1 = c_3 - c2 + 1 = 3424 \div 4096 = 0.8359375$ | | |
|   | $c_2 = 32 * 2413 \div 4096 = 18.8515625$ | | |
|   | $c_3 = 32 * 2392 \div 4096 = 18.6875$ | | |
|   | $m = 128 * 2523 \div 4096 = 78.84375$ | | |
|   | $n = 0.25 * 2610 \div 4096 = 0.1593017578125$ | | |
|   | for which $L_c$ equal to 1 for peak white is ordinarily intended to correspond to a display luminance level of 10 000 candelas per square meter | | |
| 17 | $V = (48 * L_c \div 52.37)(1 \div 2.6)$ for all values of $L_c$ | | Society of Motion Picture and |
|   | for which $L_c$ equal to 1 for peak white is ordinarily intended to correspond to a display luminance level of 48 candelas per square meter | | Television Engineers ST 428-1 |
| ***18 | $V = (sLc^n + c)/(Lc^n + st) + m$ | | Generic OETF proposed for a set of parameters with fixed values |
|   | $c = X$ | | |
|   | $n = X$ | | |
|   | $s = X$ | | |
|   | $t = X$ | | |
|   | $m = X$ | | |
| 19 ... 255 | Reserved | | For future use by ITU-T | ISO/IEC |

The above semantics is based on Eqn. No. 1 but is not limited to this version of OETF definition and could be extended to any equations described herein, and/or any equations derived from equations herein, e.g., an equation derived from Eqn. No. 1. Several entries (rows) could be added for different fixed parameters.

Above is discussed inserting the modulation value into various syntax structures, using H.265/HEVC as an example. The present principles can be applied to other standards. Except the VUI implementation example (Example 11), full backward compatibility with the existing or deployed SDR workflow is preserved.

Example 12

In one example, an aspect of present principles is directed to implementations relating a CEA (ConsumeL Electronics Association) standard (e.g. in an extension or an amendment of CEA-861.3). This standard may be used for instance by HDMI to convey parameterized EOTF (P-EOTF) parameters to a rendering device (e.g. a display) For instance the InfoFrame Dynamic Range and Mastering InfoFrame of CEA-861.3 defines a Static Metadata Descriptor and an EOTF (Table 13, Table 14) that can be updated as follows:

TABLE 13

Dynamic Range and Mastering InfoFrame

| | |
|---|---|
| InfoFrame Type Code | InfoFrame Type = 0x07 |
| InfoFrame Version number | Version = 0x01 |
| Length of Info Frame | Length of following HDR Metadata InfoFrame |
| Data Byte 1 | F17 = 0  F16 = 0  F15 = 0  F14 = 0  F13 = 0  EOTF (3 bits) |
| Data Byte 2 | F27 = 0  F26 = 0  F26 = 0  F24 = 0  F23 = 0  Static_Metadata_Descriptor_ID (3 bits) |
| Data Byte 3 | Static_Metadata_Descriptor |
| ... | ... |
| Data Byte n | ... |

Data Byte 1 EOTF identifies the Electro-Optical Transfer Function (EOTF) used in the stream.

TABLE 14

Data Byte 1 - Electro-Optical Transfer Function

| EOTF | EOTF of stream |
|---|---|
| 0 | Traditional gamma - SDR Luminance Range |
| 1 | Traditional gamma - HDR Luminance Range |
| 2 | SIVIPTE ST 2084 [Error! Reference source not found.] |
| ***3 | Parameterized EOTF |
| 4-7 | Reserved for future use |

Data Byte 2 Static_Metadata_Descriptor_ID identifies the structure used in Data Byte 3 and higher.

TABLE 15

Data Byte 2 - Static_Metadata_ID

| Static_Metadata_Descriptor_ID | Metadata Descriptor |
|---|---|
| 0 | Static Metadata Type 1 |
| ***1 | Static Metadata Type 2 (P-EOTF parameters) |
| 2-7 | Reserved for future use |

When Static_Metadata_Descriptor_ID=1, Static_Metadata_Descriptor uses the structure defined in Table 16 that was defined for parameterized EOTF parameters identification.
Static Metadata Type 2 may define P-EOTF parameters as follows:

TABLE 16

Static Metadata Descriptor Type 2 (P-EOTF)

| Data Byte number | Contents |
|---|---|
| ***Data Byte 3 | peotf_param_s, LSB |
| ***Data Byte 4 | peotf_param_s, MSB |
| ***Data Byte 5 | peotf_param_t, LSB |
| ***Data Byte 6 | peotf_param_t, MSB |
| ***Data Byte 7 | peotf_param_c, LSB |
| ***Data Byte 8 | peotf_param_c, MSB |
| ***Data Byte 9 | peotf_param_n, LSB |
| ***Data Byte 10 | peotf_param_n, MSB |
| ***Data Byte 11 | peotf_param_m, LSB |
| ***Data Byte 12 | peotf_param_m, MSB |

Semantics is same as proposed in Table 1.

Example 13

Figure 9:
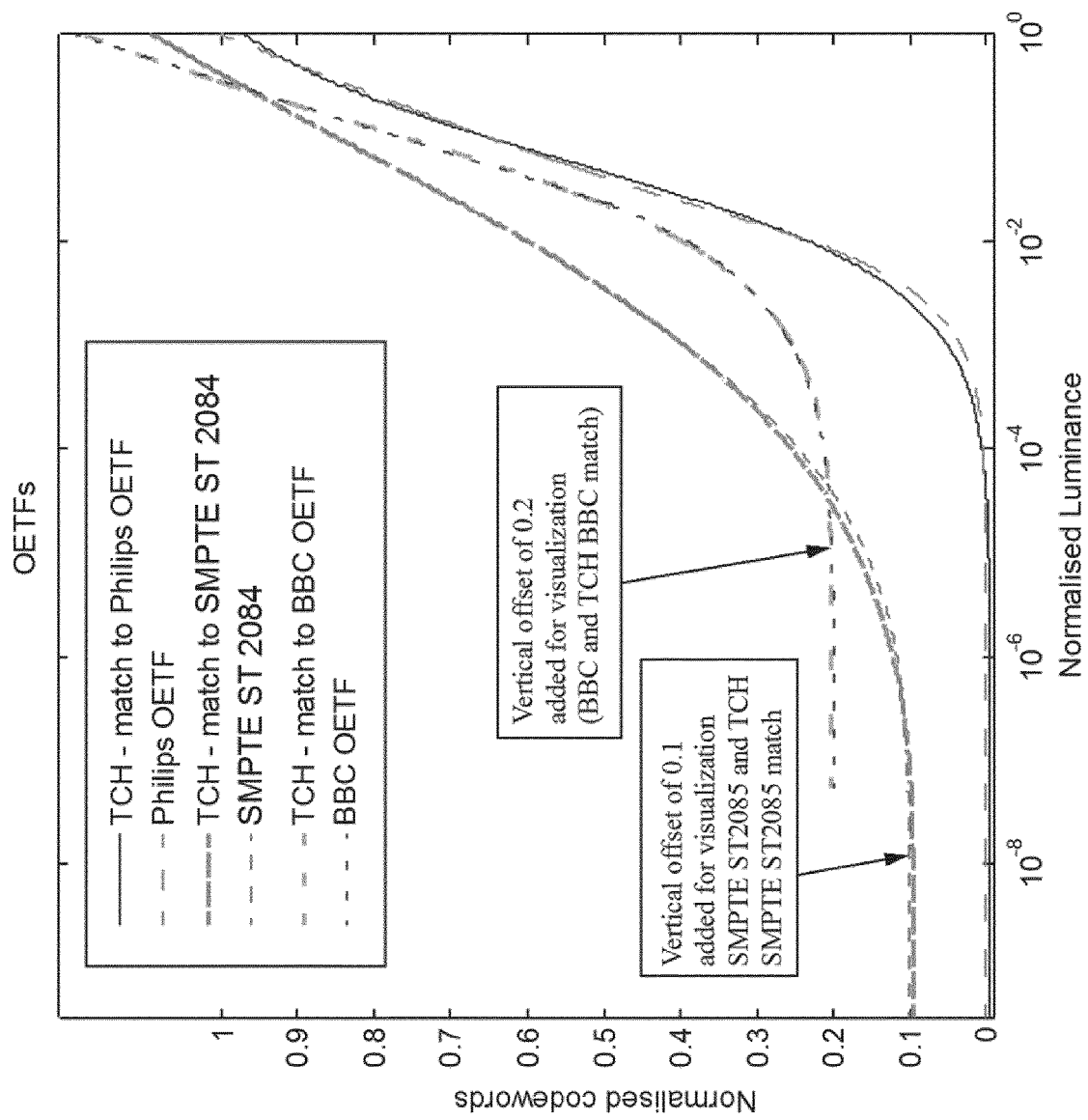
FIG. 9 illustrates an example of a plot demonstrating performance results of the parameterized OETF in accordance with present principles (labeled TCH) relative to other existing OETFs.

In one example, an aspect of present principles is directed to predefined values of the parameters (e.g., parameters (s,t,c,n,m)). In one example, the parameters of the OETF curve may be optimized against various existing OETFs as well as Barten's CSF, leading to a set of suggested predefined parameters (along with an error measure). For example, FIG. 9 illustrates results showing the TCH function in accordance with present principles optimized against existing OETF standard or standard proposals.

The parameters of the mathematical model shown in FIG. 9 were generated based on 1000 data points logarithmically spaced between the black level and the peak luminance (indicated in Tables 17-20, below; linear spacing for matches against Philips's OETF). In one example, the number of data points may be higher than 1000 or lower than 1000. One example, the spacing of the data points may be logarithmic with extra data points inserted near the black level and/or near the peak luminance. This may help the optimization process find solutions that are sufficiently accurate near the extremes of the curve.

The error is computed as the mean squared difference of the output of the generic OETF V (L) in accordance with present principles and the curve/LUT $V_e(L)$ that the fit was made to:

$$\text{Error} = \frac{1}{n} \sum_n (V(L) - V_e(L))^2 \qquad \text{Eqn. No. 11}$$

The Error is an indicator of the closeness between the parameterized OETF model in accordance with present principles and the OETF (standard, proposed standard, future standard or custom) that is being matched or modeled. The error computed in Eqn. 11 is one example of a suitable error metric. One example may use the $L_1$ norm on V(L) and $V_e(L)$.

TABLE 17

Test conditions:
Peak: $10^4$ cd/m$^2$
Black: $10^{-3}$ cd/m$^2$
Codewords: 4096 (12-bit full range)

| Parameter | Barten's curve (f = 0.9078) | SMPTE ST 2084 | Philips EOTF |
|---|---|---|---|
| s | 1.5000 | 1.4417 | 1.0667 |
| t | 3.8408 | 4.4059 | 21.245 |
| c | −1.1103 | −1.1146 | −9.7546 |
| n | 0.25451 | 0.27182 | 0.46363 |
| m | 0.097763 | 0.10817 | 0.2885 |
| Error | 5.10*10$^{-6}$ | 2.697*10$^{-6}$ | 5.2488*10$^{-5}$ |

TABLE 18

Test conditions:
Peak: $10^4$ cd/m$^2$
Black: 0.005 cd/m$^2$
Codewords: 4096 (12-bit full range)

| Parameter | Barten's curve (f = 0.89222) | SMPTE ST 2084 | Philips EOTF |
|---|---|---|---|
| s | 1.5312 | 1.4598 | 1.0695 |
| t | 3.6965 | 4.2899 | 21.0024 |
| c | −1.1959 | −1.1213 | −9.6815 |
| n | 0.24959 | 0.2681 | 0.46248 |
| m | 0.09586 | 0.10526 | 0.28698 |
| Error | 3.8983*10$^{-6}$ | 1.913*10$^{-6}$ | 5.1925*10$^{-5}$ |

TABLE 19

Test conditions:
Peak: $10^4$ cd/m$^2$ Offset m removed from model
Black: $10^{-3}$ cd/m$^2$
Codewords: 4096 (12-bit full range)

| Parameter | Barten's curve (f = 0.9078) | SMPTE ST 2084 | Philips EOTF |
|---|---|---|---|
| s | 1.4707 | 1.5475 | 1.2465 |
| t | 4.3636 | 4.1120 | 32.9662 |
| c | −0.28519 | −0.42305 | −2.3399 |
| n | 0.28557 | 0.27237 | 0.55642 |

TABLE 19-continued

Test conditions:
Peak: $10^4$ cd/m² Offset m removed from model
Black: $10^{-3}$ cd/m²
Codewords: 4096 (12-bit full range)

| Parameter | Barten's curve (f = 0.9078) | SMPTE ST 2084 | Philips EOTF |
|---|---|---|---|
| m | 0 | 0 | 0 |
| Error | 1.0021*$10^{-5}$ | 2.7011*$10^{-6}$ | 5.3659*$10^{-5}$ |

TABLE 20

Test conditions:
Peak: $10^4$ cd/m² Offset m removed from model
Black: 0.005 cd/m²
Codewords: 4096 (12-bit full range)

| Parameter | Barten's curve (f = 0.89222) | SMPTE ST 2084 | Philips EOTF |
|---|---|---|---|
| s | 1.4768 | 1.5624 | 1.2466 |
| t | 4.3301 | 4.0159 | 32.9224 |
| c | −0.35758 | −0.45706 | −2.3493 |
| n | 0.28497 | 0.2687 | 0.55628 |
| m | 0 | 0 | 0 |
| Error | 9.8265*$10^{-6}$ | 1.9174*$10^{-6}$ | 5.3517*$10^{-5}$ |

Example 14

In one example in accordance with present principles, the parameters for the parameterized generic OETF/EOTF models may be generated as follows in accordance with present principles.

OETF Optimization

The generic curves described above in accordance with present principles require several parameters. These parameters depend on the use case or on which pre-existing curve needs to be modeled. An optimization procedure may be employed to determine the values of these parameters in accordance with present principles. The same parameters are then employed for the corresponding EOTF (or inverse OETF).

The OETF curve to be optimized against (the target OETF curve) can be given as a look-up table (LUT) or as a function. Assuming that there is a range of luminance values for which the OETF V(L) is desired to match an existing OETF $V_e(L)$ then the following optimization problem is solved:

$$\arg\min_{parameters (e.g., s, t, c, n, m)}$$ Eqn. No. 12

$$\|V_e(L) - V(L; parameters (e.g., s, t, c, m, n))\|^2$$

where $V_e(L)$ can be any given existing OETF, or it can be a LUT derived from contrast sensitivity functions. L may be a number of values within a range of values (e.g., 1000 values, spaced logarithmically over the luminance range under investigation).

Each variable or each parameter may be individually optimized. If the error obtained for this optimization is lower than the previous error, the new value for that variable is stored. Otherwise the old value is stored.

Once each variable/parameter has been optimized once, the procedure is repeated. This process is repeated a fixed number of times (for instance 10000 times), or until the error has not reduced. During each iteration of this iterative scheme, the parameters are updated to values determined by the optimization only if they result in a smaller error. Otherwise, the parameters from the previous iteration are retained. By repeating the optimization in a loop, starting each loop with the previously determined optimal set of parameters, there is convergence to the global optimum solution, due to the smooth and well behaved nature of the curves for which optimization is performed.

Look-Up Table

In one example, a modulation transfer function, which itself is derived from a contrast sensitivity function, may be matched. In this procedure, Barten's Contrast Sensitivity Function is evaluated for all relevant combinations of luminance level and spatial frequency. For each luminance level, the maximum contrast sensitivity is found over all spatial frequencies. This produces a contrast sensitivity function as function of luminance level, CSF(L).

The modulation transfer function is the reciprocal of contrast sensitivity and is given by:

$$m_t(L) = \frac{1}{CSF(L)}$$ Eqn. No. 13

In essence, modulation transfer gives the maximum contrast at a given luminance level that is just below visible threshold. This means that subsequent luminance levels in an encoding scheme should have a contrast of at most this amount.

Contrast between two luminance levels $L_1$ and $L_2$ is often defined as Michelson contrast C, given by:

$$C = \frac{L_1 - L_2}{L_1 + L_2}$$ Eqn. No. 14

Combining these two equations produces:

$$m_t(L) = \frac{L_1 - L_2}{L_1 + L_2}$$ Eqn. No. 15

Solving for either $L_1$ or $L_2$ produces:

$$L_1 = L_2 \frac{1 - m_t(L_2)}{1 + m_t(L_2)}$$ Eqn. No. 16

$$L_2 = L_1 \frac{1 + m_t(L_1)}{1 - m_t(L_1)}$$

The interpretation of this result is that given a specific luminance level, a new luminance level can be computed that is different by exactly 1 just noticeable different (JND). In the one case, the new luminance level is 1 JND higher than the preceding value, and in the other case, the new luminance level is 1 JND lower.

In one example, a desired peak luminance and bit-depth are chosen, and with Eqn. 16 calculate a look-up table of luminance values, each 1 JND different from the preceding value. For instance, if a peak luminance of 10,000 cd/m² is chosen, with a bit-depth of 12 bits, then the last entry in the look-up table will contain a value of 10,000. The second last entry will be calculated from the last entry using Eqn. 16. The third last entry will be computed from the second last entry, and so forth.

The resulting look-up table represents an EOTF, as it converts codewords (i.e. table entries) into luminance values. If a minimum desired luminance value is given, a calculation of how many code words would be required to step between maximum and minimum luminance may be performed. This would give the number of JNDs available for that luminance range.

Inverse look-ups into this resulting look-up table would implement an OETF. This pair of functions will be denoted $L_{Barten}$ (V) and $V_{Barten}$ (L) for the EOTF and the OETF respectively.

The parameters of the OETF to this look-up table may be optimized by solving, where any number of parameters may be selected:

$$\arg\min_{parameters (e.g., s, t, c, n, m)} \|V_{Barten}(L) - V(L; \text{parameters (e.g., } s, t, c, m, n))\|^2 \qquad \text{Eqn. No. 17}$$

Conservative Look-Up Table

The look-up table generated in the preceding section creates values that are precisely spaced at 1 JND. The combination of starting luminance and the number of entries in the look-up table may determine the end luminance. This is undesirable because the end luminance is difficult to predict in this manner, and may be either higher or lower than the desired black level. This is especially the case if the number of entries in the table is related to a given bit-depth (in one example, a bit-depth of 10 bits would imply a table with 1024 entries). If the combination of black level, peak luminance and bit-depth allows, it would be better to space each consecutive step by less than 1 JND.

A parameter f with a value less than one can be applied to the above formulae as follows:

$$L_1 = L_2 \frac{1 - f m_t(L_2)}{1 + f m_t(L_2)} \qquad \text{Eqn. No. 18}$$

$$L_2 = L_1 \frac{1 + f m_t(L_1)}{1 - f m_t(L_1)}$$

In one example, f=0.9 may be chosen for a system with a peak luminance of 10,000 cd/m$^2$, a black level of 0.001 cd/m$^2$ and a bit depth of 12 (thus producing a LUT of $2^{12}$=4096 entries). In one example, f=0.918177. For a fixed peak luminance, black level and bit depth, varying the value of f results in a family of curves.

In general, it is desirable to choose a peak luminance, a black level and a bit depth, and from this derive an optimal value of f. To achieve this, an optimization procedure can be employed. Here, an aspect of principles solves the following optimization problem:

$$\underset{f}{\arg\min} \|L_{min} - L(0; L_{max}, f)\|^2 \qquad \text{Eqn. No. 19}$$

Here, $L_{min}$ is the desired black level and L (0; $L_{max}$, f) is the first entry in the look-up table generated from a given peak luminance $L_{max}$, a given size of look-up table, as well as the parameter f that is being optimized. The core of this technique is to find a value of f that under the given specification of peak luminance and bit-depth produces a LUT with a black level that is as close as possible to the desired black level $L_{min}$.

The result of this procedure is a value of f that can be used in Equation 18 to create LUTs against which the parameters of the OETF and EOTF curves of the present principles can be matched. This LUT represents $V_{Barten}$(L) in Equation 17. The parameters for the OETF are then determined by applying the optimization scheme of Equation 17. The same resulting parameters s, t, c, m and n are utilized for both the OETF and the corresponding EOTF (inverse OETF).

Example 15

In one example in accordance with present principles, an alternate form of the generic EOTF model comprising six parameters can be constructed as follows:

$$L(V) = \left( \frac{c - (V - m)st}{V - m - s} \right)^{1/n} + b \qquad \text{Eqn. No. 20}$$

In Eqn. No. 20, c, m, s, n, t, b are parameters and V is a codeword.

An alternate form of the generic inverse EOTF or OETF comprising six parameters and corresponding to Eqn. No. 20 can be constructed as follows:

$$V(L) = \frac{s(L - b)^n + c}{(L - b)^n + st} + m \qquad \text{Eqn. No. 21}$$

The offset b in Eqn. No. 20 can be used to modify the curve such that the smallest value of V, which is typically 0, will be mapped to a desired output value L. In one example, b is chosen such that in combination with parameters c, m, s, t and n, the input V=0 is mapped to L (0)=0. In one example, b is chosen such that in combination with parameters c, m, s, t and n, the input V=0 is mapped to L (0)=0.001.

The values of parameters s, t, c, n and m are typically determined through an optimization process (e.g., the optimization process in Example 14). The value of b can also be found through the optimization of Eqn. No. 20 against a given curve.

Alternatively, the value of b can be calculated as follows. $L_{min}$ may be the desired black level of an intended display system. $V_{min}$ may be the lowest codeword value that should be encoded given the intended black level represented by $L_{min}$. The value b may then participate in the determination of $L_{min}$=L ($V_{min}$), based on Eqn. No. 20. In the absence of the offset b this mapping cannot be guaranteed:

$$L_{min} \neq \left( \frac{c - (V_{min} - m)st}{V - m - s} \right)^{1/n} \qquad \text{Eqn. No. 22}$$

However, utilizing Eqn. No. 20 it is possible to set up an equation with one unknown (parameter b):

$$L_{min} = \left( \frac{c - (V_{min} - m)st}{V - m - s} \right)^{\frac{1}{n}} + b \qquad \text{Eqn. No. 23}$$

In Eqn. No. 23, parameters s, t, c, n and m may be determined through optimization. Codeword $V_{min}$ and luminance value $L_{min}$ may be specified. The value of b may be calculated as follows:

$$b = L_{min} - \left(\frac{c - (V_{min} - m)st}{V - m - s}\right)^{\frac{1}{n}}$$ Eqn. No. 24

Determining parameter b based on Eqn. No. 24 rather than by means of optimization enables certain systems, such as a display or a Blu-Ray player, to not transmit the parameter b, as it can be calculated from the parameters s, t, c, n and m. Parameters s, t, c, n and m of Eqn. No. 20 may be transmitted to the recipient.

Example 16

In one example in accordance with present principles, an alternate form of the generic EOTF model comprising seven parameters can be constructed as follows:

$$L(V) = a\left(\frac{c - (V - m)st}{V - m - s}\right)^{1/n} + b$$ Eqn. No. 25

In Eqn. No. 25, c, m, s, n, t, a, b are parameters and V is a codeword.

An alternate form of the generic inverse EOTF or OETF model comprising seven parameters and corresponding to Eqn. No. 25 can be constructed as follows:

$$V(L) = \frac{s\left(\frac{L-b}{a}\right)^n + c}{\left(\frac{L-b}{a}\right)^n + st} + m$$ Eqn. No. 26

The offset b introduced in Eqn. No. 25 can be used to modify the curve such that the smallest value of V, which is typically 0, will be mapped to a desired output value $L_{min}$. The ability to perform such mapping can be achieved by changing the value of b to shift the output to its desired minimum output value $L_{min}$. Simultaneously, the highest value of V, which is typically 1, will be mapped to a desired output value $L_{max}$. The ability to perform such mapping can be achieved by changing the value of a to modify the output to its desired range.

In one example, a is chosen such that, in combination with parameters c, m, s, t and n, the input V=1 is mapped to L(1)=10,000. In one example, V=1 is mapped to L(1)=1. In one example, V=1 is mapped to L(1)=4. In one example, b is chosen such that, in combination with parameters c, m, s, t and n, the input V=0 is mapped to L(0)=0. In one example, b is chosen such that, in combination with parameters c, m, s, t and n, the input V=0 is mapped to L(0)=0.001. In one example, a=1 is chosen to map V=1 to $$\left(\frac{c - (1 - m)st}{1 - m - s}\right)^{1/n} + b.$$

In one example, b=0 is chosen such that the input V=0 is mapped to $$a\left(\frac{c - (-m)st}{-m - s}\right)^{1/n}.$$

The values of parameters s, t, c, n and m may be determined through an optimization process. The values of a and b can also be found through optimization against a given curve.

Alternatively, the values of a and b can be calculated as follows. $L_{min}$ may be the desired black level of the intended display system. The lowest codeword value that should encode this intended black level may be given by $V_{min}$, $L_{max}$ may be the desired black level of the intended display system. The highest codeword value that should encode the intended peak luminance may be given by $V_{max}$. The desired mapping by Eqn. No. 25 is then:

$$L_{min} = L(V_{min})$$ Eqn. No. 27a $$L_{max} = L(V_{max})$$ Eqn. No. 27b

In the absence of gain a and offset b this mapping cannot be guaranteed, i.e. in general the following is true:

$$L_{min} \neq \left(\frac{c - (V_{min} - m)st}{V_{min} - m - s}\right)^{1/n}$$ Eqn. No. 28a And $$L_{max} \neq \left(\frac{c - (V_{max} - m)st}{V_{max} - m - s}\right)^{1/n}$$ Eqn. No. 28b However, with the aid of Eqn. No. 25 it is possible to set up two equations with two unknowns (parameters a and b):

$$L_{min} = a\left(\frac{c - (V_{min} - m)st}{V_{min} - m - s}\right)^{\frac{1}{n}} + b = aL'(V_{min}) + b$$ Eqn. No. 29a $$L_{max} = a\left(\frac{c - (V_{max} - m)st}{V_{max} - m - s}\right)^{\frac{1}{n}} + b = aL'(V_{max}) + b$$ Eqn. No. 29b In these equations, parameters s, t, c, n and m may be determined through optimization. Codewords $V_{min}$ and $V_{max}$ and desired luminance values $L_{min}$ and $L_{max}$ may be specified. This allows values for a and b to be calculated, using the definitions of $L'(V_{min})$ and $L'(V_{max})$ from Eqn. No 29a and Eqn. No 29b:

$$a = \frac{L_{max} - L_{min}}{L'(V_{max}) - L'(V_{min})}$$ Eqn. No. 30

$$b = L_{min} - L'(V_{min})\frac{L_{max} - L_{min}}{L'(V_{max}) - L'(V_{min})}$$ Eqn. No. 31

Determining parameters a and b based on the values of the minimum and maximum luminance L and codewords V, such as through the above equations 30 and 31, rather than by means of optimization, allows for, in systems where some parameters are transmitted to a recipient, such as a display or a Blu-Ray player, the parameters a and b to need not be transmitted, as they can be calculated based on the parameters s, t, c, n and m.

Example 17

In one example in accordance with present principles, an alternate form of the generic OETF model comprising six parameters can be constructed as follows:

$$V(L) = k\frac{sL^n + c}{L^n + st} + m \qquad \text{Eqn. No. 32}$$

In Eqn. No. 32, c, m, k, s, n, t are parameters and V is a codeword.

An alternate form of the generic inverse OETF or EOTF model comprising six parameters and corresponding to Eqn. No. 32 can be constructed as follows:

$$L(V) = \left(\frac{c - \left(\frac{V-m}{k}\right)st}{\frac{V-m}{k} - s}\right)^{\frac{1}{n}} \qquad \text{Eqn. No. 33}$$

The offset m introduced in Eqn. No. 32 can be used to modify the OETF curve such that the smallest value of L will be mapped to a desired codeword $V_{min}$. Simultaneously, the highest value of L will be mapped to a desired output value $V_{max}$. This is achieved by changing the value of k to modify the output to its desired range.

If normalized output is desired, then $V_{min}=0$ and $V_{max}=1$. In non-normalized use-cases, the range of codewords may be determined by a given bit-depth, and may be further qualified by the adjectives 'full' or 'legal'. Each of these ranges may be accommodated by specifying appropriate values for $V_{min}$ and $V_{max}$. In one example, 10-bit full range has codevalues between $V_{min}=0$ and $V_{max}=1023$. In one example, 10-bit legal range has codevalues defined between $V_{min}=64$ and $V_{max}=940$. In one example, a 12-bit full range has values between $V_{min}=0$ and $V_{max}=4095$. In one example, an 8-bit legal range has values between $V_{min}=16$ and $V_{max}=235$.

The parameters m and k may be determined based on the minimum and maximum luminance L and codewords V. The parameters m and k may be calculated similarly as discussed with regard to Example 16 above. A minimum luminance value $L_{min}$ and a maximum luminance value $L_{max}$ may be specified in addition to corresponding desired code values $V_{min}$ and $V_{max}$. From Eqn. No. 32, two equations in two unknowns are derived:

$$V_{min} = k\frac{sL_{min}^n + c}{L_{min}^n + st} + m \qquad \text{Eqn. No. 34a}$$

$$V_{max} = k\frac{sL_{max}^n + c}{L_{max}^n + st} + m \qquad \text{Eqn. No. 34b}$$

These two equations are then simultaneously solved for parameters k and m, yielding:

$$k = \frac{V_{max} - V_{min}}{V'(L_{max}) - V'(L_{min})} \qquad \text{Eqn. No. 35}$$

$$m = V_{min} - V'(L_{min})\frac{V_{max} - V_{min}}{V'(L_{max}) - V'(L_{min})} \qquad \text{Eqn. No. 36}$$

In Eqn. No. 35 and Eq. No. 36, V'(l) may be determined as follows:

$$V'(l) = \frac{sl^n + c}{l^n + st} \qquad \text{Eqn. No. 37}$$

Example 18

In one example in accordance with present principles, an alternate form of the generic EOTF model comprising eight parameters can be constructed as follows:

$$L(V) = a\left(\frac{c - \left(\frac{V-m}{k}\right)st}{\frac{V-m}{k} - s}\right)^{\frac{1}{n}} + b \qquad \text{Eqn. No. 38}$$

In Eqn. No. 38, c, m, k, s, n, t, a, b are parameters and V is a codeword.

An alternate form of the generic inverse EOTF or OETF model comprising eight parameters and corresponding to Eqn. No. 38 can be constructed as follows:

$$V(L) = k\frac{s\left(\frac{L-b}{a}\right)^n + c}{\left(\frac{L-b}{a}\right)^n + st} + m \qquad \text{Eqn. No. 39}$$

The offset b introduced in Eqn. No. 38 can be used to modify the curve such that the smallest value of V, which is typically 0, will be mapped to a desired output value $L_{min}$. The ability to perform such mapping can be achieved by changing the value of b to shift the output to its desired minimum output value $L_{min}$. Simultaneously, the highest value of V, which is typically 1, will be mapped to a desired output value $L_{max}$. This is achieved by changing the value of a to modify the output to its desired range. Simultaneously, the parameters k and m serve the same role in Eqn. No. 39 as parameters a and b do in Eqn. No. 38: they permit a gain k and an offset m to be applied to the OETF of Eqn. No. 39 such that the desired range of codewords is spanned for a range of input values between $L_{min}$ and $L_{max}$.

The values of parameters s, t, c, n, m, k, a and b are typically determined through an optimization process. Alternatively, the parameters s, t, c and n could be determined through optimization, and similar to Example 16, the parameters m, k, a and b could be calculated simultaneously through a system of four equations in four unknowns. A desired lowest codeword $V_{max}$ and highest codeword $V_{min}$ may be specified. Similarly, there may be a luminance range with a desired lowest representable luminance value $L_{min}$ and a highest representable luminance value $L_{max}$. The four equations with unknowns m, k, a and b are:

$$L_{min} = a\left(\frac{c - \left(\frac{V_{min} - m}{k}\right)st}{\frac{V_{min} - m}{k} - s}\right)^{\frac{1}{n}} + b \qquad \text{Eqn. No. 40}$$

$$L_{max} = a \left( \frac{c - \left(\frac{V_{max} - m}{k}\right)st}{\frac{V_{max} - m}{k} - s} \right)^{\frac{1}{n}} + b \quad \text{Eqn. No. 41}$$

$$L_{i1} = a \left( \frac{c - \left(\frac{V_{i1} - m}{k}\right)st}{\frac{V_{i1} - m}{k} - s} \right)^{\frac{1}{n}} + b \quad \text{Eqn. No. 42}$$

$$L_{i2} = a \left( \frac{c - \left(\frac{V_{i2} - m}{k}\right)st}{\frac{V_{i2} - m}{k} - s} \right)^{\frac{1}{n}} + b \quad \text{Eqn. No. 43}$$

The following information that may need to be determined: luminance values $L_{i1}$ and $L_{i2}$ as well as codewords $V_{i1}$ and $V_{i2}$. These luminance values and codewords necessarily have to be different from $L_{min}$, $L_{max}$, $V_{min}$ and $V_{max}$ to ensure that the above four equations are linearly independent (and therefore permit a solution to the four unknowns m, k, a and b). In principle, the following relationships must hold:

$$L_{min} < L_{i1} < L_{max} \quad \text{Eqn. No. 44a}$$

$$L_{min} < L_{i2} < L_{max} \quad \text{Eqn. No. 44b}$$

$$L_{i1} \neq L_{i2} \quad \text{Eqn. No. 44c}$$

$$V_{min} < V_{i1} < V_{max} \quad \text{Eqn. No. 44d}$$

$$V_{min} < V_{i2} < V_{max} \quad \text{Eqn. No. 44e}$$

$$V_{i1} \neq V_{i2} \quad \text{Eqn. No. 44f}$$

Finally, the pairs $(L_{i1}, V_{i1})$ and $(L_{i2}, V_{i2})$ should both lie on the desired curve. In use cases where such pairs can be identified, parameters m, k, a and b may be determined based on Equations 40 to 43.

Example 19

In one example in accordance with present principles, an alternate form of the generic OETF model comprising six parameters can be constructed as follows:

$$V(L) = \frac{sL^n + c}{L^n + st} \quad \text{Eqn. No. 45a}$$

$$V'(L) = kV(L) + m \quad \text{Eqn. No 45b}$$

Here, s, t, c and n are parameters to Eqn. No. 45a, which are typically determined through optimization and L is an input luminance value. The range of input values that L can take may be specified as $(L_{min}, L_{max})$. The output of Eqn. No. 45a will then be bounded to the codeword range $(V(L_{min}), V(L_{max}))$. The desired codeword range may be specified as $(V_{min}, V_{max})$. Eqn. No. 45b may map the output of Eqn. No. 45a to the desired codeword range.

The $(V_{min}, V_{max})$ pair may have a variety of code ranges. In one example, the desired codeword range may be $(V_{min}, V_{max})=(0, 255)$, and corresponds to 8-bit full range. In one example, the desired codeword range may be $(V_{min}, V_{max})=(0, 1023)$, corresponding to 10-bit full range. In one example, the desired codeword range may be $(V_{min}, V_{max})=(64, 940)$, corresponding to 10-bit legal range. In one example, the desired codeword range may be $(V_{min}, V_{max})=(4, 1019)$, corresponding to 10-bit extended range. In one example, the desired codeword range may be $(V_{min}, V_{max})=(0, 4095)$, corresponding to 12-bit extended range. In one example, the desired codeword range may be $(V_{min}, V_{max})=(0,1)$, corresponding to a normalized range.

The parameters k and m can be calculated from the specified minimum and maximum luminance values ($L_{min}$, $L_{max}$) as well as the desired minimum and maximum codeword values ($V_{min}$, $V_{max}$):

$$k = \frac{V_{max} - V_{min}}{V(L_{max}) - V(L_{min})} \quad \text{Eqn. No. 46a}$$

$$m = V_{max} - V(L_{max}) \frac{V_{max} - V_{min}}{V(L_{max}) - V(L_{min})} \quad \text{Eqn. No. 46b}$$

With parameters k and m calculated according to Eqn. Nos., 46a and 46b, the signal produced by Eqn. 45b may be encoded and transmitted.

After transmission and decoding, the inverse OETF or EOTF may be applied to reconstruct suitable luminance values. In one example this is performed as follows:

$$V''(L) = \frac{V'(L) - m}{k} \quad \text{Eqn. No. 47a}$$

$$L'(V'') = \left(\frac{c - V''st}{V'' - s}\right)^{1/n} \quad \text{Eqn. No. 47b}$$

$$L''(L') = aL' + b \quad \text{Eqn. No. 47c}$$

Eqn. Nos. 47a and 47b correspond to the inverse of Eqn. Nos. 45a and 45b and use the same parameters s, t, c, n, m and k. The luminance value L may constitute the input signal to this EOTF.

In an alternative example the application of the EOTF is performed as follows:

$$L'(V') = \left(\frac{c - V'st}{V' - s}\right)^{1/n} \quad \text{Eqn. No. 48a}$$

$$L''(L') = aL' + b \quad \text{Eqn. No. 48b}$$

The difference between Eqn. Nos. 47a, 47b and Eqn. No. 48a is that the normalization step of Eqn. 45b is not inverted. Using the principles underlying Eqn. Nos. 48a and 48b may result in fewer computations for applying the EOTF during a process that does not require knowledge of the parameters k and m. Using Eqn. Nos. 47a and 47b allows for the original luminance signal L to be approximated with a somewhat higher level of accuracy, Eqn. Nos. 47c and 48b indicate a final scaling step, which may be used to map the reconstructed luminance values L' to a specified display range ($L'_{min}$, $L'_{max}$), which may be the same as the specified input range ($L_{min}$, $L_{max}$) used in Eqn. Nos. 46a and 46b. The specified display range may also be chosen differently, for instance to correspond to the display range of a specified target display.

The parameters a and b used in Eqn. Nos. 47c and 48b can be calculated from the minimum and maximum codewords ($V_{min}$, $V_{max}$) associated with codewords V" in Eqn. No 47b and codewords V' in Eqn. No. 48a as well as the specified display range ($L_{min}$, $L_{max}$):

$$a = \frac{L_{max} - L_{min}}{L'(V_{max}) - L'(V_{min})} \qquad \text{Eq. No. 49}$$

$$b = L_{max} - L'(V_{max}) \frac{L_{max} - L_{min}}{L'(V_{max}) - L'(V_{min})} \qquad \text{Eq. No. 50}$$

The output L" constitutes a signal that can be used for display or can be used for further processing prior to storage or display.

In one example, the process described by Eqn. Nos. 45a, 45b, 47a, 47b and 47c can be inverted such that L" may be converted into L without introducing non-linearities. In one example, the process described by Eqn. Nos. 45a, 45b, 48a, and 48b can be inverted such that L" may be converted into L without introducing non-linearities.

Example 20

In accordance with present principles, in all examples where an OETF is used with a set of parameters s, t, c, n, m, k, a, b or a subset thereof, a corresponding EOTF can be constructed using the same parameters. This ensures that in a system where a luminance signal is processed by an appropriately chosen OETF, and (possibly after encoding, transmission, and decoding) where the resulting signal is subsequently processed by the corresponding EOTF, the output luminance values closely match the input luminance values.

This end-to-end behavior (from luminance to codewords to luminance, also known as the opto-optical transfer function, OOTF, or system gamma) is therefore linear if the parameters used by the OETF are the same as the parameters used for the EOTF.

In some cases there may be a non-linear end-to-end behavior. For instance, Rec. ITU-R BT 709 can be used in conjunction with Rec. ITU-R BT 1886, resulting in a non-linear end-to-end result. Similarly, Philips proposes OETF and EOTF functions that are not strict inverses of each other to also create a non-linear system gamma.

In accordance with present principles, the OETF in each of the examples may be executed with parameters s, t, c, n, m, k, a, b or a subset thereof, while for the corresponding EOTF, a different set of parameters s', t', c', n', m', k', a', b' (or subset thereof) may be specified.

In one example, parameters s, t, c, n, m, k, a, b may be determined by optimization against the Philips OETF. Separately, the parameters s', t', c', n', m', k', a', b' may be determined by optimization against the Philips EOTF.

Example 21

In this example, an aspect of present principles is directed to reducing the number of parameters for the parameterized OETF, EOTF/inverse OETF curves from at least five parameters to two parameters.

The five parameter functions of Equations Nos. 1 and 2 are non-convex. By adding specific constraints to the optimization curves of Equations Nos. 1 and 2, the functions may be rewritten such that no exponents or divisions remain. In turn, this improves the ability of finding the global optimum, or at least a local optimum that is much closer to the global optimum.

In one example, the derivation of a two parameter EOTF/inverse OETF function is shown with parameters determined as an optimization relative to the proposed BBC/NHK EOTF/inverse OETF. However, the optimization may be performed relative to any one or more curves.

Curve Constraints

A simplification is provided for the complex, non-convex problem of optimizing parameters for the P-EOTF, inverse OETF of present principles. To solve this problem, algorithmic constraints are provided in order to reduce the number of parameters of the optimization problem.

The smallest codeword is mapped to the smallest representable luminance value $L_{min}$. For example, in the context of the BBC/NHK proposal, the smallest representable luminance value is equal to zero (e.g., $L_{min}=0$).

The P-EOTF, inverse OETF of Equation No. 2 may be extended by an offset $L_{min}$. The resulting P-EOTF, inverse OETF may be written as follows:

$$L(V) = \left(\frac{c - (V-m)st}{V-m-s}\right)^{1/n} + L_{min} \qquad \text{Equation No. 51}$$

Substituting $L_{min}=0$ and V=0 into Equation No. (51) above, results in:

$$c = -mst \qquad \text{Equation No. 52}$$

As a consequence, the P-EOTF of Equation No. 51 can be simplified as follows:

$$L(V) = \left(\frac{-stV}{V-m-s}\right)^{1/n} + L_{min} \qquad \text{Equation No. 53}$$

The largest codeword value, $V_{max}$, is mapped to the maximum representable luminance value. The maximum representable luminance value is normalized; for example the representable luminance value is set to one (e.g., $L_{max}=1$). For sufficiently high luminance values the following relationship can be written:

$$\left(\frac{-stV}{V-m-s}\right)^{1/n} + L_{min} \approx \left(\frac{-stV}{V-m-s}\right)^{1/n} \qquad \text{Equation No. 54}$$

Therefore, for the largest codeword values V, the EOTF, inverse OETF may be estimated as follows:

$$L(V) \approx \left(\frac{-stV}{V-m-s}\right)^{1/n} \qquad \text{Equation No. 55}$$

Setting $V=V_{max}$ and $L(V_{max})=1$ yields the following expression:

$$m = V_{max}(1+st) - s \qquad \text{Equation No. 56}$$

As a result, mapping the smallest and largest codeword values allows the elimination of two parameters from the optimization problem. Thus, the proposed EOTF, inverse OETF, or P-EOTF can therefore be written as:

$$L(V) \approx \left(\frac{-stV}{V - V_{max}(1+st)}\right)^{1/n} \qquad \text{Equation No. 57}$$

Thereby, the P-EOTF or inverse OETF of Equation No. 57 has only three parameters, namely s, t and n. As parameters s and t appear only in multiplication in Equation No. 57, a change of parameters can be applied to reduce the number of parameters to two:

$$L(V) \approx \left(\frac{-Vu}{V - V_{max}(1+u)}\right)^{1/n} \quad \text{Equation No. 58}$$

where u=st. The exponent 1/n may still cause the optimisation algorithm to descent into a local minimum. The risk for this can be reduced by optimising in log space, i.e.:

$$\log(L(V)) \approx \frac{1}{n}\log\left(\frac{Vu}{V_{max}(1+u) - V}\right) \quad \text{Equation No. 59a}$$

Equation No. 59a is approximate, because $L_{min}$ was omitted. Reintroducing this minimum luminance produces:

$$\log(L(V) - L_{min}) = \frac{1}{n}\log\left(\frac{Vu}{V_{max}(1+u) - V}\right) \quad \text{Equation No. 59b}$$

Equation No. 59b presents a function in two unknown variables, n and u, which means that the optimisation algorithm will only have to optimize for these two parameters. The division of 1/n means that a feasible result will require n to be greater than 0. Similarly, the division by $V_{max}(1+u)-V$ leads to the requirement that u<1. These boundaries can be used as a check on the output of the optimizer. However, the boundaries do not need to be explicitly specified as constraints.

Optimization Strategy

In order to determine values for the parameters u and n, a reference curve is approximated by a representation using reference luminance/codeword pairs $(L_i, V_i)$, i=0, ..., N, where $N=2^B-1$ is determined by the number B of bits available. With this notation, note that $V_N = V_{max}$. The luminance codeword pairs represent the target curve to be matched against.

The luminance/codeword pairs can be determined by sampling any curve of choice. In one example, this is a sampling of the BBC/NHK EOTF curve.

An optimization algorithm is utilized to determine values for parameters u and n, for the selected luminance codeword pair. The optimization algorithm evaluates candidate values of u and n that are inserted into Equation No. 59b. This equation is then evaluated for codeword values $V_i$. This results in a set of luminance values $L(V_i)$ which should be as close as possible to sampled luminance values $L_i$.

The error between the resulting two values $L(V_i)$ and $L_i$ can be assessed with a standard metric, such as the squared difference $(L(V_i)-L_i)^2$. The standard metric assesses this error for all codeword values $V_n$, leading to the following optimization formulation, which is based on Equation No. 59b:

$$\text{argmin}_{u,n} \frac{1}{N}\sum_{i=1}^{N}\left\|\log\left(\frac{V_i u}{V_{max}(1+u) - V_i}\right) - n\log(L_i - L_{min})\right\|_p^p \quad \text{Equation No. 60a}$$

where $L_{min}=L_0$, $V_{max}=1$ and $|\cdot|_p$ is the $l_p$ norm, with p=1 or p=2 The norm calculation shown in Equation No. (60a) represents the error of the P-EOTF (with the current parameters u and n) relative to the curve that the optimization is against (which is represented by the set of $(L_i, V_i)$ pairs). The chosen optimization algorithm will use this error metric to determine the optimal values for u and n. Equation No. 60a can be expanded as follows:

$$\text{argmin}_{u,n} \frac{1}{N}\sum_{i=1}^{N}|\log(V_i u) - \log(V_{max}(1+u) - V_i) - n\log(L_i - L_{min})|_p^p \quad \text{Equation No. 60b}$$

where $L_{min}=L_0$ and $V_{max}=1$. The summation in Equation No. (60b) represents the mean error that the optimization algorithm will minimize.

In one example, the maximum error is kept under control, even if this means a larger mean error. In this example, the following maximum error needs to be minimized:

$$\text{argmin}_{u,n}\max|\log(V_i u) - \log(V_{max}(1+u) - V_i) - n\log(L_i - L_{min})|_p^p \quad \text{Equation No. 60c}$$

In another example, both the mean and the max error are combined into a weighted average. This example provides an advantage for the situations where a trade-off between the mean and the max error is required. In this example, the following cost function needs to be minimized:

$$\text{argmin}_{u,n} a\frac{1}{N}\sum_{i=1}^{N}|\log(V_i u) - \log(V_{max}(1+u) - V_i) - n\log(L_i - L_{min})|_p^p +$$
$$b\max|\log(V_i u) - \log(V_{max}(1+u) - V_i) - n\log(L_i - L_{min})|_p^p \quad \text{Equation No. 60d}$$

where a>0 and b>0 are two weights determining the relative importance of the mean and max error types.

Weighted Datapoints

In another example, the results of optimizing the P-EOTF, inverse OETF curves of present principles can be more precisely controlled by adding non-uniform weights to the evaluation of each of the datapoints (Li; Vi). This allows less or more weight to be provided to certain luminance, code word data points; for example, it allows one to provide higher weights to dark values.

For example, extra weight may be given to luminance, code word data point values that are near the black point (i.e., low values of $L_i$ and $V_i$). This example may be expressed by the following formula:

$$\text{argmin}_{u,n} \frac{1}{N}\sum_{i=1}^{N} a_i|\log(V_i u) - \log(V_{max}(1+u) - V_i) - n\log(L_i - L_{min})|_p^p \quad \text{Equation No. 61a}$$

In another example Equation No. 61a may be modified to include an assessment of the maximum error:

$$\operatorname*{argmin}_{u,n} \frac{1}{N} \sum_{i=1}^{N} a_i \|\log(V_i u) - \log(V_{max}(1+u) - V_i) - n\log(L_i - L_{min})\|_p^p +$$
$$b\max\|\log(V_i u) - \log(V_{max}(1+u) - V_i) - n\log(L_i - L_{min})\|_p^p$$

Equation No. 61b

For both Equations Nos. 61a and 61b, $a_i$, $i \in [1 \ldots N]$ is a set of weights, one for each of the N data points $(L_1, V_i)$.

Multiple Target Curves

It may be desirable to optimize the P-OETF, inverse OETF of the present invention against more than one target curve. For example, the P-EOTF, inverse OETF curve of present principles may be optimized against an existing high dynamic range EOTF to obtain a desired behavior over an extended luminance range. The same P-EOTF, inverse OETF curve of present principles may also be optimized simultaneously against a current standard curve (e.g., ITU-R Rec. BT1886), in order to create a new P-EOTF, inverse OETF curve with sufficient backward compatibility.

An aspect of present principles provides for overcoming the shortcomings of a situation where the P-OETF, inverse OETF is optimized against two or more curves. In particular, sets of luminance/codeword pairs may be defined for each of the curves to be optimized against and the final optimization can be formulated as a weighted average of the errors obtained for all the curves to be optimized against.

For example, in one example in order to find a suitable trade-off between high dynamic range capabilities as well as backward standard compatibility, two sets of luminance/codeword pairs are defined:

$(L_i^1, V_i^1) i = 0, \ldots, N^1$ $(L_i^2, V_i^2) i = 0, \ldots, N^2$      Equation No. 62

Equation No. 62 defines two sets of luminance/codeword pairs for, one set for each of the two target EOTFs. In this example, the first set of luminance/codeword pairs represents a target EOTF, for instance the EOTF defined by BBC/NHK, and may consist of $N^1+1$ luminance/codeword pairs $(L_i^1, V_i^1)$. The second set of luminance/codeword pairs represents a different target EOTF, for instance the EOTF defined by ITU-R Recommendation BT.1886, and may have $N^2+1$ pairs $(L_i^2, V_i^2)$. Both sets of luminance/codeword pairs can be generated with the technique described in the section 'Optimization Strategy' above. To determine the parameters u and n for the P-EOTF, inverse EOTF defined in Equation No. 59 can then be formulated as follows:

$$\operatorname*{argmin}_{u,n} a \frac{1}{N^1} \sum_{i=1}^{N^1} \|\log(V_i^1 u) - \log(V_{max}(1+u) - V_i^1) - n\log(L_i^1 - L_{min})\|_p^p +$$
$$b \frac{1}{N^2} \sum_{i=1}^{N^2} \|\log(V_i^2 u) - \log(V_{max}(1+u) - V_i^2) - n\log(L_i^2 - L_{min})\|_p^p$$

Equation No. 63a where $a > 0$ and $b > 0$ are two weights determining the relative importance of the two curve contributions. Instead of the mean error, the max error of the $l_p$-norm could also be used:

$$\operatorname*{argmin}_{u,n} a\max\|\log(V_i^1 u) - \log(V_{max}(1+u) - V_i^1) - n\log(L_i^1 - L_{min})\|_p^p +$$
$$b\max\|\log(V_i^2 u) - \log(V_{max}(1+u) - V_i^2) - n\log(L_i^2 - L_{min})\|_p^p$$

Equation No. 63b

Although Equations Nos. 63a-63b illustrate an example for two curves, this approach can be extended to any number of curves. For example, the following illustrates an optimization for J number of desired curves:

$$\operatorname*{argmin}_{u,n} \sum_{j=1}^{J} a_j \frac{1}{N^j} \sum_{i=1}^{N^j} \|\log(V_i^j u) - \log(V_{max}(1+u) - V_i^j) - n\log(L_i^j - L_{min})\|_p^p$$

Equation No. 64a

The formulation of Equation No. 64a could be used in combination with the maximum error as follows, which may be useful in cases when the maximum error is more indicative of the desired performance of the resulting P-EOTF than the mean error:

$$\operatorname*{argmin}_{u,n} \sum_{j=1}^{J} a_j \max\|\log(V_i^j u) - \log(V_{max}(1+u) - V_i^j) - n\log(L_i^j - L_{min})\|_p^p$$

Equation No. 64b

Parameters

In one example, the optimization of the generic parameterized OETF, EOTF functions of Equations Nos. 1 and 2 above can be optimized in accordance with present principles. For example, the parameterized curve of Equations No. 59b can be optimized against the proposed BBC/NHK EOTF, leading to the following parameters:

$u = 1.2961604455878200$      Equation No. 65a $n = 0.4820036148084646$      Equation No. 65b $V_{max} = 2.0009775171065494$      Equation No. 65c $L_{min} = 0.0$      Equation No. 65d Based on the parameters of Equations Nos. 65a-d, the parameters s, t, c, n and m may be determined by applying the following equations:

$s = 1.0$      Equation No. 66a $t = u$      Equation No. 66b $n = n$      Equation No. 66c $V_{max}(1+st) - s$      Equation No. 66d $c = -mst$      Equation No. 66e For the above example of Equations Nos. 65a-65d, the following parameters result:

$s = 1.0$      Equation No. 67a $t = 1.2961604455878200$      Equation No. 67b $n = 0.4820036148084646$      Equation No. 67c $$m = 3.5945654272905836 \quad \text{Equation No. 67d}$$

$$c = -4.6591335259315354 \quad \text{Equation No. 67e}$$

The OETF and EOTF curves resulting from applying the parameter values defined in Equation Nos. 67a-67d to Equation Nos. 1 and 2 can be operated in 10-bit and 11-bit scenarios. The peak luminance for the 10-bit case is around 1214 nits, while the peak luminance for the 11-bit case is 10,000 nits.

The input and output of the OETF and EOTF need to be scaled, dependent on these OETF and EOTF are used. This allows these OETF and EOTF curves to be used either as absolute curves, or as relative curves.

As an example, the 10-bit OETF/EOTF pair of curves are to be used with absolute values. The range of input luminance values to the OETF curve is then $L \in [0, 1214]$. Thereby, the output of the OETF curve needs to be scaled to generate code words between 0 and 1023. This leads to a pair of scale factors where $L_{scale} = 10000$ and $V_{scale} = 1023$.

Using the parameters from Equation Nos. 67a-e, the P-OETF curve is then given by:

$$V = V_{scale} \frac{\left(\frac{L - L_{min}}{L_{scale}}\right)^n + c}{\left(\frac{L - L_{min}}{L_{scale}}\right)^n + t} + m \quad \text{Equation No. 68}$$

The corresponding P-EOTF curve is given by:

$$L = L_{scale} \left( \frac{c - \left(\frac{V}{V_{scale}} - m\right)t}{\frac{V}{V_{scale}} - m - 1} \right)^{1/n} + L_{min} \quad \text{Equation No. 69}$$

The OETF and EOTF curves of Equation Nos. 68 and 69 can be used with normalized input and output values. This requires an adjustment of the parameters $L_{scale}$ and $V_{scale}$ to:

$$L_{scale} = 10000/1214 = 8.2372 \quad \text{Equation No. 70a}$$

$$V_{scale} = 1023/1023 = 1 \quad \text{Equation No. 70b}$$

End-to-End Gamma

The curves presented in Equations Nos. 1 and 2, and also in Equations Nos. 68 and 69 are the true inverse of each other. That, is if linear light is passed into Equation No. 1, then linear light may be reproduced by applying Equation No. 1 followed by Equation No. 2. As such the behavior of the system is therefore linear: the input to Equation No. 1 is close to identical to the output of Equation No. 2. In other words, the system is linear.

However, content producers, e.g., studios often color grade images under darker illumination than the environment illumination available to consumers. Therefore, it may be desirable for an aspect of present principles to provide parameterized OETF, EOTF/inverse OETF curves that have non-linear behavior. This is most usefully simulated by applying a gamma function to the output of the EOTF, inverse OETF curve in Equation No. 2, or in Equation No. 69, resulting in the following EOTF curve:

$$L = L_{scale} \left( \frac{c - \left(\frac{V}{V_{scale}} - m\right)t}{\frac{V}{V_{scale}} - m - 1} \right)^{\gamma/n} \quad \text{Equation No. 71}$$

Note that with respect to Equation 69, it is required that $L_{min} = 0$, so that this parameter is omitted from Equation No. 71. As a consequence, in this case the OETF curve of Equation No. 68 can be used, provided that $L_{min} = 0$ in this equation as well.

In one example, such as the example of viewing a video at a consumer's home, the value for gamma γ may be 1.2. In another example, for instance when viewing video at a consumer's home on a high dynamic range display device, the value for gamma γ may be 1.4. The computational cost of applying this extra gamma value is zero, because γ ln evaluates to a different constant than 1/n.

An example of present principles allows for the OETF and EOTF to be represented as parameterized curves based on suitable parameter settings. The parameter settings of the parameterized curve(s) allow the selection of an OETF/EOTF pair from a variety of existing OETF and EOTF.

An example of present principles allows for other parameters, the OETF/EOTF curve(s) of the present principles to be matched against Barten's contrast sensitivity model for different luminance ranges and bit-depths. As such, a family of meaningful curves can be easily derived.

An example of present principles includes a novel formulation of the Naka-Rushton equation that under certain parameter settings is idempotent.

Another example of present principles allows for the representation of a single curve with meaningful parameters, and allows for a unified representation for both HDR and SDR video.

Another example of present principles allows for transmitting a small set of parameters to steer the signal reconstruction rather than transmitting a LUT or the full curve.

Another example of present principles allows decoding that omits the application of an EOTF for certain SDR target display devices. The encoding through the proposed OETF can serve as an adequate tone mapping or tone reproduction operator.

Another example of present principles allows for the proposed parameterized transfer functions to avoid market fragmentation, and improve interoperability and implementability by reconciling different OETF/EOTF under a single, generic, adaptive and parameterized OETF/EOTF model.

Another example of present principles allows for the proposed parameterized transfer functions to map to desired output luminance, including desired minimum black level luminance and maximum peak luminance.

Another example of present principles provides the ability to optimize OETF, EOTF/inverse OETF curves against any other curves by reducing the parameters of the parameterized OETF, EOTF/inverse OETF curves to two parameters. The two parameter OETF, EOTF/inverse OETF curve(s) result in objective functions that are convex. This makes optimizing these functions less prone to producing local minima, and therefore increases the quality of the match. The two-parameter curve(s) could be implemented directly. The inclusion of two constraints not only reduces the number of parameters and increases the quality of the match, it also fixes two important points on the curve to desired values (e.g., the minimum and the maximum luminance values). For example, the lowest value codeword (codeword 0) may be fixed to a specified black level, meaning that the lowest representable luminance is guaranteed to be as specified. In another example, the highest codeword is associated with a specified white point, thereby leading to a guaranteed representable upper luminance.

Another example of present principles provides the ability to optimize against a specific curve, such as the BBC/NHK EOTF curve. For example, the optimized curve in accordance with present principles for the BBC/NHK EOTF curve uniquely allows for an input range between 0 and 1214 nits to be directly quantized to a 10-bit signal, simultaneously allowing for the input range between 0 and 10,000 nits to be directly quantized to an 11-bit signal, without requiring other modifications to the curve. As a result, the curve can be operated in 10-bit mode with current infrastructure supporting signals up to 1200 nits. Crucially, without further change, this curve will be suitable for ultra-high dynamic range signals that can go up to 10,000 nits with a future infrastructure that will support 11 bits. Furthermore, a signal may be encoded in 10-bit mode with the proposed OETF. If this signal is then transmitted to a legacy display device operating using with a display device EOTF as defined in ITU-R Rec. BT 1886, this display will produce a viewable image. Finally, the proposed EOTF can be augmented with a system gamma to allow for differences in viewing conditions between mastering suite and home viewing environment. Importantly, the computational cost for adding a system gamma is nil.

The examples described above may be implemented within the figures described below.

FIG. 1 is a diagram depicting an exemplary method 100 for encoding an image using OETF in a capture and distribution system. In this method 100, a picture may be received and encoded into a bit stream using any encoding technique (e.g., HEVC, AVC). Method 100 may be performed in DVB or ATSC standard based distribution workflows, production or authoring workflows, digital video camcorders.

In one example, the method 100 includes receiving a picture at block 101. The picture may be an image (picture) or video images or pictures, e.g., for HDR video. Block 101 may receive information regarding the properties of the picture, including linear light RGB information. The picture may be captured using tri-chromatic cameras into RGB color values composed of three components (Red, Green and Blue). The RGB color values depend on the tri-chromatic characteristics (color primaries) of the sensor. The picture may include image side information such as color primaries of the sensor, maximum and minimum luminance peak of the captured scene. Block 101 may then pass control to block 102, including providing any information regarding the received picture.

Block 102 may apply an OETF to the picture received at block 101. Block 102 may apply the OETF to a luminance L signal of the picture to determine V(L) where V(L) may be the resulting electrical signal or a codeword. The luminance L signal may any of the type described herewith in accordance with present principles. The V(L) signal may any of the type described herewith in accordance with present principles. The OETF may be applied to the luminance of each pixel of the received picture to determine V(L) for each pixel of the received picture. For example, block 102 may apply the OETF to an initial RGB value of each pixel of the received picture to compute a new R'G'B value for each pixel of the received picture. The result may then be a R'G'B' picture composed of R'G'B' pixels. The resulting R'G'B' picture may then be converted from an R'G'B' picture to a Y'CbCr picture when considering traditional non constant luminance workflows. A Y'CbCr signal is said to be constant luminance or non-constant luminance depending on the luminance workflow used to derive it. Y'CbCr is non-constant luminance signal when it is derived directly from R'G'B' (non-linear-light primaries) while it is a constant luminance signal when it is derived from RGB (linear-light primaries) via Y and Y'R'B' for chroma or chrominance components. Former ITU recommendations (ITU-R BT.709 for analogic HDTV signals and ITU-R BT.1361 for digital HDTV signals) are limited to the non-constant luminance workflow. New ITU-R BT.2020 defines both luminance workflows for wide color gamut video signals. Alternatively, block 102 may apply the OETF to an initial Y value of each pixel of the received picture to compute a new Y' value for each pixel of the received picture (constant luminance workflow). Block 102 thus may optimize capture light information for human vision. Block 102 may then pass control to block 103.

Block 103 may encode the received V(L) signal. In one example, the block 103 may encode the V(L) signal in accordance with any existing encoding/decoding standard. For example, block 103 may encode in accordance with the High Efficiency Video Coding (HEVC) standard organized by the International Telecommunication (ITU) and the organization Moving Picture Experts Group (MPEG). Alternatively, the block 103 may encode in accordance with the H.264 or MPEG-4 Part 10, Advanced Video Coding (MPEG-4 AVC) organized by the International Organization for Standardization/International Electrotechnical Commission (ISO/IEC) Moving Picture Experts Group-4 (MPEG-4). Alternatively, the block 103 may encode with any other known encoding techniques. Block 103 may then pass control to block 104. Block 104 may output the resulting bit-stream (e.g., HEVC bit-stream).

Figure 2:
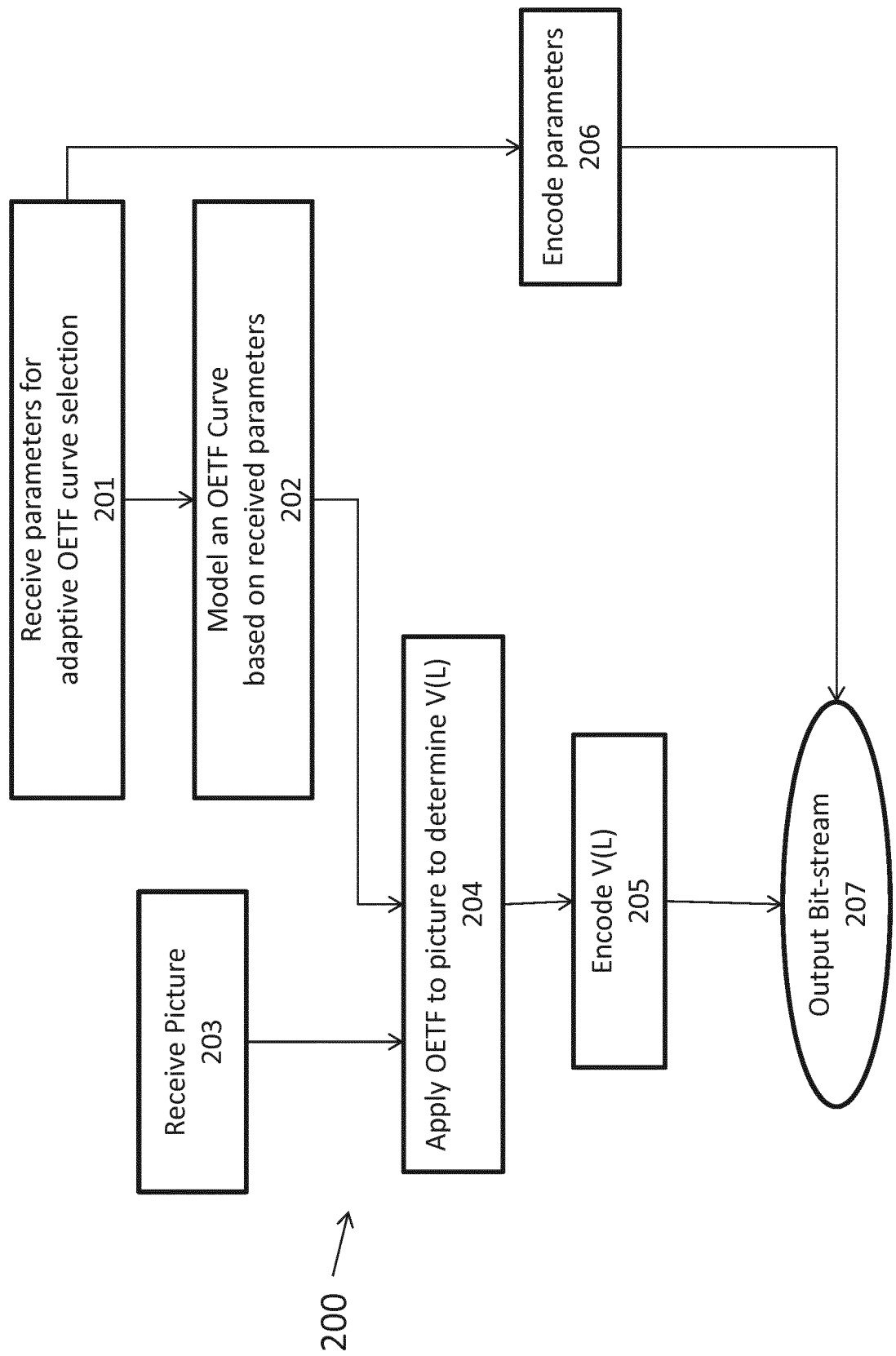
FIG. 2 is a diagram depicting an exemplary method for encoding a picture using a parameterized OETF in accordance with present principles.

FIG. 2 is a diagram depicting an exemplary method 200 for encoding a picture using a parameterized OETF in accordance with present principles. In one example, the method 200 includes a block 201. The block 201 may receive parameters for adaptive OETF curve selection. In one example, the block 201 may receive values for one or more parameters that allow the adaptive selection of an OETF curve best suited for the content being encoded. In one example, the block 201 may receive values for a plurality of parameters, (e.g., parameters (s, t, c, m, n) described above). In another example, the block 201 may receive an identification (e.g., an indicator) of a set of fixed parameters that correspond with a certain OETF curve that may be desired for encoding the present content. The parameters may be any parameters discussed herewith in accordance with present principles. The block 201 may then pass control to block 202.

Block 202 may model an OETF curve (e.g., Barten curve, SMPTE ST 2084 OETF, BBC OETF) based on the parameters received from block 201. For example, block 202 may model a Barten OETF curve based on the received parameters. Alternatively, block 202 may model a SMPTE ST 2084 OETF similar in performance as the OETF curve proposed by Dolby. Alternatively, block 202 may model an OETF curve similar in performance to the OETF curve proposed by BBC. Alternatively, block 202 may model an OETF similar to other existing or future proposals. Block 202 may receive the parameters from block 201 and may produce an OETF curve based on those parameters. In one example, block 202 may apply the parameters to a generic OETF model (e.g., the models described above, including Eqn. Nos. 1, 4, 8-10, 68) in order to mimic or model the behavior of any one of a plurality of OETF curves (e.g., standard OETF curve proposals or custom OETF curves). Thus, depending on the received parameters, block 202 may utilize only one of the generic OETF model to advantageously model the behavior of any OETF curve. In one example, block 202 may encode the resulting OETF curve into a look-up table (LUT). An LUT may be derived from tabulated values of the OETF formula then required intermediate values may be interpolated if they do not exist in the LUT. The interpolation may be linear. In another example, the interpolation may be non-linear. Block 202 may then pass control to block 204.

The method 200 may further include a block 203 that may receive a picture, such as video image frame, e.g., for HDR video. Block 203 may then pass control to block 204.

Block 204 may receive the picture from block 203 and the modeled OETF curve (that could be represented by a LUT for instance) from block 204. Block 204 may apply the OETF to the received picture from block 203 to determine V(L), in accordance with present principles, including those described in connection to FIG. 1. V(L) may be the resulting electrical signal from the transformation of the luminance signal L. V(L) may be a codeword. V(L) may be defined in accordance with present principles described herewith. The block 204 may determine V(L) in accordance with the principles discussed in connection with FIG. 1. For example, block 204 may apply the OETF curve modeled at block 202, including any equation described above (e.g., Eqn. Nos. 1, 4, 8-10, 68). The OETF curve may be represented based on the received parameters as applied to any equation described above (e.g., Eqn. Nos. 1, 4, 8-10, 68). Block 204 may apply an OETF curve in accordance with present principles to determine an absolute or relative modified luminance/RGB value or a modified luminance Y that is a linear combination of RGB values. In one example, block 204 may apply an OETF curve using an LUT as described above. Block 204 may then pass control to block 205.

Block 205 may encode V(L) received from block 204. The block 205 may encode the modified V(L) in accordance with the principles discussed in connection with FIG. 1. Block 205 may then pass control to block 207.

Method 200 may further include a block 206. The block 206 may encode directly parameters representative of the modeled OETF curve or may encode an indicator (e.g., index) of the parameters. For example, the block 206 may encode the received parameters' values (e.g., parameter values for parameters (s, t, c, m, n)). Alternatively, the block 206 may encode a predefined indicator (e.g., in an SEI message) that corresponds to a predefined set of received parameters' values. Block 206 may then pass control to block 207.

Block 207 may output the bit-stream that includes the encoded modified luminance picture from block 205 and the encoded parameters identification from block 206. Block 207 may insert the encoded parameters received from block 206 into the bit-stream. For example, block 207 may insert an encoded indicator into a predefined syntax structure (e.g., into an SEI message or a PPS, or an SPS or a VUI . . . ).

Figure 3:
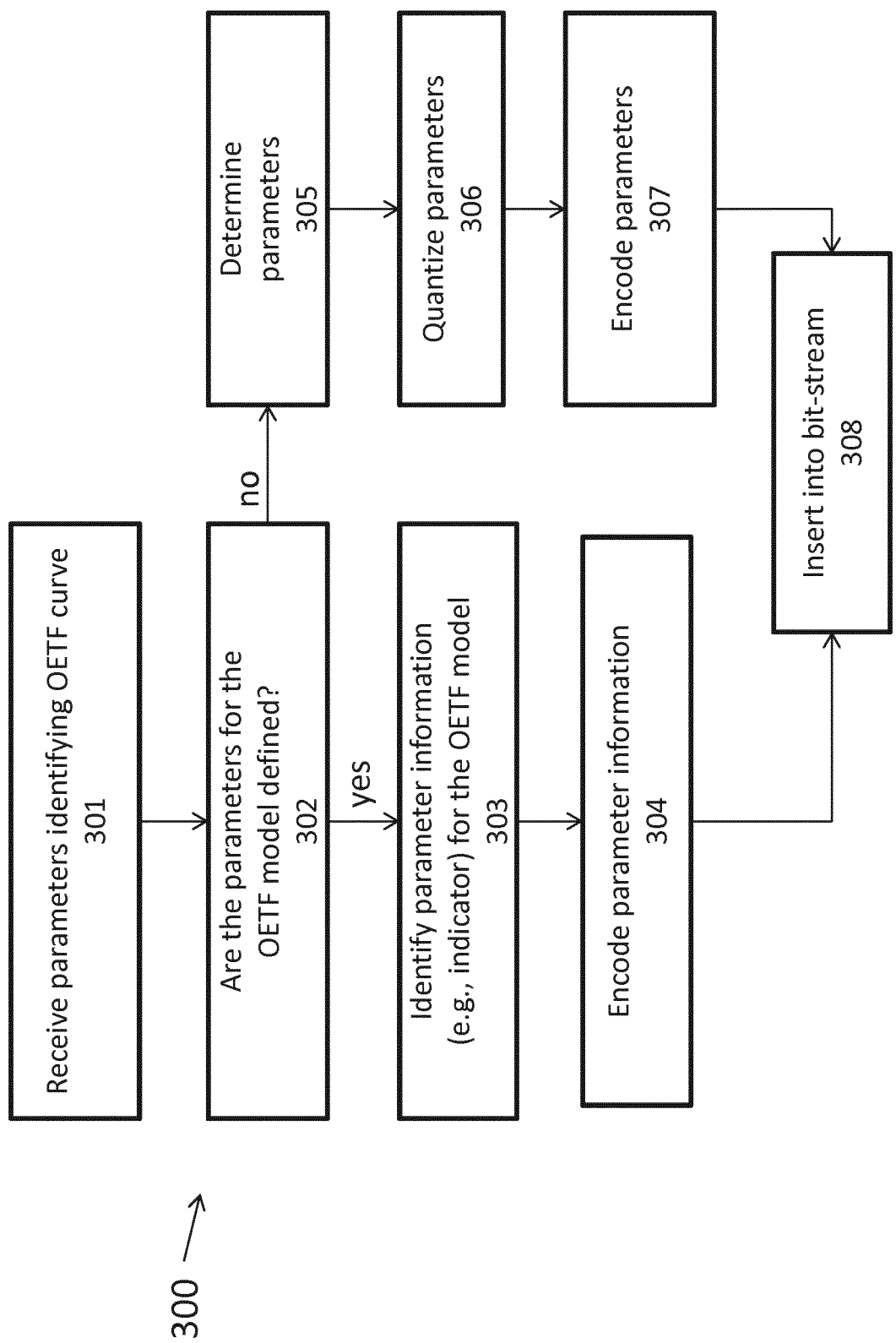
FIG. 3 is a diagram depicting an exemplary method for encoding parameters of a parameterized OETF in accordance with present principles.

FIG. 3 is a diagram depicting an exemplary method 300 for encoding parameters of a parameterized OETF in accordance with present principles. The method 300 provides a process for encoding the parameter syntax elements in accordance with present principles. The method 300 includes a block 301.

The block 301 may receive parameters identifying an OETF curve (e.g. a custom OETF, a modulation transfer function derived from Barten's Contrast Sensitivity Function, SMPTE ST 2084 OETF, BBC OETF). The parameters may be any parameters discussed herewith in accordance with present principles. Block 301 may receive an information of the type of information (explicit coding of parameters or coding of an indicator representative of fixed parameters) representative of a modeled curve for the purpose of the present encoding. The block 301 may then pass control to block 302.

Block 302 may then determine how the OETF model parameters are defined. The block 302 may determine if the parameters (e.g., parameters (s, t, c, m, n)) are predefined for the OETF identified at block 301. In one example, block 302 may determine whether the identified OETF curve has known parameters (e.g., sctmn known)=indicator (meaning the parameters are predefined) or block 302 may determine whether parameters are to be explicitly given (sctmn)). In one example, block 302 may determine whether there is an indicator indicating that parameters are predefined (e.g., the parameters are predefined for a certain parameter set) or whether the parameters need to be explicitly signaled. If block 302 determines that the parameters are predefined, then it may pass control to block 303. Alternatively, if block 302 determines that the parameters are not predefined, then it may pass control to block 305.

Block 303 may identify parameter information (e.g., an indicator) for the OETF model identified by block 301. For example, block 303 may identify an indicator corresponding to predefined parameters for the identified OETF model (e.g., an indicator indicating parameters for modeling behavior of the Barten's curve, SMPTE ST 2084 OETF, BBC OETF, etc.). Block 303 may thus encode implicit identification of the parameters. Block 303 may pass control to block 304.

Block 304 may encode the parameter information into the bit-stream. For example, block 304 may encode an indicator identifying the predefined parameters for the OETF model. Block 304 may pass control to block 308.

Block 305 may determine the parameters for the identified OETF curve. For example, block 305 may identify parameters for Eqn. Nos. 1, 4, 8-10, 68 above (e.g., parameters (s, t, c, m, n)). Block 305 may then pass control to block 306.

Block 306 may quantize the parameters determined by block 305. Block 306 may quantize the parameters because the parameter values derived from the equations may be floating point. In this case values must be quantized in order to be transported in a bit-stream that may tolerate only integer values (e.g., AVC, HEVC) to leverage decoder processing architecture. Block 306 may then pass control to block 307.

Block 307 may encode the determined parameters. For example, block 307 may encode the values of the explicitly determined parameters. Alternatively, block 307 may encode an indicator identifying the determined parameters for the OETF model.

Block 308 may insert the encoded data into the bit stream. In one example, block 308 may populate metadata format (e.g., SEI parameter) with the encoded parameters received from either block 304 or 307.

Figure 4:
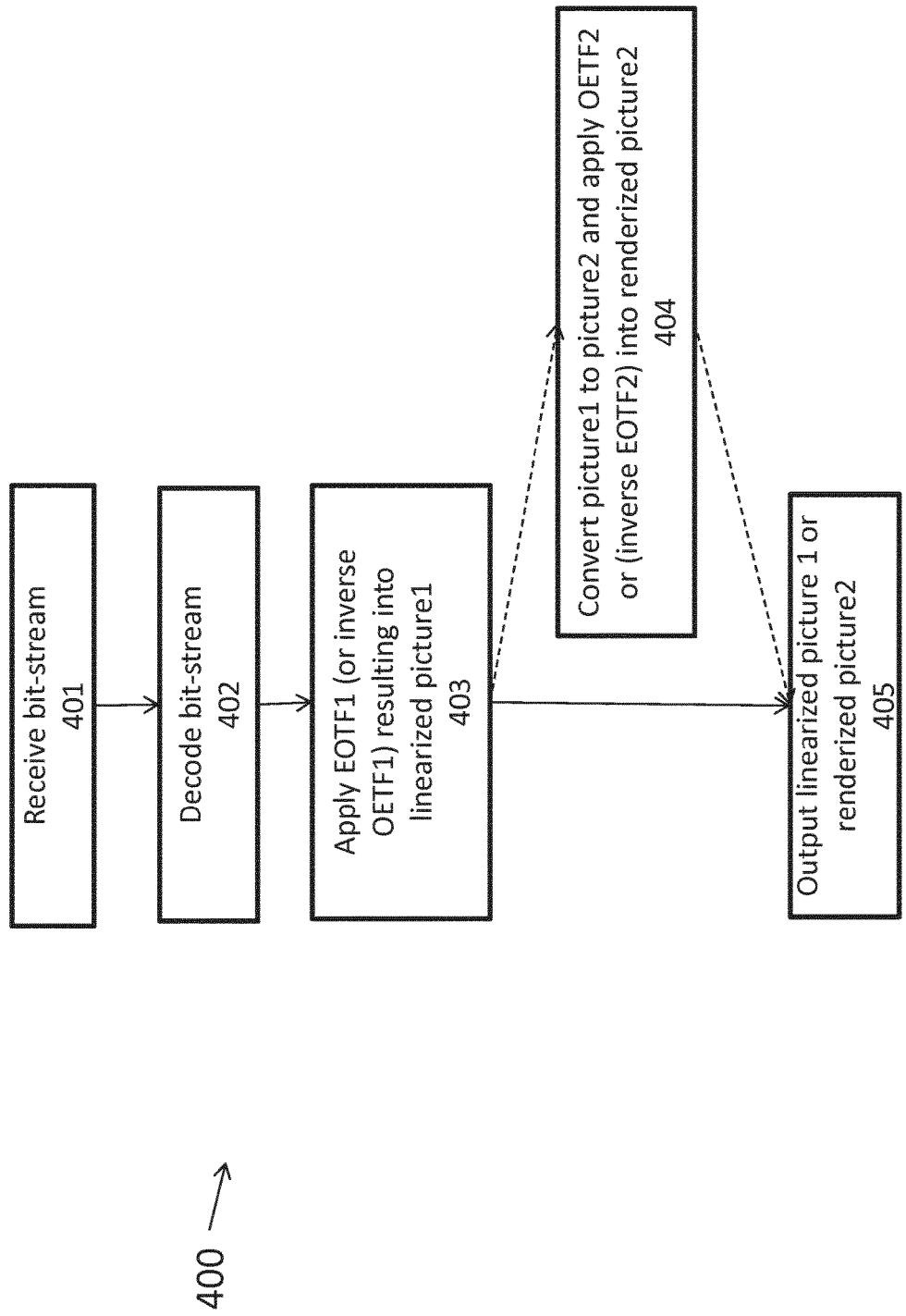
FIG. 4 is a diagram depicting an exemplary method for decoding an encoded picture using EOTF or inverse parameterized OETF in a distribution and rendering system.

FIG. 4 is a diagram depicting an exemplary method 400 for decoding an encoded picture using EOTF or inverse OETF, for example in a distribution and rendering system. In this method 400, an encoded bit-stream may be received and decoded using any decoding technique (e.g., HEVC, AVC). Method 400 may be performed by a mobile device; a communication device; a game device; a tablet (or tablet computer); a laptop; a display; a still picture camera; a video camera; a decoding chip; a still picture server; a Blu-ray player; and a video server (e.g. a broadcast server, a video-on-demand server or a web server). Method 400 may also be performed in any other device or system of the like.

Method 400 includes a block 401. The block 401 may receive a bit-stream corresponding to a video sequence of encoded pictures or an encoded picture. The bit-stream may be encoded (e.g., using based on AVC, HEVC, etc. encoding). In one example, the encoded picture may be a compressed picture that has been encoded (e.g., using JPEG, AVC, HEVC encoders). In another example, the encoded picture may be digitized or quantized picture without compression and block 401 may pass control to block 403. The block 401 may then pass control to block 402.

The block 402 may decode the bit-stream received from block 401. In one example, block 402 may decode the bit stream using HEVC based decoding. In one example, block 402 may decode a encoded picture. In one example, block 402 may decode a Y'CbCr picture. Block 402 may then derive an $R_1'G_1'B_1'$ picture from the Y'CbCr picture. In another example, block 402 may decode a $R_1'G_1'B_1'$ picture. Block 402 may then pass control to block 403.

Block 403 may then apply a first EOTF (EOTF1) or a first inverse OETF (OETF1) to the V(L) signal representing a picture decoded from the bit-stream in block 402. V(L) may be defined in accordance with present principles described herewith. In one example, EOTF1 or inverse OETF1 may be applied to each pixel. In one example, the EOTF1 or inverse OETF1 may be applied to the Y' value of each pixel. In one example, the EOTF1 or inverse OETF1 may be applied to the $R_1'G_1'B_1'$ of each pixel. The resulting picture may be known as a first linearized luminance picture (e.g., $R_1G_1B_1$ picture or $YR_1B_1$ picture). In one example the EOTF1 or inverse OETF1 may be performed by creating a Look-Up Table (LUT) with tabulated values (e.g., based on Eqn. Nos. 2, 3, 5, 6 or 69) and then applying the LUT on the content to be mapped/demapped.

Block 403 may then pass control to optional block 404. Optional block 404 may optionally be performed on the first linearized luminance picture received from block 403. Block 404 may convert the first linearized luminance picture 1 into a picture 2. In one example, block 404 may convert a picture $R_1G_1B_1$ to a picture $R_2G_2B_2$. The picture 2 may be represented in a color space determined by the color primaries of the renderer (e.g., SMPTE RP 177 describes how to compute this conversion with primaries of the renderer and results are given in BT.709, BT.2020, etc.). Block 404 may then apply an OETF2 or an inverse EOTF2 to the picture 2. The result may be a renderized picture 2 that is consistent with the capabilities of the renderer. Block 404 may then pass control to block 405.

Block 405 may output either the renderized picture 2 from block 404, if block 404 is performed, or the linearized luminance picture from block 403 if block 404 is not performed. In one example, block 405 may output the picture to an image processing pipeline that displays the image and/or video containing the image.

Figure 5:
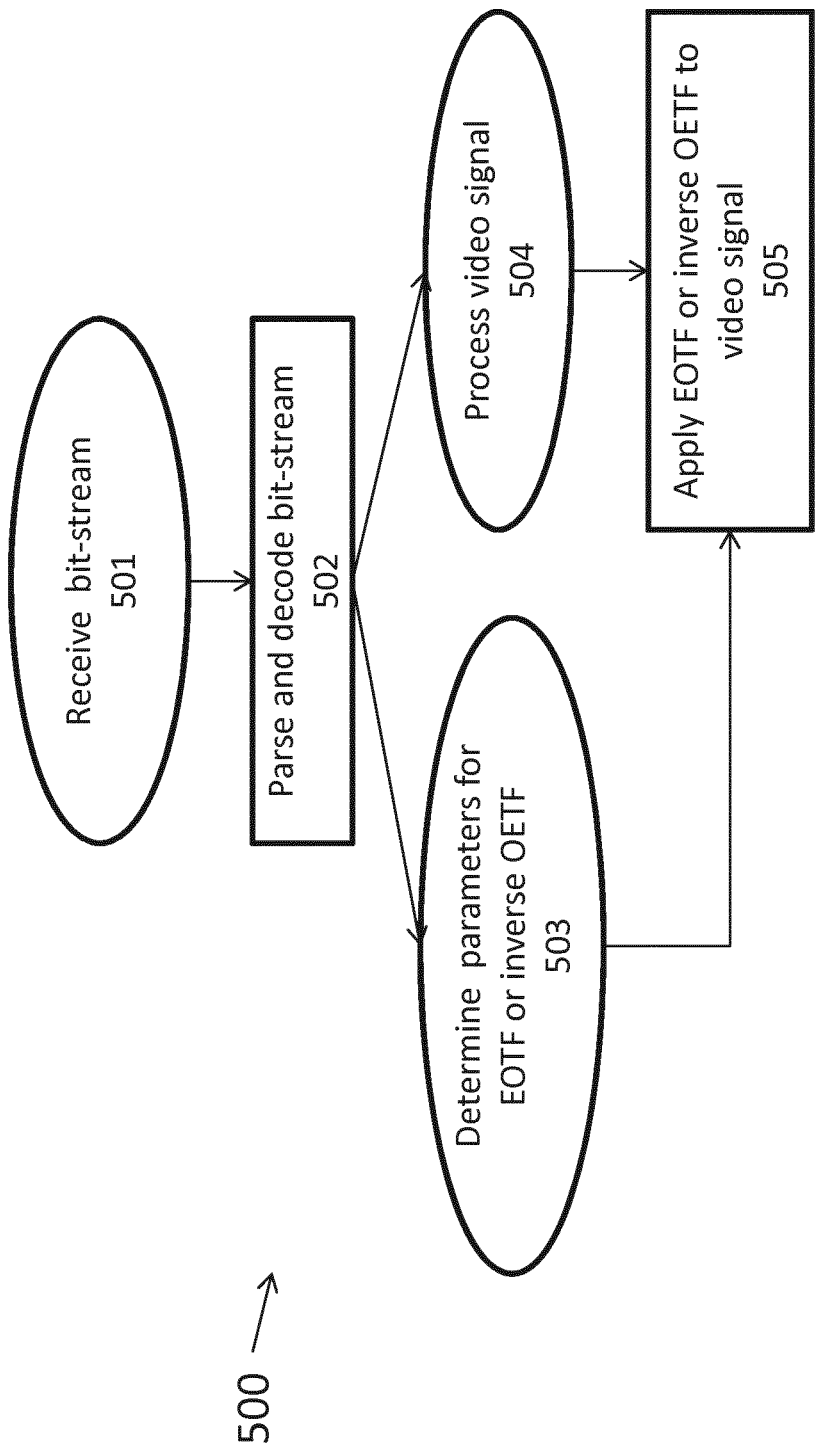
FIG. 5 is a diagram depicting an exemplary method for decoding parameters of a parameterized EOTF or inverse parameterized OETF in accordance with present principles

FIG. 5 is a diagram depicting an exemplary method 500 for decoding parameters of a parameterized EOTF or inverse parameterized OETF in accordance with present principles. The method 500 provides a process for decoding the parameter syntax elements in accordance with present principles. The parameters may be any parameters discussed herewith in accordance with present principles. The method 500 includes a block 501.

Block 501 may receive a bit-stream corresponding to a video sequence. The received bit-stream is encoded (e.g., using AVC, HEVC, etc. encoding). Block 502 may then pass control to block 502.

Block 502 may parse and decode the bit-stream received from block 501. In one example, the block 502 may parse and decode the bit-stream using HEVC based decoding. Block 502 may then pass control to blocks 503 and 504.

Block 503 may determine EOTF or inverse OETF parameters from the decoded bit-stream in block 502. In one example, the parameters (s, t, c, m, n) are determined based off of syntax contained in the bit-stream (e.g., an SEI message). Block 503 may then pass control to block 505.

Block 504 may process the video signal decoded in block 502. In one example, block 504 may process a decoded Y'CbCr video signal. In one example, block 504 may convert a Y'CbCr video signal to a R'G'B' video signal. In another example, block 504 may process a R'G'B' video signal. Block 504 may then pass control to block 505.

Block 505 may then apply an EOTF or inverse OETF to the video signal V(L) from block 504 based on the parameters received from block 503. V(L) may be defined in accordance with present principles described herewith. In one example, block 505 may convert video signal from R'G'B' to a linear light RGB. In one example, block 505 may apply an EOTF or an inverse EOTF based on Eqn. Nos. 2, 3, 5, 6 or 69. In one example, block 505 may create a Look Up Table (LUT) with tabulated values (e.g., based on Eqn. Nos. 2, 3, 5, 6 or 69) and then applying the LUT on the content to be mapped/demapped.

Figure 6:
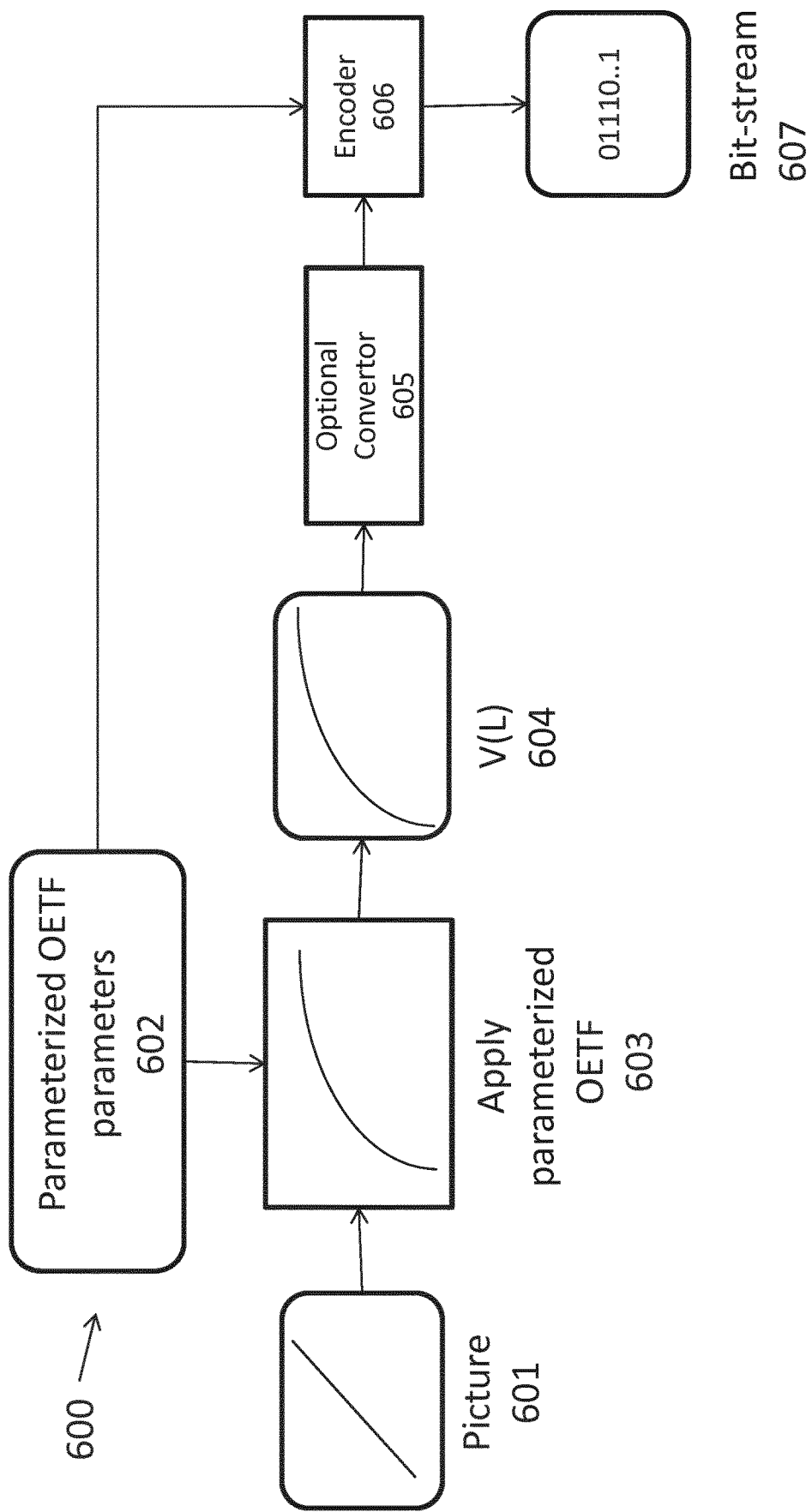
FIG. 6 is a diagram depicting an exemplary scheme of encoding a picture using a parameterized OETF in accordance with present principles.

FIG. 6 is a diagram depicting an exemplary scheme 600 of encoding a picture using a parameterized OETF in accordance with present principles. FIG. 6 includes a block 601 that provides a picture. In one example, the picture may be an RGB linear light picture. In another example, the picture may be a YRB picture. Block 602 provides parameters (e.g., (s, t, c, n, m)) for a parameterized OETF in accordance with present principles. Block 602 may generate a parameterized OETF. Block 603 may apply a parameterized OETF based on the parameters from block 602 to the picture received from block 601 in accordance with present principles described above, including in connection with FIGS. 1-3. In one example, the result of block 603 may be a resulting V(L) electrical signal at block 604. In one example, V(L) may be a R'G'B' picture. In another example, V(L) may be a Y'CbCr picture. Scheme 600 may include an optional convertor 605 which may convert an R'G'B' picture to Y'CbCr picture. The output of convertor 605 may be provided to a video encoder 606 (e.g., an HEVC encoder). The encoder 606 may encode the picture and output a bit stream at block 607.

Figure 7:
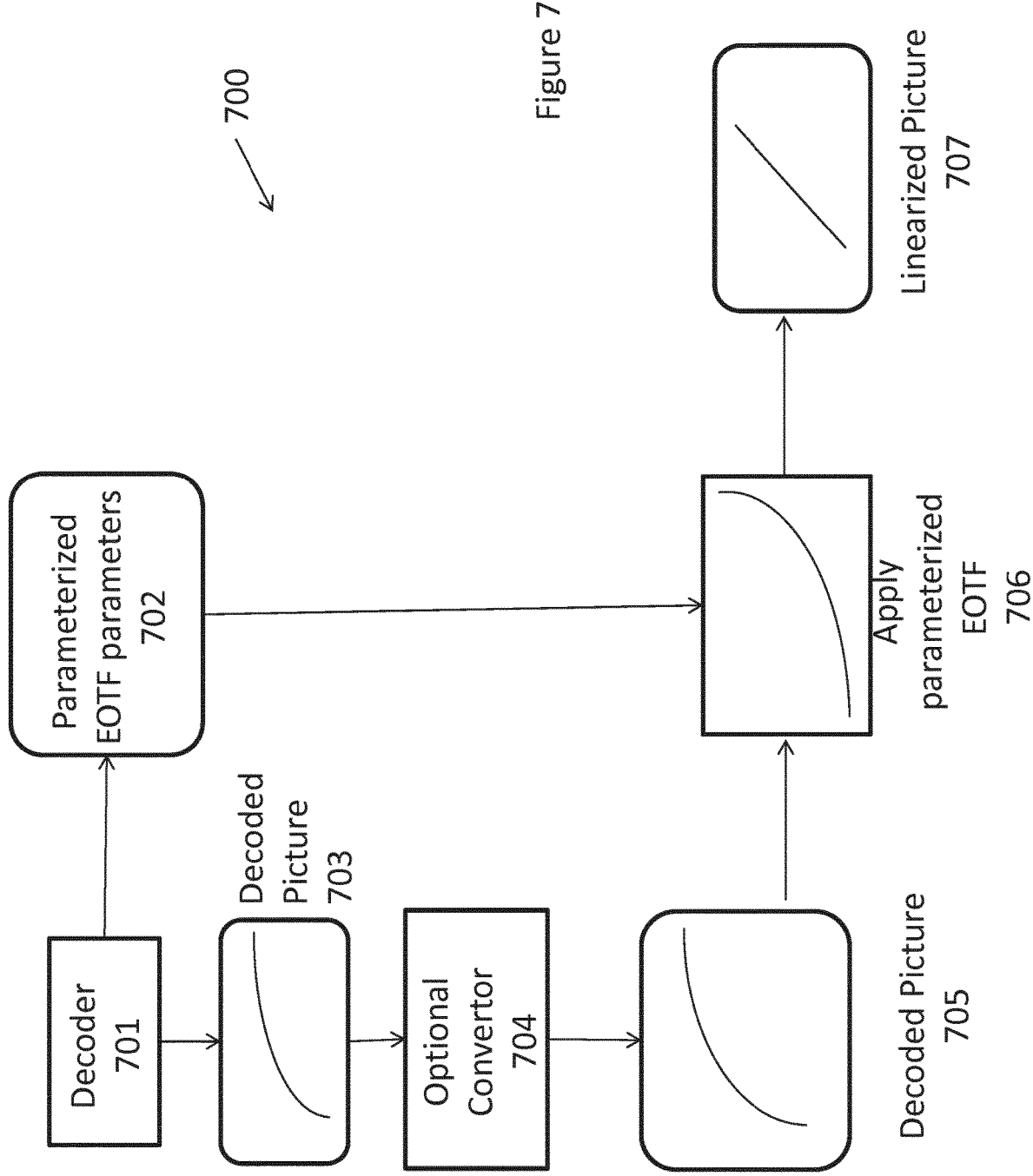
FIG. 7 is a diagram depicting an exemplary scheme of decoding an encoded picture using a parameterized EOTF or inverse parameterized OETF in accordance with present principles.

FIG. 7 is a diagram depicting an exemplary scheme 700 of decoding a encoded picture using a parameterized EOTF or inverse OETF in accordance with present principles. FIG. 7 includes a decoder 701 that may decode and output at block 702 parameters for a parameterized EOTF (or inverse OETF) in accordance with present principles. Decoder 701 may further decode and output at block 703 a decoded picture. In one example, the picture may be a Y'CbCr picture. In another example, the picture may be a R'G'B' picture. An optional convertor 704 may convert an Y'CbCr picture into a R'G'B' picture and output the R'G'B' picture at block 705. Block 706 may apply a parameterized EOTF (or inverse OETF) to the picture from block 705 based on the parameters received from block 702 in accordance with present principles described above, including in connection with FIGS. 1-3. Block 706 may output the resulting linearized picture at block 707. In one example, the linearized light picture may be a linear light RGB picture. In another example, the linearized light picture may be a linear light YRB picture.

Figure 8:
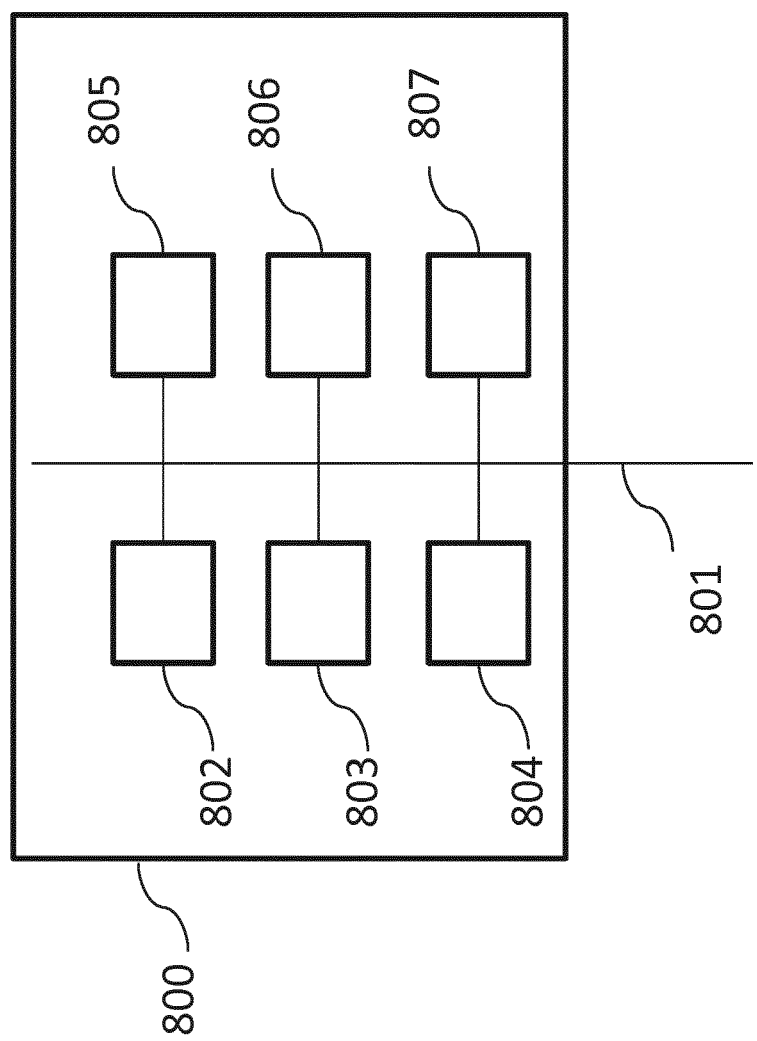
FIG. 8 represents an exemplary architecture of a device which may be configured to implement a method described in relation with FIG. 1-7.

FIG. 8 represents an exemplary architecture of a device 800 which may be configured to implement methods described in relation with FIG. 1-7. In one example, FIG. 8 represents an apparatus that may be configured to implement the encoding method according to present principles, including principles described in relation to FIGS. 1-3 and 6. In one example, FIG. 8 represents an apparatus that may be configured to implement the decoding method according to present principles, including principles described in relation to FIGS. 4-5 and 7.

Device 800 comprises following elements that are linked together by a data and address bus 801:
- a microprocessor 802 (or CPU), which is, for example, a DSP (or Digital Signal Processor);
- a ROM (or Read Only Memory) 803;
- a RAM (or Random Access Memory) 804;
- an I/O interface 805 for reception and transmission of data, e.g., from a user interface device;
- a battery 806 (or other suitable power source); and
- a display 807.

According to a variant, the battery 806 is external to the device. In each of mentioned memory, the word <<register>> used in the specification can correspond to area of small capacity (some bits) or to very large area (e.g. a whole program or large amount of received or decoded data). ROM 803 comprises at least a program and parameters. Algorithm of the methods according to the invention is stored in the ROM 803. When switched on, the CPU 802 uploads the program in the RAM and executes the corresponding instructions.

RAM 804 comprises, in a register, the program executed by the CPU 802 and uploaded after switch on of the device 800, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific example of encoding or encoder, the image or picture I is obtained from a source. For example, the source belongs to a set comprising:
- a local memory (803 or 804), e.g. a video memory or a RAM (or Random Access Memory), a flash memory, a ROM (or Read Only Memory), a hard disk;
- a storage interface (805), e.g. an interface with a mass storage, a RAM, a flash memory, a ROM, an optical disc or a magnetic support;
- a communication interface (805), e.g. a wireline interface (for example a bus interface, a wide area network interface, a local area network interface) or a wireless interface (such as a IEEE 802.11 interface or a Bluetooth® interface); and
- an image capturing circuit (e.g. a sensor such as, for example, a CCD (or Charge-Coupled Device) or CMOS (or Complementary Metal-Oxide-Semiconductor)).

According to different embodiments of the decoding or decoder, the decoded image Î is sent to a destination; specifically, the destination belongs to a set comprising:
- a local memory (803 or 804), e.g. a video memory or a RAM, a flash memory, a hard disk;
- a storage interface (805), e.g. an interface with a mass storage, a RAM, a flash memory, a ROM, an optical disc or a magnetic support;
- a communication interface (805), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, Wi-Fi® or a Bluetooth® interface); and
- a display (807).

According to different examples of encoding or encoder, the bitstream BF and/or F are sent to a destination. As an example, one of bitstream F and BF or both bitstreams F and BF are stored in a local or remote memory, e.g. a video memory (804) or a RAM (804), a hard disk (803). In a variant, one or both bitstreams are sent to a storage interface (805), e.g. an interface with a mass storage, a flash memory, ROM, an optical disc or a magnetic support and/or transmitted over a communication interface (805), e.g. an interface to a point to point link, a communication bus, a point to multipoint link or a broadcast network.

According to different examples of decoding or decoder, the bitstream BF and/or F is obtained from a source. Exemplarily, the bitstream is read from a local memory, e.g. a video memory (804), a RAM (804), a ROM (803), a flash memory (803) or a hard disk (803). In a variant, the bitstream is received from a storage interface (805), e.g. an interface with a mass storage, a RAM, a ROM, a flash memory, an optical disc or a magnetic support and/or received from a communication interface (805), e.g. an interface to a point to point link, a bus, a point to multipoint link or a broadcast network.

According to different examples, device 800 being configured to implement an encoding method in accordance with present principles, belongs to a set comprising:
- a mobile device;
- a communication device;
- a game device;
- a tablet (or tablet computer);
- a laptop;
- a still image camera;
- a video camera;
- an encoding chip;
- a still image server; and
- a video server (e.g. a broadcast server, a video-on-demand server or a web server).

According to different examples, device 800 being configured to implement a decoding method in accordance with present principles, belongs to a set comprising:
- a mobile device;
- a communication device;
- a game device;
- a set top box;
- a TV set;
- a tablet (or tablet computer);
- a laptop;
- a display and
- a decoding chip.

FIG. 9 illustrates an example of a plot demonstrating performance results of the parameterized OETF in accordance with present principles (labeled TCH) relative to other existing OETFs. The plot may be determined based on Eqn.

1. The X axis pertains to the normalized luminance values of the picture. The Y axis pertains to the normalized codeword values of the bit-stream.

Figure 10A:
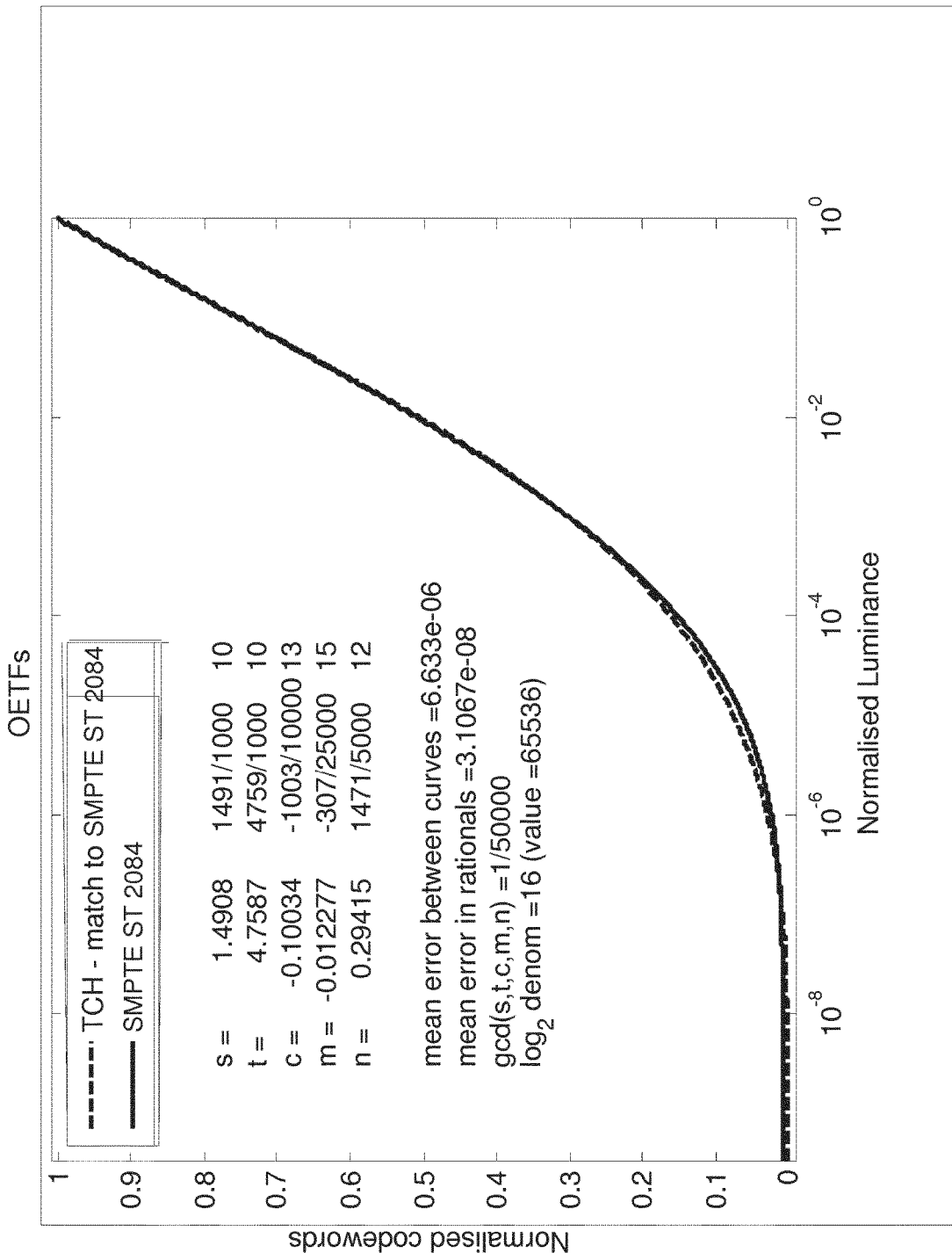
FIG. 10A illustrates an example of a plot demonstrating performance of the results of the parameterized OETF in accordance with present principles (labeled TCH) relative to SMPTE ST 2084 OETF curve.

FIG. 10A illustrates an example of a plot demonstrating performance of the results of the parameterized OETF in accordance with present principles (labeled TCH) relative to SMPTE ST 2084 OETF curve. The plot may be determined based on Eqn. 1 above. The X axis pertains to the normalized luminance of the picture. The Y axis pertains to the normalized codeword values of the bit-stream.

Figure 10B:
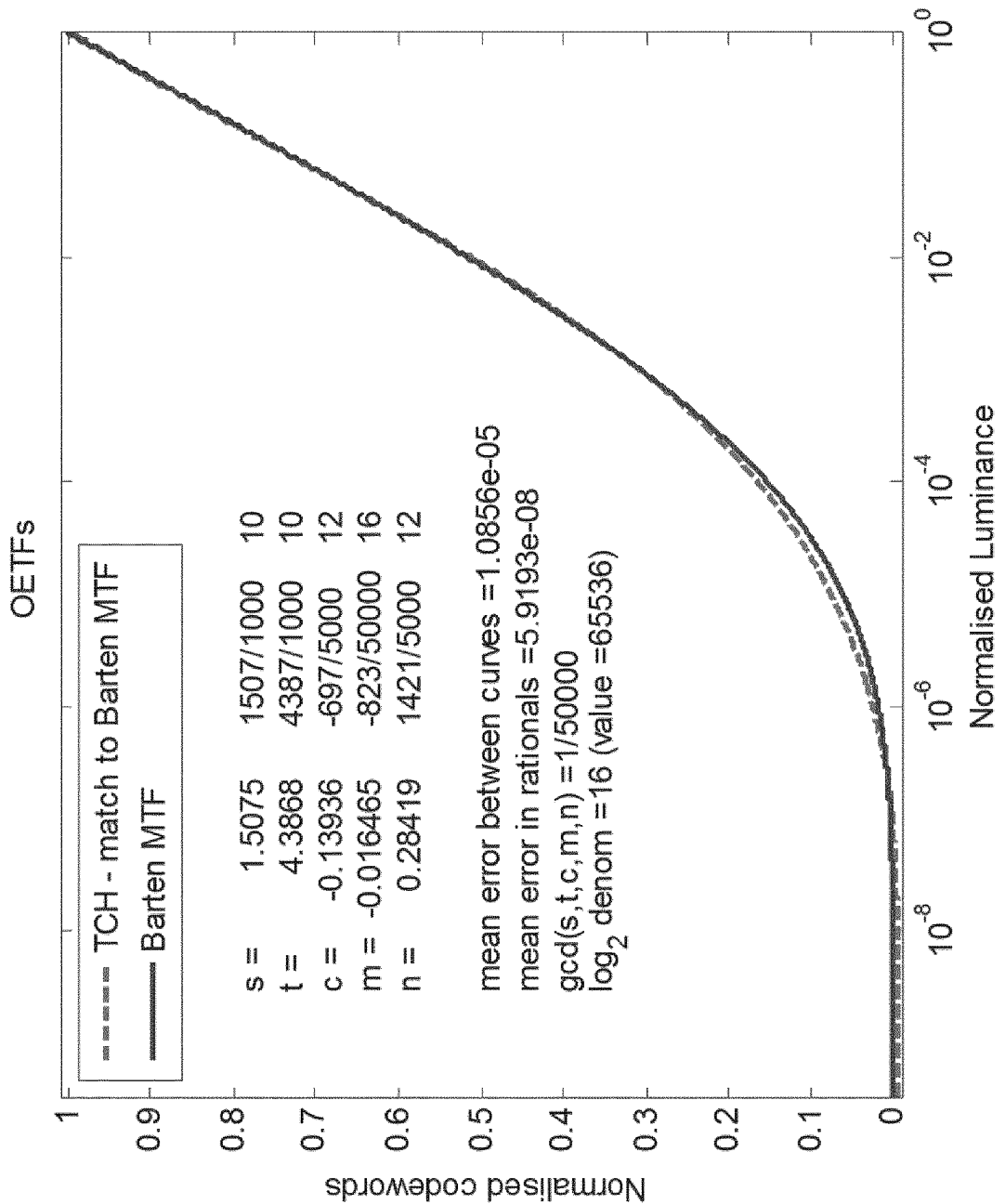
FIG. 10B illustrates an example of a plot demonstrating performance of the results of the parameterized OETF in accordance with present principles (labeled TCH) relative to Barten MTF (modulation transfer function) curve.

FIG. 10B illustrates an example of a plot demonstrating performance of the results of the parameterized OETF in accordance with present principles (labeled TCH) relative to Barten MTF curve. The plot may be determined based on Eqn. 1 above. The X axis pertains to the normalized luminance of the picture. The Y axis pertains to the normalized codeword values of the bit-stream. FIG. 10B further includes a look up table for the parameters.

Figure 10C:
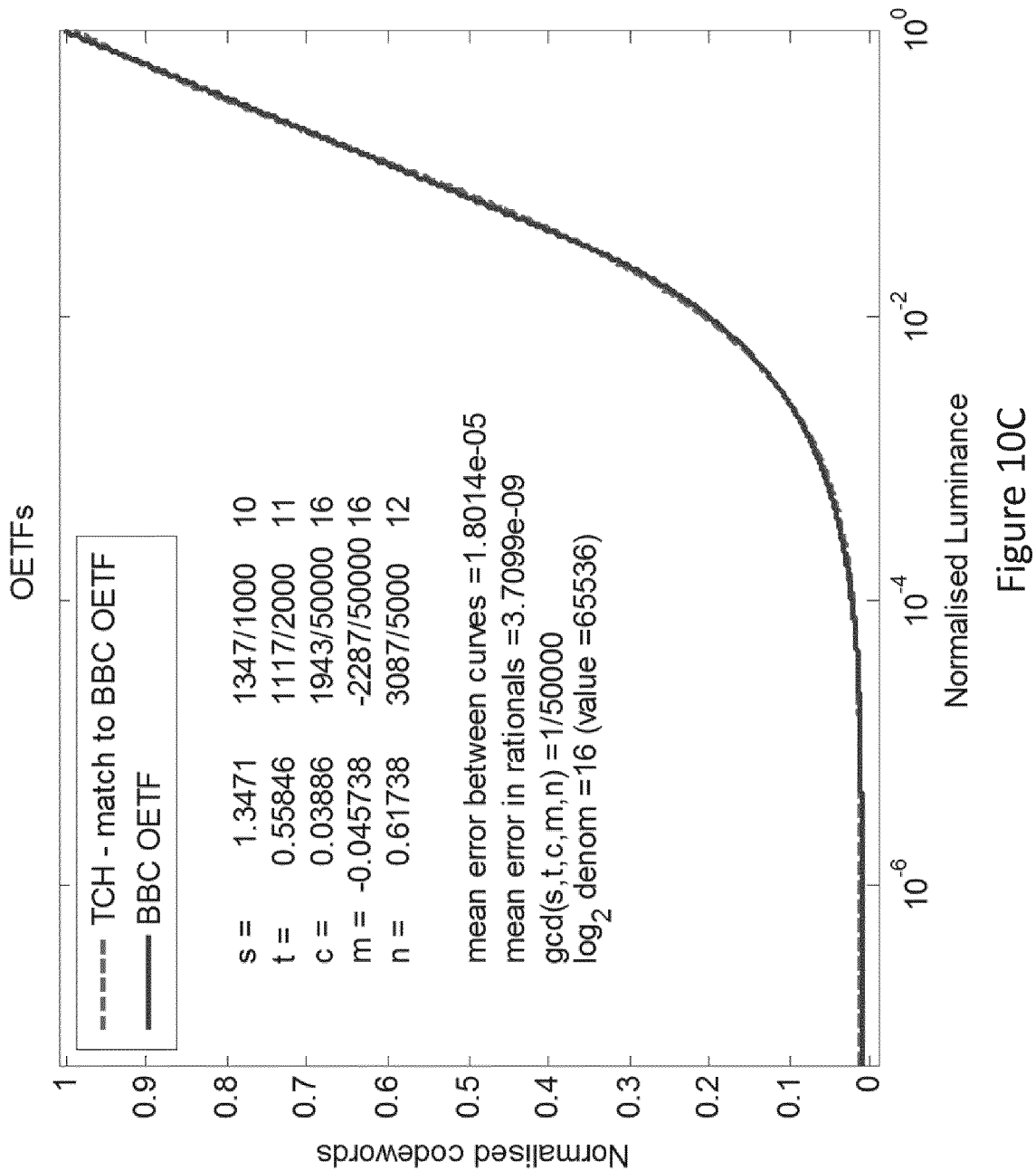
FIG. 10C illustrates an example of a plot demonstrating performance of the results of the parameterized OETF in accordance with present principles (labeled TCH) relative to BBC OETF curve.

FIG. 10C illustrates an example of a plot demonstrating performance of the results of the parameterized OETF in accordance with present principles (labeled TCH) relative to BBC OETF curve. The plot may be determined based on Eqn. 1 above. The X axis pertains to the normalized luminance of the picture. The Y axis pertains to the normalized codeword values of the bit-stream. FIG. 10C further includes a look up table for the parameters.

FIGS. 10A, 10B and 10C additionally show the values of parameters s, t, c, n and m that were used to generate the curves labelled TCH. In addition these figures show approximations of these parameter values as ratios of integers.

Figure 11A:
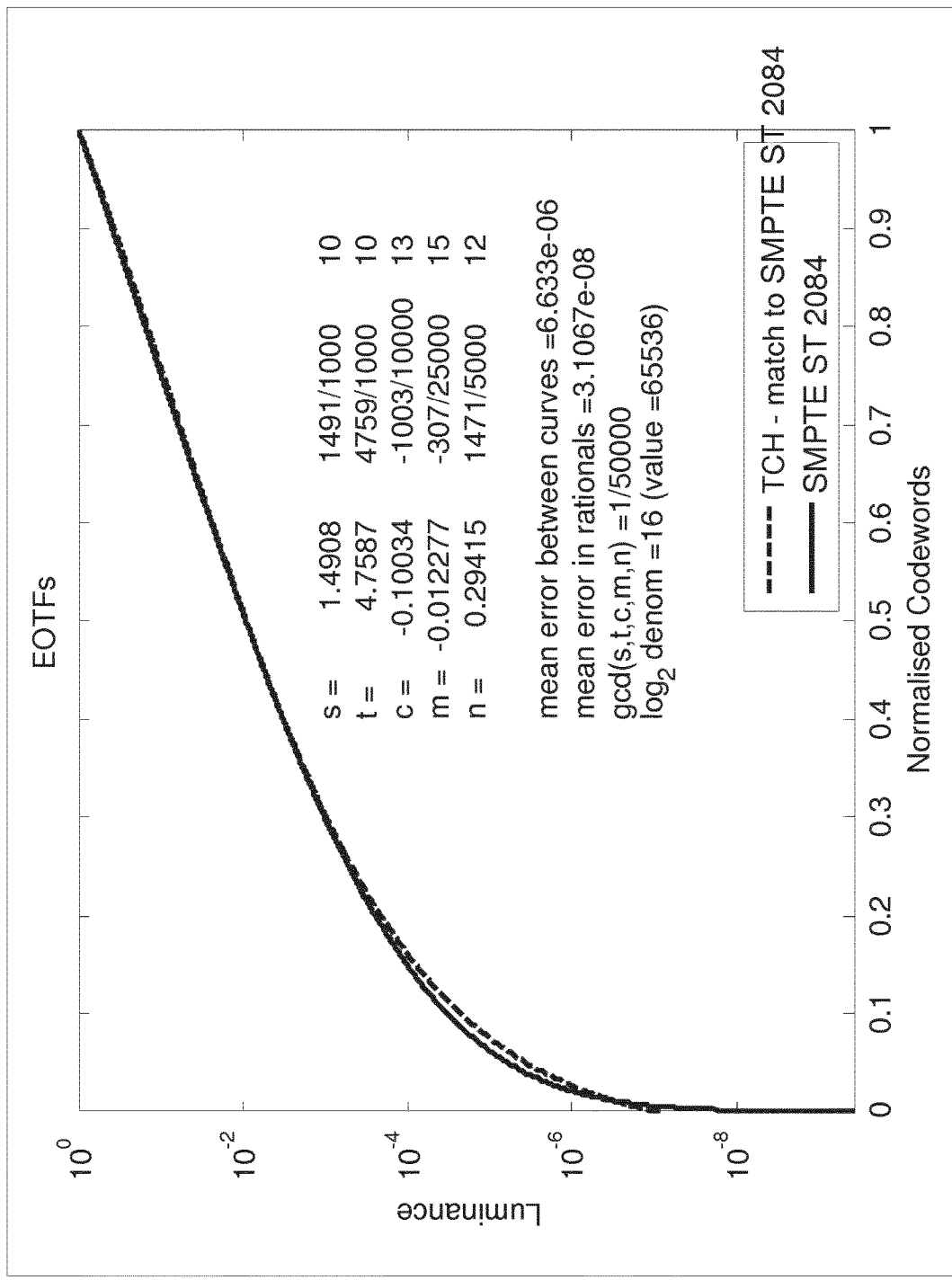
FIG. 11A illustrates an example of a plot demonstrating performance of the results of the parameterized EOTF (or inverse OETF) in accordance with present principles (labeled TCH) relative to SMPTE ST 2084 OETF curve.

FIG. 11A illustrates an example of a plot demonstrating performance of the results of the parameterized EOTF (or inverse OETF) in accordance with present principles (labeled TCH) relative to SMPTE ST 2084 OETF curve. The plot may be determined based on Eqn. 2 above. The X axis pertains to the normalized codeword values of the bit-stream. The Y axis pertains to the normalized luminance of the picture.

Figure 11B:
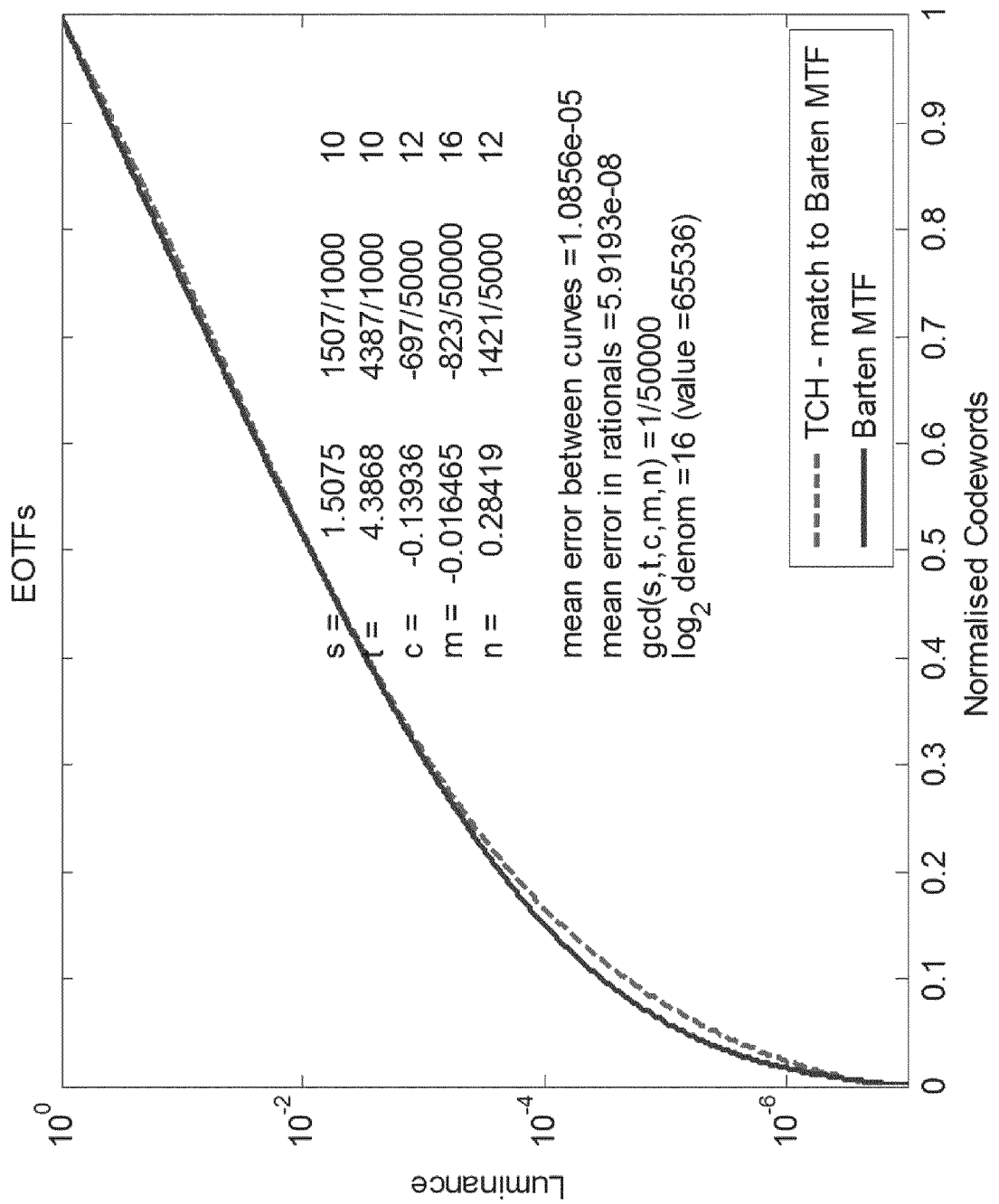
FIG. 11B illustrates an example of a plot demonstrating performance of the results of the parameterized EOTF (or inverse OETF) in accordance with present principles (labeled TCH) relative to Barten MTF curve.

FIG. 11B illustrates an example of a plot demonstrating performance of the results of the parameterized EOTF (or inverse OETF) in accordance with present principles (labeled TCH) relative to Barten MTF curve. The plot may be determined based on Eqn. 2 above. The X axis pertains to the normalized codeword values of the bit-stream. The Y axis pertains to the normalized luminance of the picture.

Figure 11C:
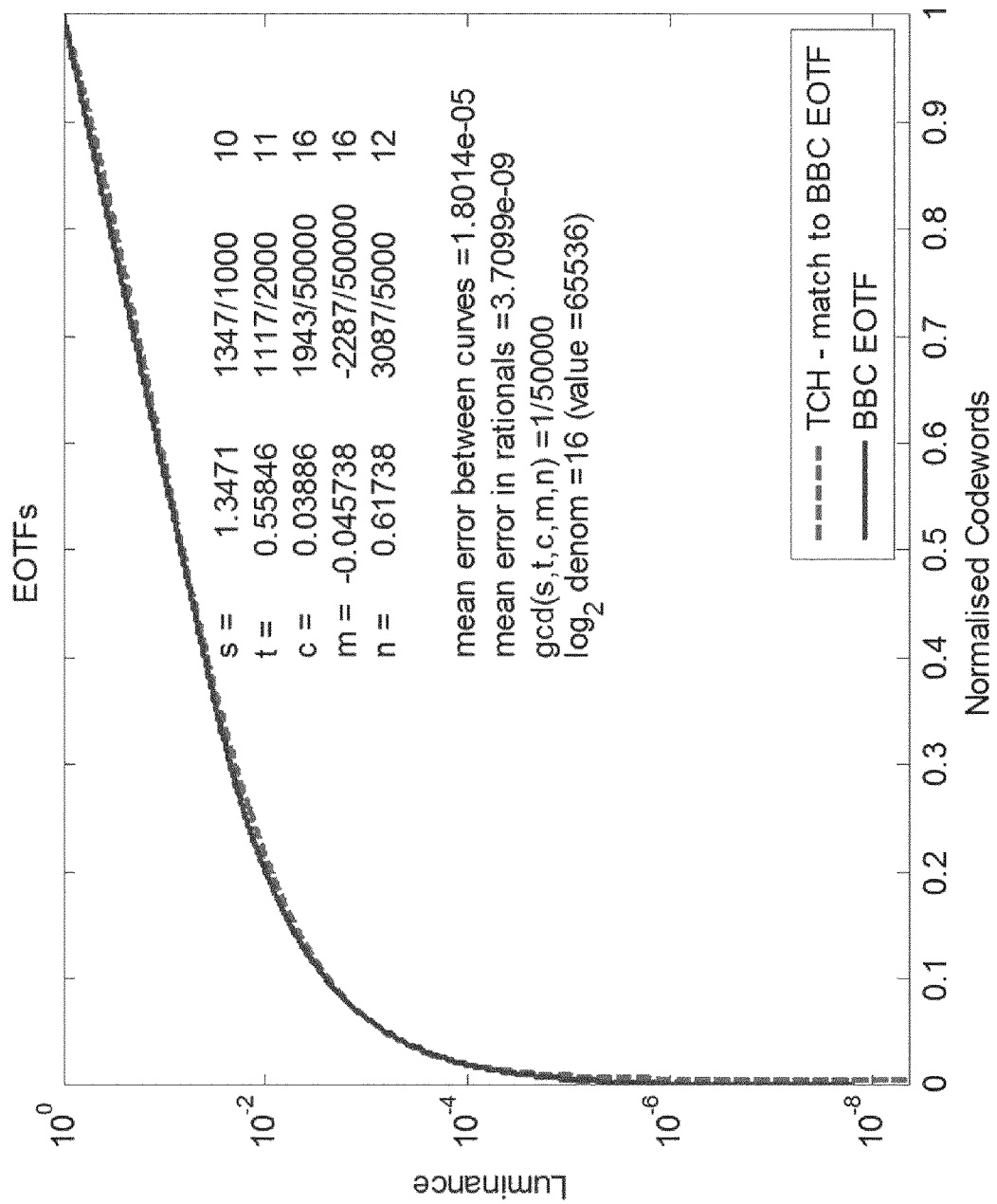
FIG. 11C illustrates an example of a plot demonstrating performance of the results of the parameterized EOTF (or inverse OETF) in accordance with present principles (labeled TCH) relative to BBC OETF curve.

FIG. 11C illustrates an example of a plot demonstrating performance of the results of the parameterized EOTF (or inverse OETF) in accordance with present principles (labeled TCH) relative to BBC OETF curve. The plot may be determined based on Eqn. 2 above. The X axis pertains to the normalized codeword values of the bit-stream. The Y axis pertains to the normalized luminance of the picture.

FIGS. 11A, 11B and 11C additionally show the values of parameters s, t, c, n and m that were used to generate the curves labelled TCH. In addition these figures show approximations of these parameter values as ratios of integers.

Figure 12A:
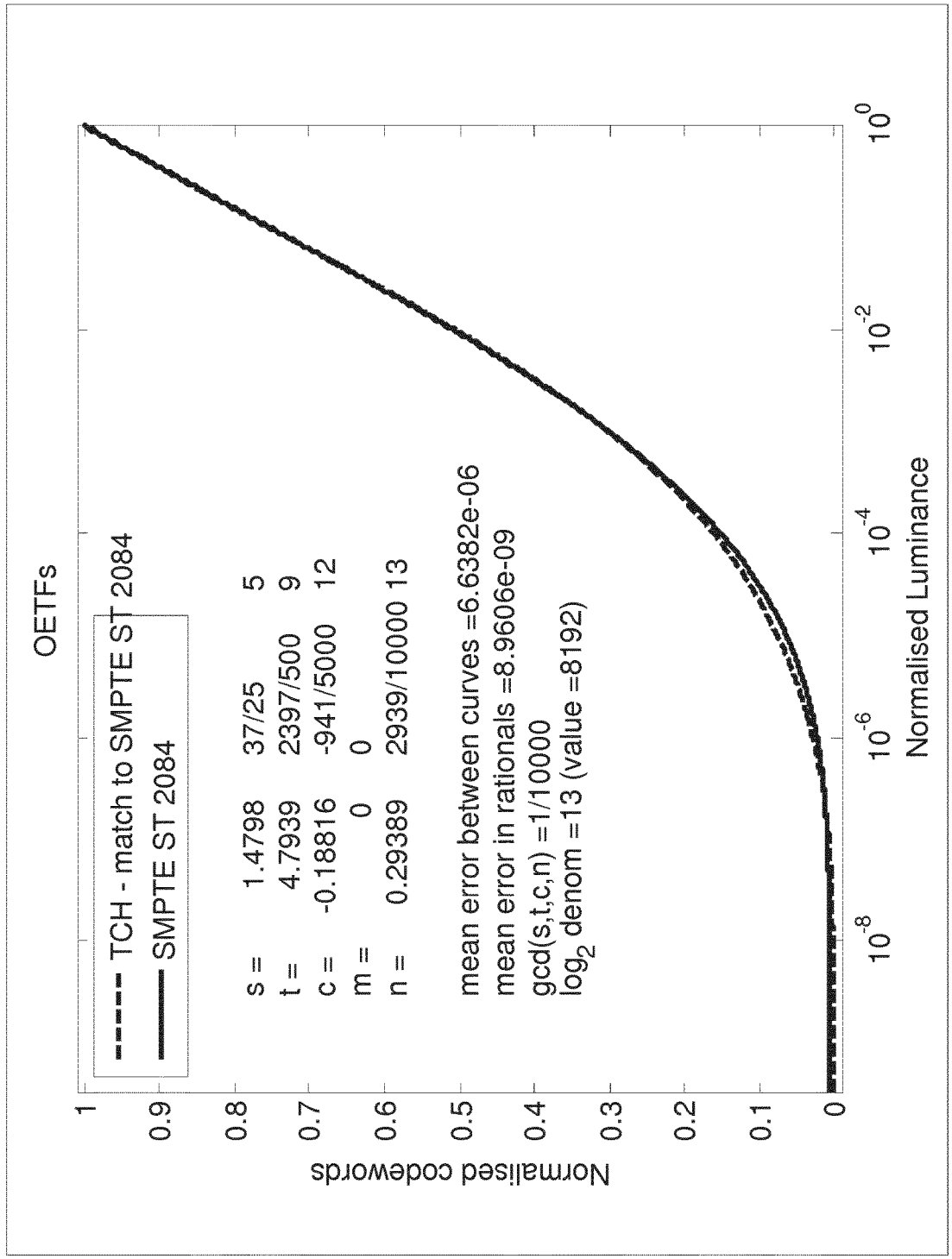
FIG. 12A illustrates an example of a plot demonstrating performance of the results of the parameterized OETF in accordance with present principles (labeled TCH) relative to SMPTE ST 2084 OETF curve.

FIG. 12A illustrates an example of a plot demonstrating performance of the results of the parameterized OETF in accordance with present principles (labeled TCH) relative to SMPTE ST 2084 OETF curve. The plot may be determined based on Eqn. 4 above based on four parameters. The X axis pertains to the normalized luminance of the picture. The Y axis pertains to the normalized codeword values of the bit-stream.

Figure 12B:
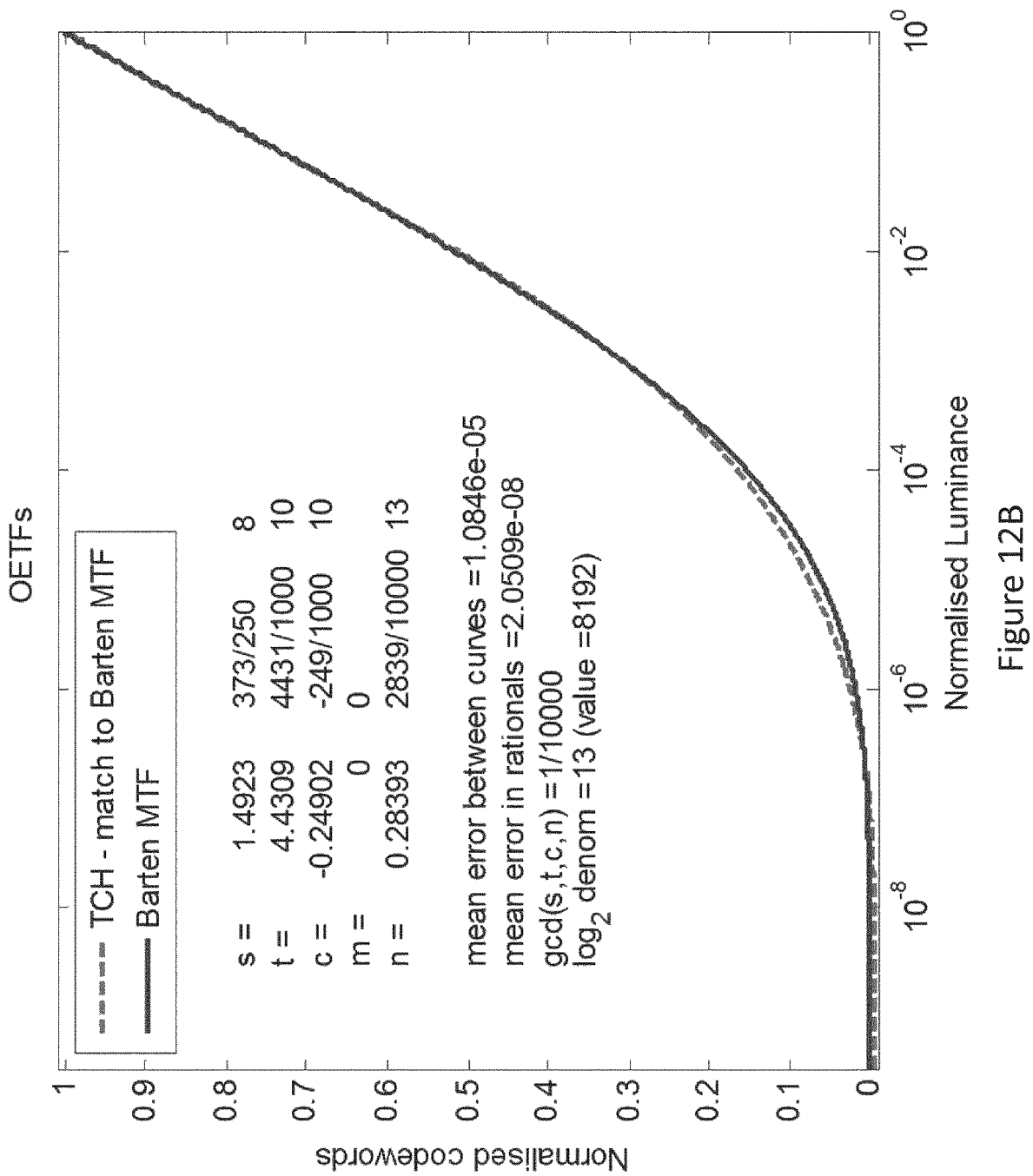
FIG. 12B illustrates an example of a plot demonstrating performance of the results of the parameterized OETF in accordance with present principles (labeled TCH) relative to Barten MTF curve.

FIG. 12B illustrates an example of a plot demonstrating performance of the results of the parameterized OETF in accordance with present principles (labeled TCH) relative to Barten MTF curve. The plot may be determined based on Eqn. 4 above based on four parameters. The X axis pertains to the normalized luminance of the picture. The Y axis pertains to the normalized codeword values of the bit-stream.

Figure 12C:
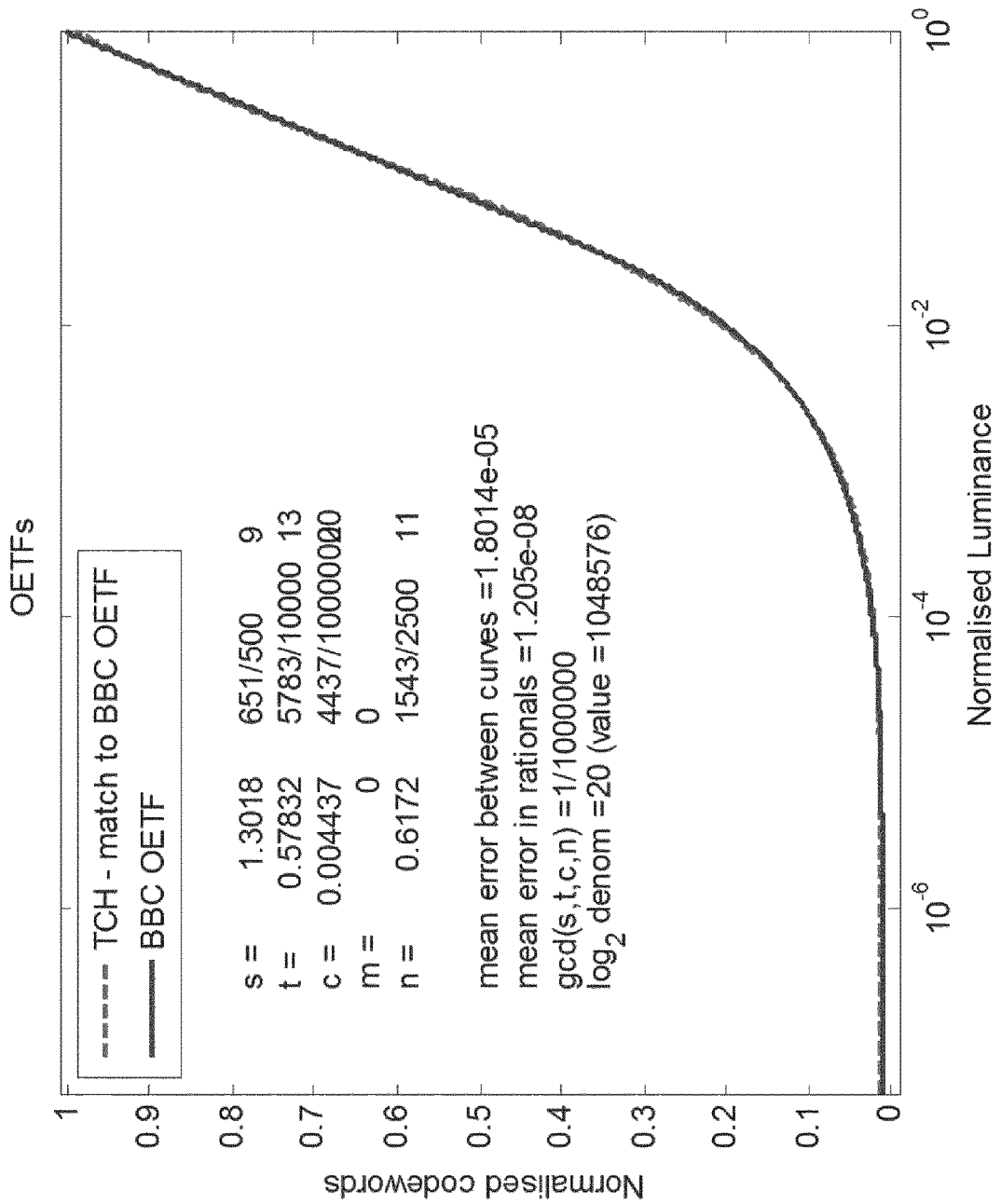
FIG. 12C illustrates an example of a plot demonstrating performance of the results of the parameterized OETF in accordance with present principles (labeled TCH) relative to BBC OETF curve.

FIG. 12C illustrates an example of a plot demonstrating performance of the results of the parameterized OETF in accordance with present principles (labeled TCH) relative to BBC OETF curve. The plot may be determined based on Eqn. 4 above based on four parameters. The X axis pertains to the normalized luminance of the picture. The Y axis pertains to the normalized codeword values of the bit-stream.

FIGS. 12A, 12B and 12C additionally show the values of parameters s, t, c, n and m that were used to generate the curves labelled TCH. In addition these figures show approximations of these parameter values as ratios of integers.

Figure 13A:
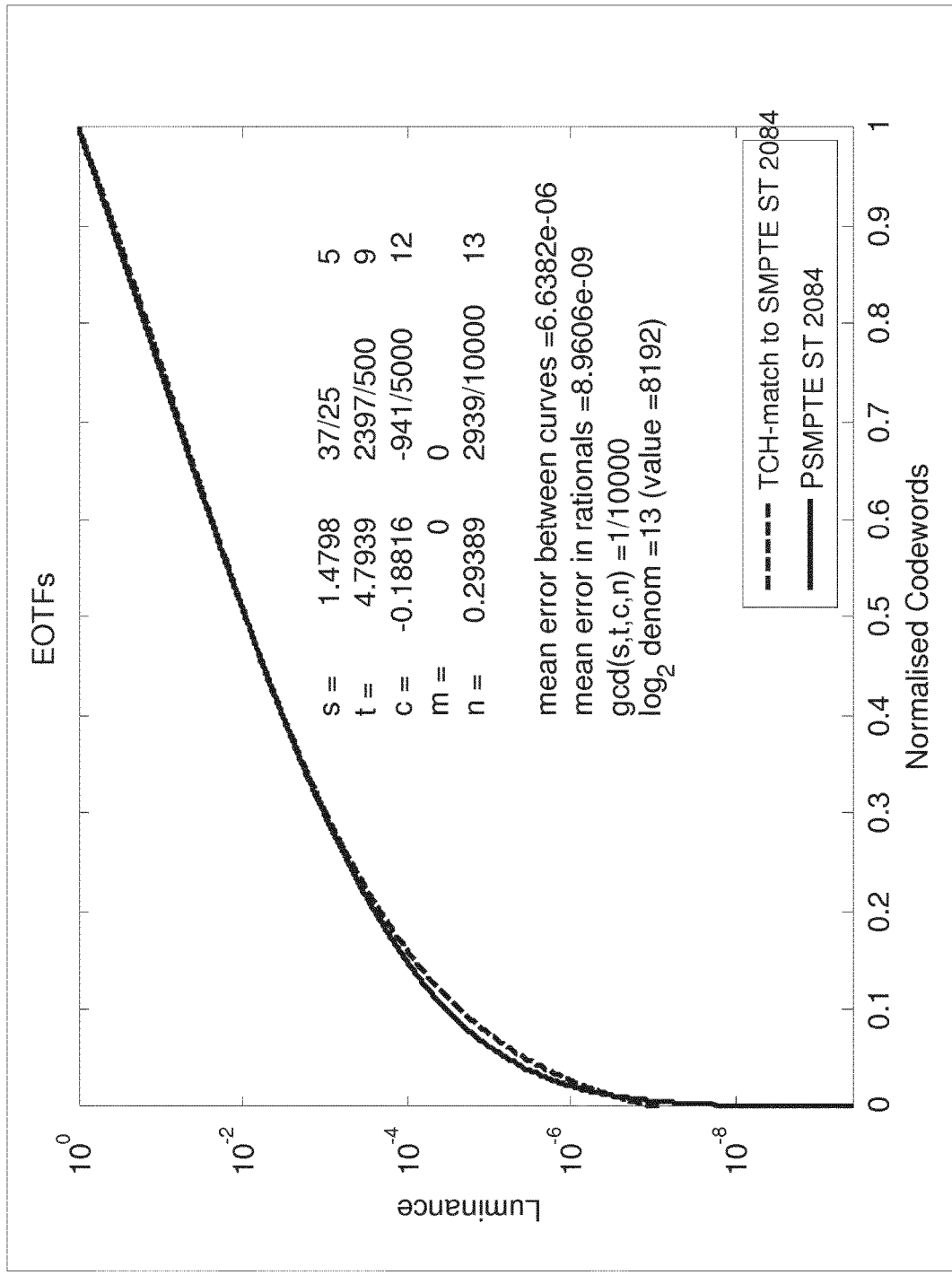
FIG. 13A illustrates an example of a plot demonstrating performance of the results of the parameterized EOTF (or inverse OETF) in accordance with present principles (labeled TCH) relative to SMPTE ST 2084 OETF curve.

FIG. 13A illustrates an example of a plot demonstrating performance of the results of the parameterized EOTF (or inverse OETF) in accordance with present principles (labeled TCH) relative to SMPTE ST 2084 OETF curve. The plot may be determined based on Eqn. 6 above based on four parameters. The X axis pertains to the normalized codeword values of the bit-stream. The Y axis pertains to normalized luminance of the picture.

Figure 13B:
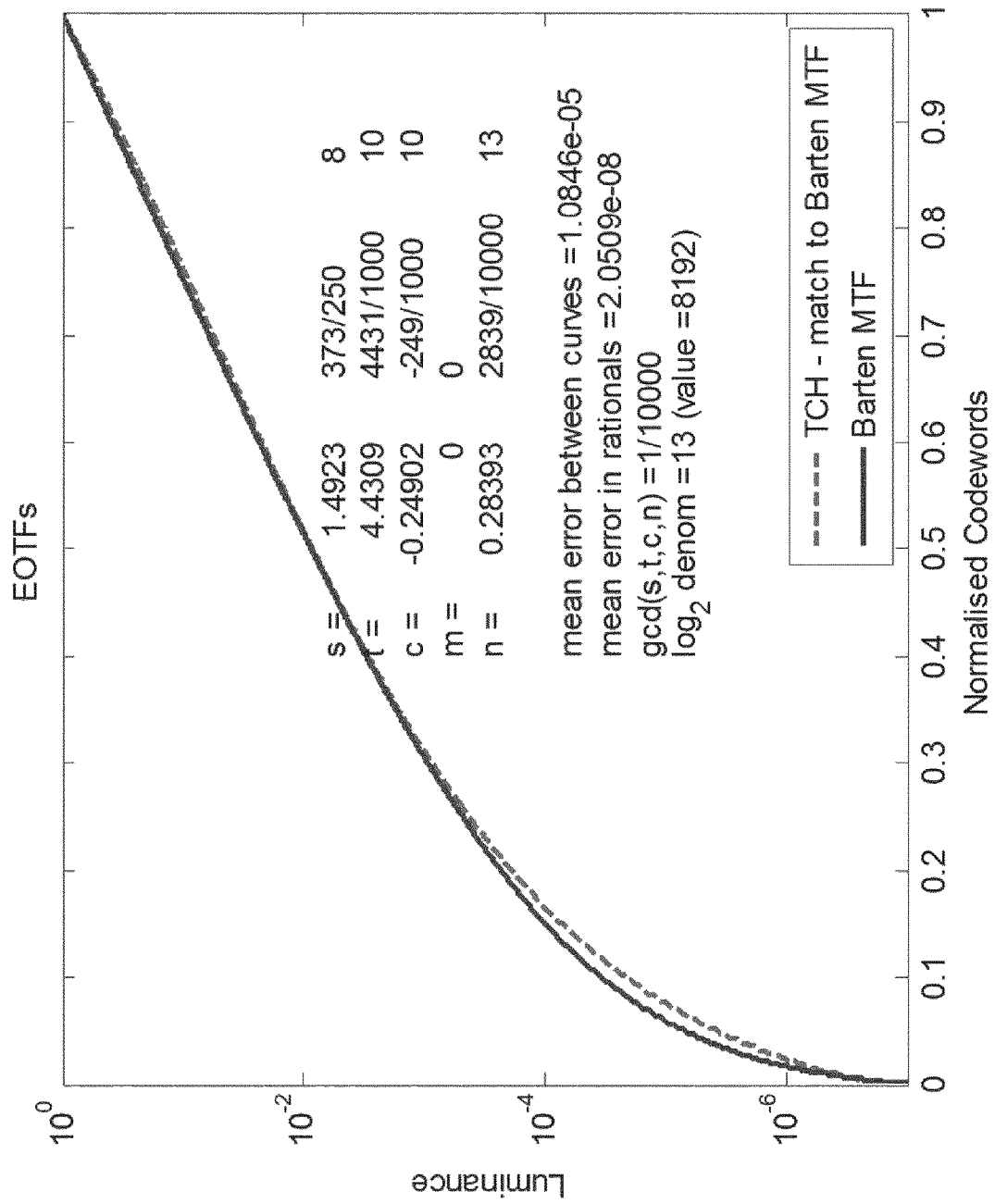
FIG. 13B illustrates an example of a plot demonstrating performance of the results of the parameterized EOTF (or inverse OETF) in accordance with present principles (labeled TCH) relative to Barten MTF curve.

FIG. 13B illustrates an example of a plot demonstrating performance of the results of the parameterized EOTF (or inverse OETF) in accordance with present principles (labeled TCH) relative to Barten MTF curve. The plot may be determined based on Eqn. 6 above based on four parameters. The X axis pertains to the normalized codeword values of the bit-stream. The Y axis pertains to normalized luminance of the picture.

Figure 13C:
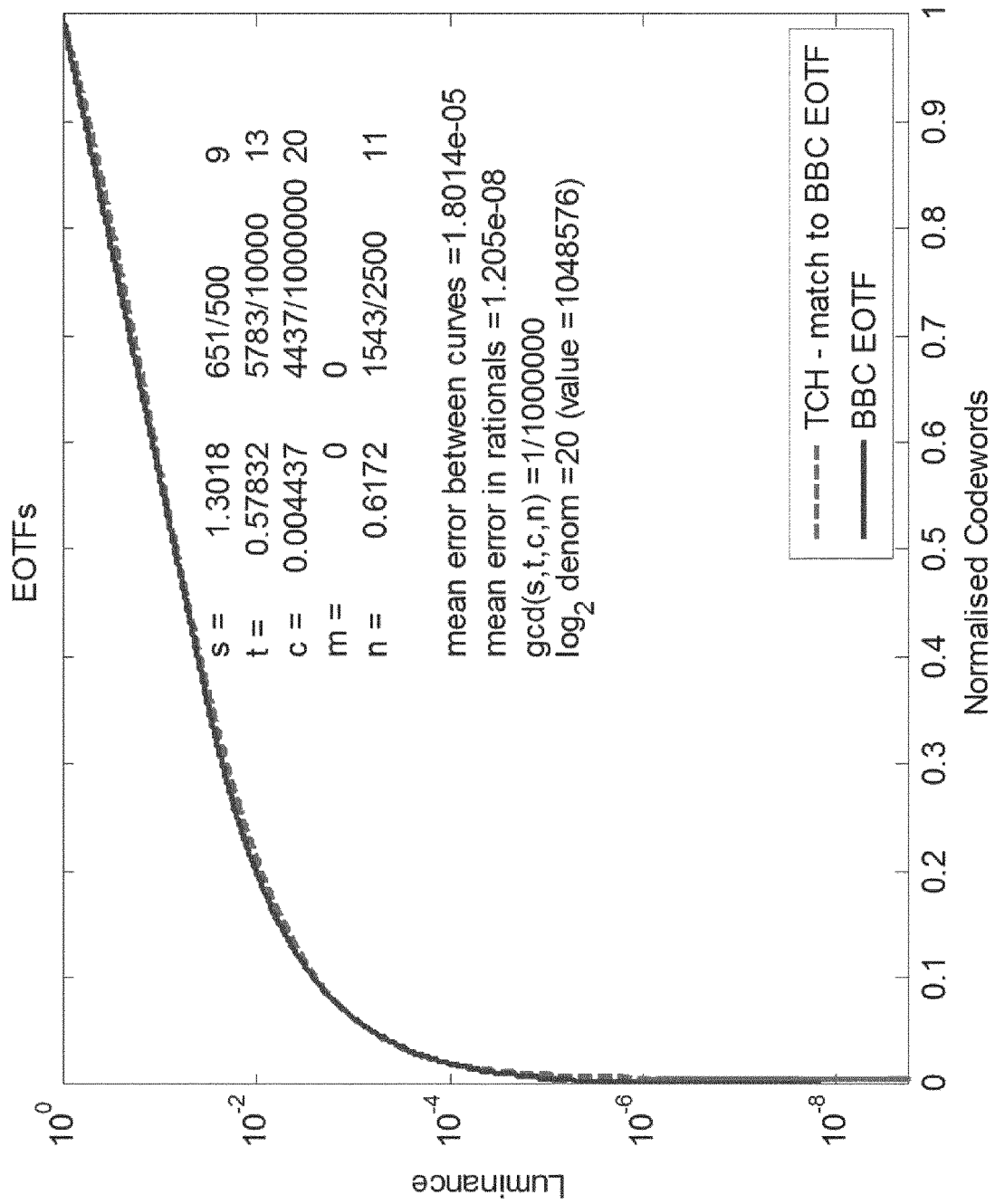
FIG. 13C illustrates an example of a plot demonstrating performance of the results of the parameterized EOTF (or inverse OETF) in accordance with present principles (labeled TCH) relative to BBC OETF curve.

FIG. 13C illustrates an example of a plot demonstrating performance of the results of the parameterized EOTF (or inverse OETF) in accordance with present principles (labeled TCH) relative to BBC OETF curve. The plot may be determined based on Eqn. 6 above based on four parameters. The X axis pertains to the normalized codeword values of the bit-stream. The Y axis pertains to normalized luminance of the picture.

FIGS. 13A, 13B and 13C additionally show the values of parameters s, t, c, n and m that were used to generate the curves labelled TCH. In addition these figures show approximations of these parameter values as ratios of integers.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example, or to carry as data the actual syntax-values written by a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

Numerous specific details have been set forth herein to provide a thorough understanding of the present invention. It will be understood by those skilled in the art, however, that the examples above may be practiced without these specific details. In other instances, well-known operations, components and circuits have not been described in detail so as not to obscure the present invention. It can be appreciated that the specific structural and functional details disclosed herein may be representative and do not necessarily limit the scope of the present invention.

Various examples of the present invention may be implemented using hardware elements, software elements, or a combination of both. Some examples may be implemented, for example, using a computer-readable medium or article which may store an instruction or a set of instructions that, if executed by a machine, may cause the machine to perform a method and/or operations in accordance with the examples. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus and constituents included therein, for example, a processor, an encoder and a decoder, may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

According to different embodiments, the parameterized transfer function is signaled in the picture encoded or decoded according to the invention, or in a stream including the picture. In some embodiments, an information representative of the parameterize transfer function is signaled in the picture or in the stream including the picture. This information is used by a decoding method or decoder to identify the parameterized transfer function that is applied according to the invention. In one embodiment, this information includes an identifier that is known on encoding and decoding side. According to other embodiments, this information includes parameters used as a basis for parameterized transfer functions. According to a variant of the invention, this information comprises an indicator of the parameters in the picture or in a bit-stream including the picture, based on a set of defined values. According to a variant of the invention, this information comprises an indication based on whether the parameters are signaled explicitly or whether the parameters are signaled implicitly based on a set of defined values. According to different variants of the invention, this information is included in at least one syntax element included in at least one of a Picture Parameter Set (PPS), a Sequence Parameter Set (SPS), a Supplemental Enhancement Information (SEI) message, a Video Usability Information (VUI), Consumer Electronics Association (CEA) message, and a header.

According to different embodiments of the invention, encoding the resulting V(L) includes compressing V(L) with a picture or video encoder, using for example JPEG, AVC or HEVC compression standards. The decoding includes corresponding reverse compression to the received picture before applying a parameterized transfer function According to different embodiments of the invention, encoding the resulting V(L) includes digitizing or quantizing the resulting V(L). The decoding includes corresponding reverse compression to the received picture before applying a parameterized transfer function.

The invention also concerns apparatus for encoding and for decoding adapted to perform respectively the above methods of encoding and decoding.

The invention claimed is:

1. A method for encoding a picture, the method comprising:
   receiving a picture;
   applying a parameterized transfer function to a luminance L of pixels of the picture to determine a resulting transformed luminance V(L); and
   encoding the resulting transformed luminance V(L) into an encoded modified luminance picture;
   outputting the encoded modified luminance picture in a bitstream;
   wherein the parameterized transfer function is based on:

$$V(L) = \frac{sL^n + c}{L^n + st} + m$$

and is adjusted based on five parameters s, n, c, t and m to model the parameterized transfer function, wherein s, n, c and t are different from zero;
   wherein a parameter among the parameters allows the parameterized transfer function to determine a desired value of V(L) based on at least one selected from a group of: a smallest value of the luminance L and a highest value of the luminance L;
   wherein at least one of the following describes the parameters s, n, c, t, and m:
   (i) the parameters s, n, c, t, and m are encoded and signaled in a bit-stream;
   (ii) the parameters s, n, c, t, and m comprise a set of pre-defined parameters of a plurality of sets of pre-defined parameters, wherein each set of the plurality of sets relates to a video content property or application;
   (iii) the parameters s, n, c, t, and m are set such that V(L) is normalized to a selected range;
   (iv) the parameters s, n, c, t, and m are received with the picture;
   (v) the parameters s, n, c, t, and m are predefined for a certain parameter set of the parameters s, n, c, t, and m;
   (vi) the parameters s, n, c, t, and m are determined for an identified Opto-Electrical Transfer Function (OETF) curve;
   (vii) the parameters s, n, c, t, and m model a known luminance curve.

2. A method for decoding an encoded picture, the method comprising:
   receiving the encoded picture;
   decoding the encoded picture to determine a decoded picture; and
   applying a parameterized transfer function to the decoded picture to determine a luminance L, the parameterized transfer function being based on:

$$L(V) = \left(\frac{c - (V-m)st}{V - m - s}\right)^{1/n}$$

and is adjusted based on five parameters s, n, c, t and m to model the parameterized transfer function, wherein s, n, c and t are all different from zero;
   wherein a parameter of the plurality of parameters allows the parameterized transfer function to determine a desired value of the luminance L based on at least one selected from a group of: a smallest value of a codeword V and a highest value of the codeword V;
   outputting a picture resulting from applying a parameterized transfer function to the decoded picture;
   wherein at least one of the following describes the parameters s, n, c, t, and m:
   (i) the parameters s, n, c, t, and m are encoded and signaled in a bit-stream;
   (ii) the parameters s, n, c, t, and m comprise a set of pre-defined parameters of a plurality of sets of pre-defined parameters, wherein each set of the plurality of sets relates to a video content property or application;
   (iii) the parameters s, n, c, t, and m are set such that V(L) is normalized to a selected range;
   (iv) the parameters s, n, c, t, and m are received with the picture;
   (v) the parameters s, n, c, t, and m are predefined for a certain parameter set of the parameters s, n, c, t, and m;
   (vi) the parameters s, n, c, t, and m are determined for an identified Opto-Electrical Transfer Function (OETF) curve;
   (vii) the parameters s, n, c, t, and m model a known luminance curve.

3. The method of claim 2, where c=−mst, where m=$V_{max}$(1+st)−s, and where u=st; and wherein $$L(V) \approx \left(\frac{-Vu}{V - V_{max}(1+u)}\right)^{1/n}$$

where Vmax, u and n are parameters, wherein an optimization algorithm is utilized to determine the parameters u and n.

4. The method of claim 3, wherein the values of the parameters u and n are determined based on a reference curve that is based on luminance/codeword pairs (Li, Vi).

5. The method of claim 4, wherein the values of the parameters u and n are determined by adding non-uniform weights to the luminance/codeword pairs (Li, Vi).

6. An apparatus comprising:
a processor; and
a memory, the memory storing instructions that, when executed by the apparatus, cause the apparatus to:
receive a picture;
apply a parameterized transfer function to a luminance L of pixels of the picture to determine a resulting transformed luminance V(L); and
encode the resulting transformed luminance V(L) into an encoded modified luminance picture;
output the encoded modified luminance picture in a bitstream;
wherein the parameterized transfer function is based on:

$$V(L) = \frac{sL^n + c}{L^n + st} + m$$

and is adjusted based on five parameters s, n, c, t and m to model the parameterized transfer function, wherein s, n, c, and t are different from zero;
wherein a parameter among the parameters allows the parameterized transfer function to determine a desired value of V(L) based on at least one selected from a group of: a smallest value of the luminance L and a highest value of the luminance L;
wherein at least one of the following describes the parameters s, n, c, t, and m:
(i) the parameters s, n, c, t, and m are encoded and signaled in a bit-stream;
(ii) the parameters s, n, c, t, and m comprise a set of pre-defined parameters of a plurality of sets of pre-defined parameters, wherein each set of the plurality of sets relates to a video content property or application;
(iii) the parameters s, n, c, t, and m are set such that V(L) is normalized to a selected range;
(iv) the parameters s, n, c, t, and m are received with the picture;
(v) the parameters s, n, c, t, and m are predefined for a certain parameter set of the parameters s, n, c, t, and m;
(vi) the parameters s, n, c, t, and m are determined for an identified Opto-Electrical Transfer Function (OETF) curve;
(vii) the parameters s, n, c, t, and m model a known luminance curve.

7. An apparatus comprising:
a processor; and
a memory, the memory storing instructions that, when executed by the apparatus, cause the apparatus to:
receive the encoded picture;
decode the encoded picture to determine a decoded picture; and
apply a parameterized transfer function to the decoded picture to determine a luminance L, the parameterized transfer function being based on:

$$L(V) = \left(\frac{c - (V-m)st}{V-m-s}\right)^{1/n}$$

and is adjusted based on five parameters s, n, c, t and m to model the parameterized transfer function, wherein s, n, c and t are all different from zero;
wherein a parameter of the plurality of parameters allows the parameterized transfer function to determine a desired value of the luminance L based on at least one selected from a group of: a smallest value of a codeword V and a highest value of the codeword V;
output a picture resulting from applying a parameterized transfer function to the decoded picture;
wherein at least one of the following describes the parameters s, n, c, t, and m:
(i) the parameters s, n, c, t, and m are encoded and signaled in a bit-stream;
(ii) the parameters s, n, c, t, and m comprise a set of pre-defined parameters of a plurality of sets of pre-defined parameters,
wherein each set of the plurality of sets relates to a video content property or application;
(iii) the parameters s, n, c, t, and m are set such that V(L) is normalized to a selected range;
(iv) the parameters s, n, c, t, and m are received with the picture;
(v) the parameters s, n, c, t, and m are predefined for a certain parameter set of the parameters s, n, c, t, and m;
(vi) the parameters s, n, c, t, and m are determined for an identified Opto-Electrical Transfer Function (OETF) curve;
(vii) the parameters s, n, c, t, and m model a known luminance curve.

8. The apparatus of claim 7,
where c=−mst, where m=$V_{max}$(1+st)−s, and where u=st; and
wherein $$L(V) \approx \left(\frac{-Vu}{V - V_{max}(1+u)}\right)^{1/n}$$

where Vmax, u and n are parameters, wherein an optimization algorithm is utilized to determine the parameters u and n.

* * * * *